(12) United States Patent
Elko et al.

(10) Patent No.: US 6,438,654 B1
(45) Date of Patent: Aug. 20, 2002

(54) CASTOUT PROCESSING FOR DUPLEXED CACHE STRUCTURES

(75) Inventors: David Arlen Elko, Austin, TX (US); Steven Bruce Jones, Poughkeepsie, NY (US); Jeffrey W. Josten, San Jose; Inderpal Singh Narang, Saratoga, both of CA (US); Jeffrey M. Nick, West Park, NY (US); Kelly B. Pushong, Highland, NY (US); David Harold Surman, Milton, NY (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/255,383

(22) Filed: Feb. 22, 1999

(51) Int. Cl.[7] .............................................. G06F 13/00
(52) U.S. Cl. ........................ 711/133; 711/141; 711/147; 711/150; 711/151
(58) Field of Search .................. 711/118–124, 130–141, 711/146–151, 167, 170; 714/43; 709/101–105; 707/8

(56) References Cited

U.S. PATENT DOCUMENTS

| | | | |
|---|---|---|---|
| 5,280,611 A | 1/1994 | Mohan et al. ................. 707/8 |
| 5,305,448 A | 4/1994 | Insalaco et al. ............. 711/164 |
| 5,317,739 A | 5/1994 | Elko et al. ................... 709/104 |
| 5,339,427 A | 8/1994 | Elko et al. ................... 709/103 |
| 5,394,542 A | * 2/1995 | Frey et al. ..................... 714/43 |
| 5,455,942 A | 10/1995 | Mohan et al. ............... 711/153 |
| 5,457,793 A | 10/1995 | Elko et al. ................... 707/205 |
| 5,463,736 A | 10/1995 | Elko et al. ..................... 710/28 |
| 5,465,359 A | 11/1995 | Allen et al. .................. 709/101 |
| 5,493,668 A | * 2/1996 | Elko et al. ................... 711/130 |
| 5,515,499 A | 5/1996 | Allen et al. ...................... 714/5 |
| 5,537,574 A | 7/1996 | Elko et al. ................... 711/141 |
| 5,561,809 A | 10/1996 | Elko et al. ................... 709/213 |
| 5,630,050 A | * 5/1997 | Neuhard et al. ............... 714/27 |
| 5,634,072 A | 5/1997 | Allen et al. .................. 709/104 |
| 5,664,155 A | * 9/1997 | Elko et al. ................... 711/170 |
| 5,706,432 A | 1/1998 | Elko et al. ................... 709/213 |
| 5,751,992 A | * 5/1998 | Bhargava et al. ........... 711/130 |
| 5,813,032 A | * 9/1998 | Bhargava et al. ........... 711/130 |
| 5,860,115 A | * 1/1999 | Neuhard et al. ............. 711/147 |
| 5,875,484 A | * 2/1999 | Neuhard et al. ............. 711/167 |

* cited by examiner

Primary Examiner—Than Nguyen
(74) Attorney, Agent, or Firm—William A. Kinnaman, Jr., Esq.; Blanche E. Schiller, Esq.; Heslin Rothenberg Farley & Mesiti P.C.

(57) ABSTRACT

Castout processing for duplexed data structures. A selective data item is written from a primary instance of a data structure to at least one storage medium. A determination is made as to whether the selective data item can be deleted from a secondary instance of the data structure. If the selective data item can be deleted, it is deleted from the secondary instance.

24 Claims, 47 Drawing Sheets

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CAST-OUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) | fig. 2       — 124

LOCAL-CACHE CONTROL BLOCK (LCCB)                126

| | |
|---|---|
| LOCAL CACHE IDENTIFIER | (LCID) |
| ATTACHMENT STATUS | (AS) |
| LOCAL-CACHE TOKEN | (LCT) |
| LOCAL-CACHE AUTHORITY | (LCAU) |
| SYSTEM IDENTIFIER | (SYID) |
| ATTACHMENT INFORMATION | (AINF) |
| DETACHMENT RESTART TOKEN | (DURT) | fig. 3

DIRECTORY INFORMATION BLOCK

| | |
|---|---|
| NAME | (N) |
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) |
| VERSION NUMBER | (VN) |
| LOCAL-CACHE IDENTIFIER | (LCID) |
| LCEN-VALIDITY INDICATOR | (LVI) |
| LOCAL-CACHE ENTRY NUMBER | (LCEN) |

*fig. 4*

REQUEST/RESPONSE OPERANDS

| | |
|---|---|
| COMPARATIVE VERSION NUMBER | (CVN) |
| HALT – INVALIDATION CONTROL | (HIC) |
| INVALIDATION TYPE | (ITYP) |
| NAME – REPLACEMENT CONTROL | (NRC) |
| REPLACEMENT NAME | (RN) |
| SUPPRESS REGISTRATION | (SREC) |
| VERSION NUMBER | (VN) |

*fig. 5*

CONFIRMATION OF DUPLEX SWITCH

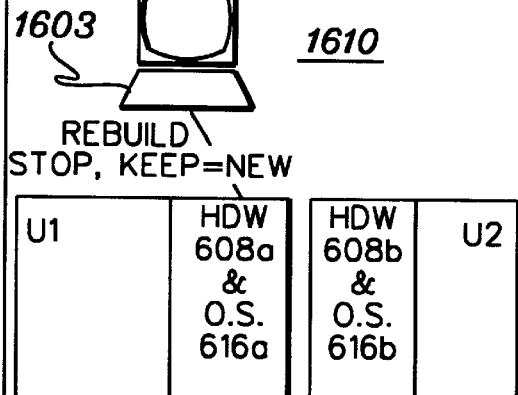
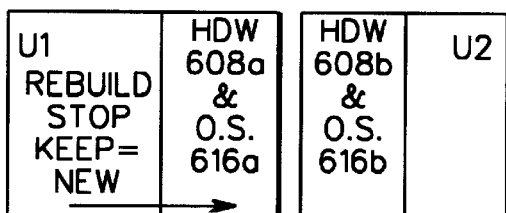
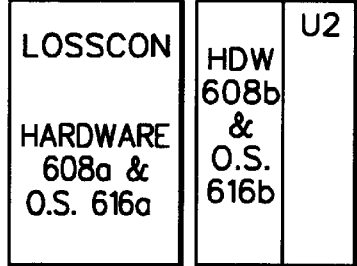
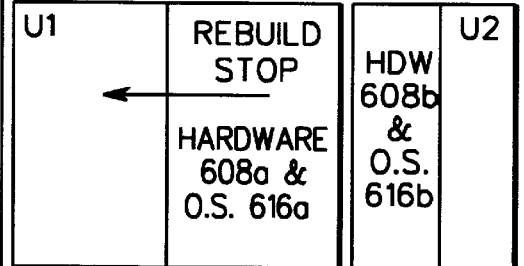
fig. 16b

CASTOUT PROCESSING FOR DUPLEXED CACHE STRUCTURES

CROSS REFERENCE TO RELATED APPLICATIONS

This application contains subject matter which is related to the subject matter of the following patents/applications which are assigned to the same assignee as this application. Each of the below listed patents/applications is hereby incorporated herein by reference in its entirety:

"Method, System And Program Products For Providing User-Managed Duplexing Of Coupling Facility Cache Structures", Elko et al., Ser. No. 09/255,382, filed herewith;

"Method And System For Reconfiguring A Storage Structure Within A Structure Processing Facility," Allen et al., U.S. Pat. No. 5,515,499, Issued May 7, 1996;

"Multiple Processor System Having Software For Selecting Shared Cache Entries Of An Associated Castout Class For Transfer To A DASD With One I/O Operation," Elko et al., U.S. Pat. No. 5,493,668, Issued on Feb. 20, 1996;

"Software Cache Management Of A Shared Electronic Store In a Supplex," Elko et al., U.S. Pat. No. 5,457,793, Issued Oct. 10, 1995;

"Method, System And Program Products For Managing Changed Data Of Castout Classes," Elko et al., Ser. No. 09/251,888, Filed: Feb. 19, 1999;

"Sysplex Shared Data Coherency Method," Elko et al., U.S. Pat. No. 5,537,574, Issued Jul. 16, 1996;

"Method And Apparatus For Coupling Data Processing Systems" Elko, et al. U.S. Pat. No. 5,317,739, Issued May 31, 1994;

"In A Multiprocessing System Having A Coupling Facility, Communicating Messages Between The Processors And The Coupling Facility In Either A Synchronous Operation Or An Asynchronous Operation", Elko et al., U.S. Pat. No. 5,561,809, Issued on Oct. 1, 1996;

"Mechanism For Receiving Messages At A Coupling Facility", Elko et al., U.S. Pat. No. 5,706,432, Issued Jan. 6, 1998;

"Coupling Facility For Receiving Commands From Plurality Of Hosts For Activating Selected Connection Paths To I/O Devices And Maintaining Status Thereof", Elko et al., U.S. Pat. No. 5,463,736, Issued Oct. 31, 1995;

"A Method And System For Managing Data and Users of Data in a Data Processing System," Allen et al., U.S. Pat. No. 5,465,359, Issued on Nov. 7, 1995;

"Shared Access Serialization Featuring Second Process Lock Steal And Subsequent Write Access Denial To First Process" Insalaco et al, U.S. Pat. No. 5,305,448, Issued on Apr. 19, 1994;

"Method Of Managing Resources In One Or More Coupling Facilities Coupled To One Or More Operating Systems In One Or More Central Programming Complexes Using A Policy," Allen et al., U.S. Pat. No. 5,634,072, Issued On May 27, 1997;

"Partial Page Write Detection For A Shared Cache Using A Bit Pattern Written At The Beginning And End Of Each Page", Narang et al., U.S. Pat. No. 5,455,942, Issued Oct. 3, 1995;

"Method For Managing Database Recovery From Failure Of A Shared Store In a System Including A Plurality Of Transaction-Based Systems Of The Write-Ahead Logging Type", Narang et al., U.S. Pat. No. 5,280,611, Issued Jan. 18, 1994; and "Method And Apparatus Of Distributed Locking For Shared Data, Employing A Central Coupling Facility", U.S. Pat. No. 5,339,427, Issued Aug. 16, 1994.

TECHNICAL FIELD

This invention relates in general to the field of data processing and, in particular, to the duplexing of cache structures located within a coupling facility of a computing environment.

BACKGROUND ART

A cache structure is a high-speed cache shared by one or more independently-operating computing units of a computing environment. In particular, cache structures are located within a remote facility, referred to as a coupling facility, that is coupled to the one or more independently-operating computing units. The computing units store and retrieve data from the cache structures.

Coupling facility cache structures can be configured in several different modes. of operation, one of which is a store-in mode. Store-in mode caches are used, for example, by the DB2 database management facility of International Business Machines Corporation. A key attribute of the store-in mode is that changed data may be stored into the non-volatile memory of the coupling facility using the high performance coupling facility links. This avoids the delay in the execution of database transactions that result when the data is written to secondary storage (e.g., direct access storage devices (DASD)) using normal input/output (I/O) operations, and is an advantage of the coupling facility cache.

Subsystems who cache changed data in a coupling facility cache face a unique recovery/availability problem, which is not faced by those who either do not cache data or cache only unchanged data. For example, when a data item is modified and only written changed to the coupling facility cache structure, a subsequent failure of the coupling facility cache structure can cause the only existing current level of the data item to be lost. This results in a loss of data integrity. This loss of integrity window exists from the time the data item is written to the coupling facility cache until it is eventually castout to permanent storage, which may be a considerable time. At any given instant, a significant percentage of data stored in the coupling facility cache structure may be in this changed state, and thus vulnerable to loss should the coupling facility structure be lost.

To recover from such failures, subsystems have made use of recovery logs, which are hardened on permanent storage. Basically, during normal operation, as a given subsystem instance modifies a data item, it first writes a description of the data item update to its own recovery log along with a unique ordering indication (typically, a timestamp) showing when the update to the data was made relative to the other updates. Then, when the log update is complete, it writes the updated data item to the coupling facility cache structure. Given this, if the cache structure fails, a recovery process can reconstruct the most current version of the data by merging the recovery logs of all subsystem instances so that updates made by all instances can be observed; locating the most current copy of each data item in the log, using the ordering information associated with each of the logged updates; and writing the most current copy of each of the data items to permanent storage.

While the above approach allows the data to be recovered following the failure of a coupling facility cache structure, it is not an adequate solution for providing continuous availability of the shared data and of the coupling facility cache structure across such failures. The log merge and recovery update processing can take a long time, during which time the database is entirely unavailable for use by end users.

Thus, a need exists for a recovery technique that allows recovery from a failure with little or no perceived unavailability of the data to the end users. A further need exists for a mechanism that allows selected data to be duplexed. A yet further need exists for a mechanism that allows duplexing to be turned on and off automatically. A yet further need exists for a technique that enables a switch from duplex mode to simplex mode to be performed quickly.

SUMMARY OF THE INVENTION

The shortcomings of the prior art are overcome and additional advantages are provided through the provision of a castout method. In one embodiment, the castout method includes writing a selective data item from a primary instance of a data structure to at least one storage medium; determining whether the selective data item can be deleted from a secondary instance of the data structure; and deleting the selective data item from the secondary instance, when the selective data item can be deleted.

The duplexing capability of the present invention advantageously provides for improved availability of data, such as cache structure data. Duplexing can be initiated on a per-structure basis, either manually or automatically. Once duplexing is initiated, the operating system drives the structure users to temporarily quiesce access to the structure; allocate a secondary structure instance in, for example, a different coupling facility from the primary structure instance; copy any necessary structure data from the primary instance to the secondary instance, establishing a duplexed copy of the structure data; and unquiesce access to the structure with duplexing established.

Once duplexing is established, the user explicitly duplexes any necessary updates to both the primary and secondary structure instances to maintain synchronization.

When a structure failure or loss of connectivity affects one of the structure instances, the operating system drives the structure users to revert to simplex mode on the unaffected structure instance. The switch to simplex mode is very fast, with no data loss and no log recovery needed. Duplexing may then be reinitiated for the structure either automatically or manually.

At the time changed data in the cache structure is castout causing the data entries to be marked unchanged, the present invention advantageously deletes the entries from the secondary structure.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 2 depicts one example of the controls associated with a cache structure depicted in FIG. 1, in accordance with the principles of the present invention;

FIG. 3 depicts one example of a local cache control block associated with each local cache of the computing environment depicted in FIG. 1, in accordance with the principles of the present invention;

FIG. 4 depicts one embodiment of a directory information block in connection with the directory depicted in FIG. 1, in accordance with the principles of the present invention;

FIG. 5 depicts one embodiment of request/response operands used in accordance with the principles of the present invention;

FIGS. 16a–16b depict overview diagrams illustrating a number of situations in which duplexing rebuild stop and switch may be initiated, in accordance with the principles of the present invention;

BEST MODE FOR CARRYING OUT THE INVENTION

In accordance with the principles of the present invention, a duplexing capability is provided in which a secondary instance of a coupling facility structure, such as a cache structure, is created. In one example, the secondary instance is created in a different coupling facility from the primary structure instance. The secondary instance contains selective structure data from the primary instance. It is not necessary for the secondary structure to contain all of the data of the primary structure. Once duplexing is established, desired updates are made to both the primary and secondary structure.

Figure 1:
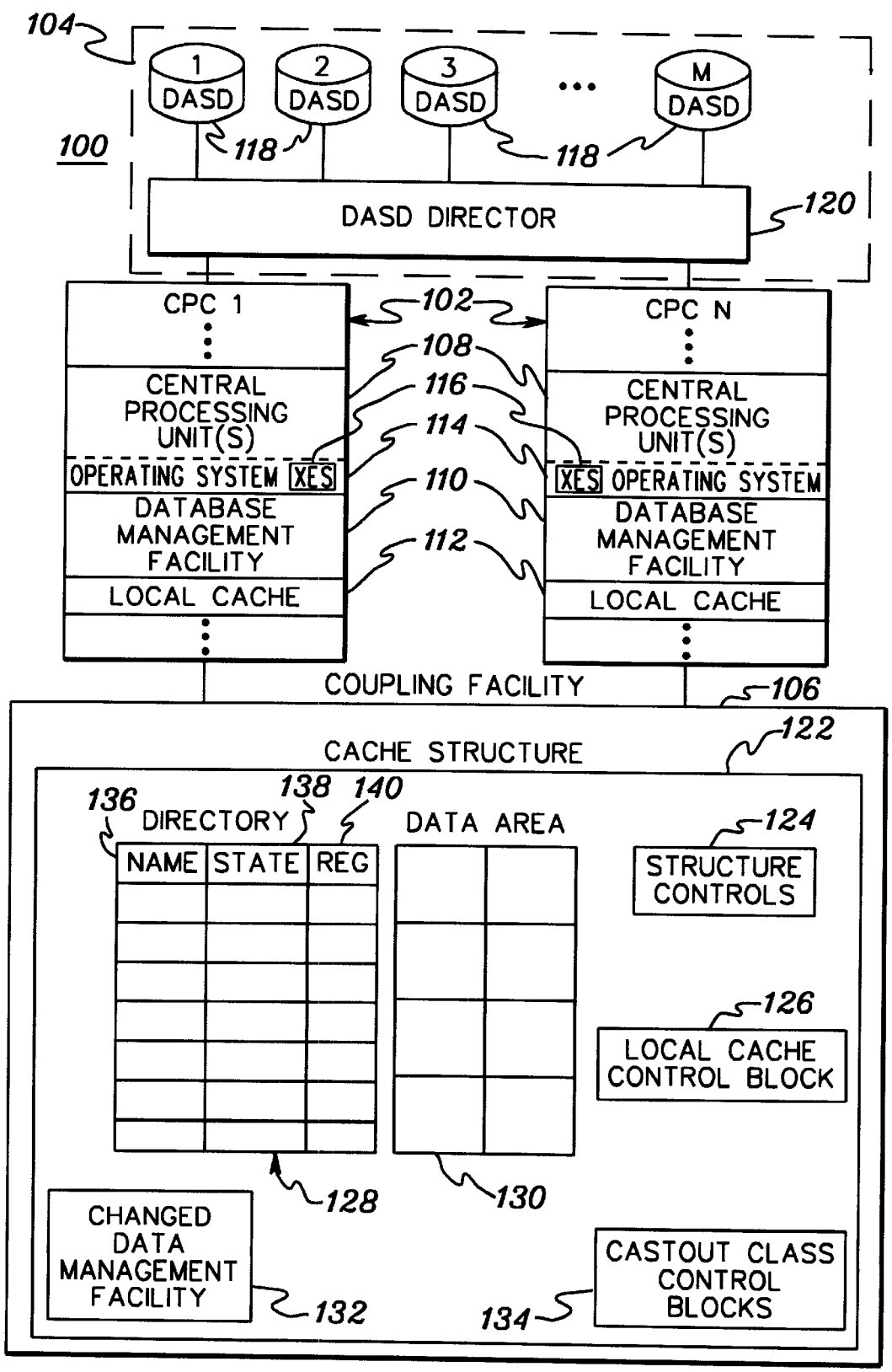
FIG. 1 depicts one example of a computing environment incorporating and using the duplexing capabilities of the present invention.

One embodiment of a computing environment incorporating and using the duplexing capabilities of the present invention is depicted in FIG. 1. Computing environment 100 is based, for instance, on the Enterprise Systems Architecture (ESA)/390 offered by International Business Machines Corporation, Armonk, N.Y. ESA/390 is described in an IBM publication entitled Enterprise System Architecture/390 Principles of Operation, IBM Publication No. SA22-7201-04, June 1997, which is hereby incorporated herein by reference in its entirety. One example of a computing environment based on ESA/390 is the ES/9000 Model 900 computing system offered by International Business Machines Corporation.

Computing environment 100 includes, for instance, one or more central processing complexes (CPCs) 102, a secondary storage unit 104 and at least one coupling facility 106. Each central processing complex includes, for example, at least one central processing unit 108, at least one database management facility 110, and at least one local cache 112. Each central processing unit executes an operating system 114, such as the multiple virtual storage (MVS) or OS/390 operating system offered by International Business Machines Corporation, which is used for controlling execution of programs and the processing of data, as is well known. Each operating system 114 includes a cross-system extended services (XES) facility 116 for managing and accessing information in a coupling facility and for providing the duplexing capabilities, as described further below.

Each database management facility 110 owns and controls a set of resources within the computer system. As one example, the database management facility is DB2, offered by International Business Machines Corporation.

Local caches 112 include data associated with its respective central processing complex. In particular, each local cache includes a name field for referencing data; a data field for storing the data; an optional adjunct data field for additional data; and a state field for indicating whether the data in the data field is valid.

Coupled to the central processing complexes is secondary storage unit 104. In one example, the secondary storage includes one or more direct access storage devices (DASD) 118, and a DASD director 120 coupled thereto. DASD director 120 controls access to the direct access storage devices. The DASD director couples the secondary storage unit to the central processing complexes via one or more channels (e.g., ESCON channels).

Each central processing complex 102 is also coupled to coupling facility 106 (a.k.a., a structured external storage (SES) processor). (In one embodiment, each central processing complex is coupled to a plurality of coupling facilities 106.) Coupling facility 106 contains storage accessible by the central processing complexes and performs operations requested by programs in the CPCs. Aspects of the operation of a coupling facility are described in detail in such references as Elko, et al. U.S. Pat. No. 5,317,739 entitled "Method And Apparatus For Coupling Data Processing Systems", issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued on Oct. 1, 1996; Elko et al., U.S. Pat. No. 5,706,432, entitled "Mechanism For Receiving Messages At A Coupling Facility", issued Jan. 6, 1998, and the patents and applications referred to therein, all of which are hereby incorporated herein by reference in their entirety.

Coupling facility 106 includes, for instance, one or more storage structures, such as a cache structure 122. Each cache structure includes, for instance, a number of cache structure controls 124, a number of local cache control blocks (LCCB) 126, a directory 128, a data area 130, a changed data management facility 132 and castout class control blocks 134, each of which is explained in further detail below. The cache structure and/or the coupling facility may include other or additional components or information.

As shown in FIG. 2, cache structure controls 124 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage class values range from one to the maximum storage class value.

(e) Maximum Castout Class (MCC): A value that specifies the number of castout classes. Valid castout class values range from one to the maximum castout class value.

(f) Data-Area-Element Characteristic (DAEX): A value that specifies the number of bytes in each data-area element. The size of the data-area element in bytes is, for instance, the product of 256 and 2 raised to the power of the value specified in the data-area element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in a structure identifier (SID) vector. The structure authority has two parts: A time of day (TOD), which reflects the moment when a system was allocating the structure and the system ID used to make the TOD unique. Paired with the sysplex name, it further identifies who caused the structure to be allocated.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i).

When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

A local cache may have, for instance, local-cache states and local-cache-identifier states, described below:

Local-Cache States: A cache structure local cache exists when the associated local-cache identifier is assigned. When a local cache exists, it is either in the attached or the detached state. A local-cache is placed in the attached state by an attach-local-cache command. A local cache is placed in the detached state by a detach-local-cache command when the detachment process is complete. The attach-local-cache command and the detach-local-cache command are described in detail in Allen et al., U.S. Pat. No. 5,515,499, "Method and System For Reconfiguring A Storage Structure Within A Structure Processing Facility", issued May 7, 1996, which is hereby incorporated herein by reference in its entirety.

Local-Cache-Identifier States: A local-cache identifier is in the assigned state when the associated assigned bit in the local-cache-identifier vector is one. A local-cache identifier is placed in the assigned state by the attach-local-cache command. A local-cache identifier is in the unassigned state when the associated bit in the local-cache-identifier vector is zero. A local-cache identifier is placed in the unassigned state by the detach-local-cache command, depending on LCID-unassignment control.

Returning to FIG. 1, in addition to structure controls 124, cache structure 122 includes local-cache control block 126. Local-cache control block 126 includes a number of local cache controls, which are initialized when a local cache is attached to a coupling facility cache. In one embodiment, local-cache control block 126 includes the following fields (FIG. 3):

(a) Local-Cache Identifier (LCID): A value that identifies a local cache. The controls are deleted when the local-cache identifier is unassigned and they are valid when the local-cache identifier is assigned.

(b) Attachment Status (AS): A control that describes the state of the attachment of a local cache. When the value of the attachment status is one, the local cache is active (attached). When the value of the attachment status is zero, the local cache is inactive (detached).

The attachment status controls the execution of commands that specify the local cache. When the local cache is active (attached), all commands that specify the local cache are processed normally. When the local cache is inactive (detached), all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in U.S. Pat. No. 5,561,809 entitled, "In A Multiprocessing System Having A Coupling Facility, Communicating Messages Between The Processors And The Coupling Facility In Either A Synchronous Operation Or An Asynchronous Operation," by D. A. Elko et al.,(Docket No. P09-91-006), issued Oct. 1, 1996, and "Coupling Facility For Receiving Commands From Plurality Of Hosts For Activating Selected Connection Paths To I/O Devices And Maintaining Status Thereof," by D. A. Elko et al., U.S. Pat. No. 5,463,736, (Docket No. P09-92-006), issued Oct. 31, 1995, each of which is hereby incorporated herein by reference in its entirety) is activated. The system identifier is maintained in a message-path status vector and copied into the local cache controls when an attach-local-cache command is communicated over the message path.

(f) Attachment Information (AINF): A value set by the program when the local cache is attached.

(g) Detachment Restart Token (DURT): A value used to indicate how far along a detachment process has proceeded.

Referring back to FIG. 1, cache structure 122 also includes directory 128. Cache directory 128 is a collection of directory entries partitioned into storage classes and arranged as a fully associative array. The subset of changed directory entries is additionally partitioned into castout classes. Each directory entry includes, for instance, a name field, 136, a state field 138 and a register field 140. Whenever a named data object is placed in a coupling facility cache or local cache, its name is registered in name field 136 and its state is registered in state field 138 by the cache directory. Further details relating to state field 138 and register field 140 are described with reference to FIG. 4.

In general, the state information indicates whether the data is changed, unchanged, locked for castout, or resident in coupling facility 106. In particular, state field 138 includes, for instance:

(a) A User-Data Field (UDF): The user-data field contains a value that is associated with the data when it is initially changed in the SES cache and is maintained until the data area is re-used. The user-data field is valid when the data is cached as changed. The user data field contains a time value or timestamp, which represents the oldest point in time when the data element is changed and that change has not yet been migrated to DASD. (The UDF is further described in a co-pending, commonly assigned U.S. patent application Ser. No. 09/251,888, Elko et al., entitled "Method, System And Program Products For Managing Changed Data Of Castout Classes", (Docket No. P09-98-037), filed Feb. 19, 1999, which is hereby incorporated herein by reference in its entirety.)

(b) A Storage Class (SC): A value which identifies the storage class assigned for the name.

(c) A Change Indicator (C): A value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit is also one.

(d) A Data-Cached Indicator (D): A value which indicates whether the data is located in the SES cache. When the data bit is one, the data is cached. When the data bit is zero, the data is not cached.

(e) A Castout-Parity-Bits Indicator (CP): A field which indicates the current assignment of the castout parity. Three possible values are: castout parity is zero; castout parity is one; the castout parity is unknown. One example of the castout parity bits indicator is described in U.S. Pat. No. 5,455,942, entitled "Partial Page Write Detection For A Shared Cache Using A Bit Pattern Written At The Beginning And End of Each Page", Narang et al., issued Oct. 3, 1995, which is hereby incorporated herein by reference in its entirety.

(f) A Castout Class (CC): A value which identifies the castout class assigned for the name.

(g) A Castout-Lock Value (CLV): A value which indicates the castout state of the data. When the castout lock is zero, the data is not being castout. When the castout lock is not zero, the value of the first byte of the castout lock identifies the local cache that is casting out the data block from the SES cache to DASD. The value of the second byte identifies the castout process on the local system. When the castout lock is not zero, the data bit is one.

(h) A Data-Area Size (DAS): A value that specifies the size of the data area as an integral multiple of the data-area-element size. The initial value is zero when the directory entry is assigned and is zero until the data bit is set to one.

(i) A Version Number (VN): An unsigned binary. integer that is conditionally compared and conditionally updated. The version number is initialized to zero when a name is assigned to the directory.

In addition to the above, directory information block 128 also includes register 140, which is a table containing information on the location of the locally cached copies of the data block. Each row in the table corresponds to an attached local cache. The columns contain the local cache identifier (LCID), local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detached, or when a local copy invalidation process is executed for the specified name and the local cache is a member of the set of local caches being invalidated. The LCEN field is invalid, when LVI is zero.

Returning to FIG. 1, cache structure 122 further includes data areas 130 and optional adjunct data areas (not shown). Data area 130 is the area in the cache in which the user data is stored. The data object cached in the shared cache is identified by a software-assigned name. Therefore, any request for reading or writing data in the shared cache specifies the name of the data object, which is the object of the request. The directory is conventionally indexed by the names of the data objects which are objects of the read or write commands.

Changed data management facility 132 includes at least a portion of the logic used for the present invention. In particular, it includes at least a portion of the logic used during castout processing, as described further below. Changed data management facility 132 is further described in co-pending, commonly assigned U.S. patent application Ser. No. 09/251,888, Elko et al., entitled "Method, System And Program Products For Managing Changed Data Of Castout Classes", (IBM Docket No. P09-98-037), filed Feb. 19, 1999, which is hereby incorporated herein by reference in its entirety.

Castout class control blocks 134 include a castout class control block for each castout class associated with the cache structure. Each castout class control block has pointers to a data structure of directory entries corresponding to the changed data elements of that castout class. One example of the data structure is implemented as a pair of data structures, but has an architected view as a single data structure. This data structure is further described in U.S. patent application Ser. No. 09/251,888, Elko et al., entitled "Method, System And Program Products For Managing Changed Data Of Castout Classes", filed Feb. 19, 1999, which is hereby incorporated herein by reference in its entirety.

In one embodiment, messages are:communicated between CPC 102 and coupling facility 106 via a message command/response block. In one example, the message command/response block includes a plurality of operands. An operand may be a request operand, a response operand or both, depending upon the command. A number of request/response operands are depicted in FIG. 5 and discussed below. It is also possible that other request and/or response operands exist, which are not shown in FIG. 5. In one embodiment, the response/request operands include the following:

(a) Comparative Version Number (CVN): A value that is compared to the version number object.

(b) Halt-Invalidation Control (HIC): A value that specifies whether an invalidate-name-list command is halted, when either a name-not-found condition occurs or a version-number comparison fails. It has the following encoding:
  0 continue invalidation;
  1 halt invalidation when either condition occurs.

(c) Invalidation Type (ITYP): A value that indicates the type of invalidate-name or invalidate-name-list request. It has the following encoding:
  00 invalidate directory entry and data area;
  01 invalidate unchanged data areas;
  10 invalidate changed data areas;
  11 invalidate data area (changed and unchanged.

(d) Name Replacement Control (NRC): A value that controls the name-replacement process. It has the following encoding:

0 suppress replacement;
1 replace name.
(e) Replacement Name (RN): A value that identifies a data block being replaced in a local cache.
(f) Suppress Registration (SREG): A value that controls the LCEN-registration process for the write-and-register and read-and-register commands.
0 register the LCEN;
1 suppress LCEN registration.
(g) Version (VN): An unsigned binary integer that is conditionally compared and conditionally updated.

In accordance with the principles of the present invention, rules governing duplexing for cache structures are stored in an active coupling facility policy. As one example, the coupling facility policy is stored on a function data set, which is coupled to each central processing complex, as shown in the overview diagram of FIG. 6.

Figure 6:
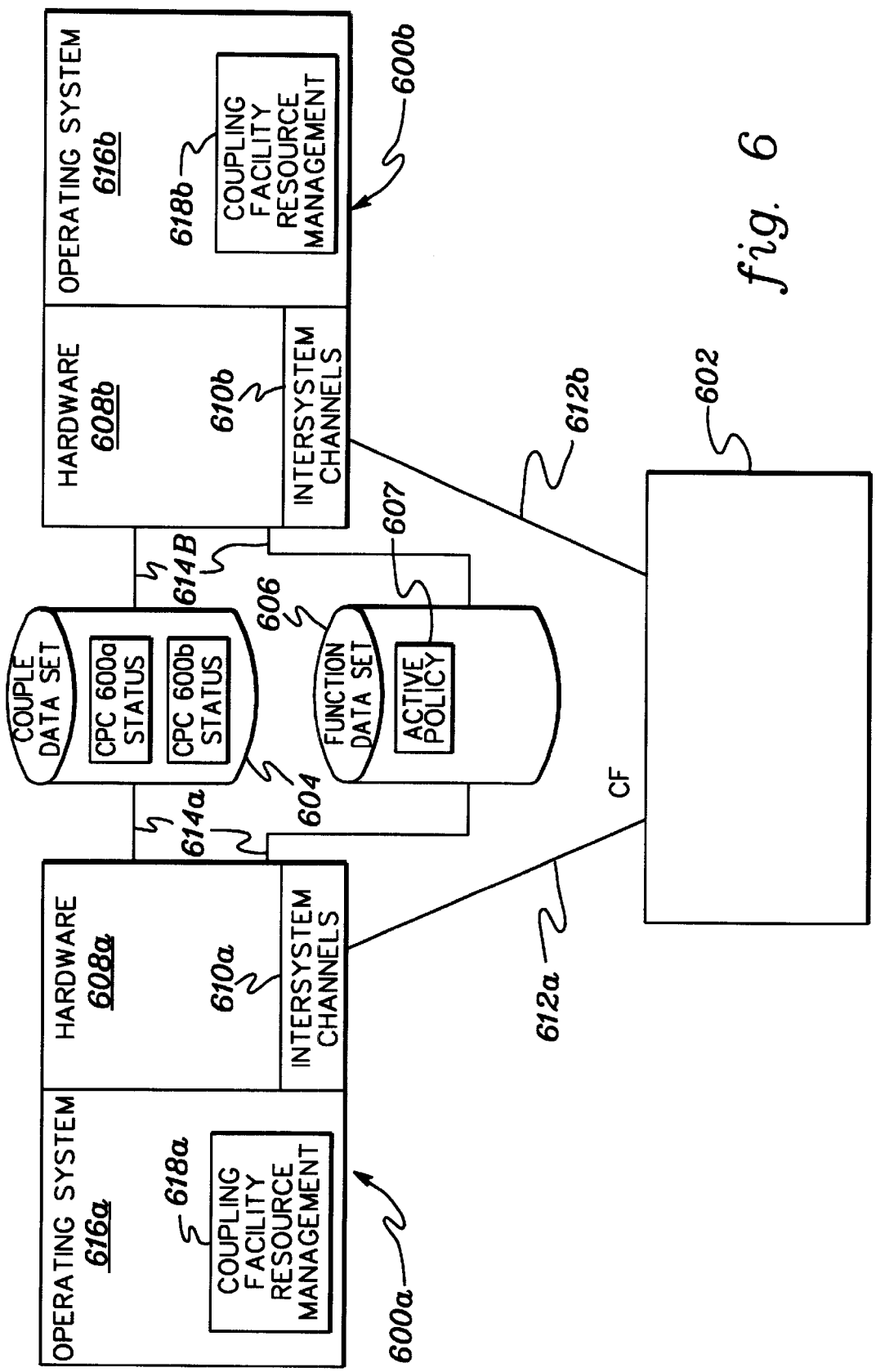
FIG. 6 illustrates one example of an overview diagram depicting an active policy coupled to central processing complexes, in accordance with the principles of the present invention.

Referring to FIG. 6, two CPC's (CPC 600*a* and CPC 600*b*) exist. Each cPc is coupled to a coupling facility 602; a couple data set 604, which includes the status for CPC 600*a* and CPC 600*b*; and a function data set 606, which includes an active policy 607 for coupling facility resources.

Each cPc includes hardware for connecting the respective CPC to the coupling facility and the couple and function data sets. In particular, located within CPC 600*a* is hardware 608*a* which includes, for instance, intersystem(I/S) channels 610*a* to connect coupling facility 602 via a bus 612*a* to CPC 600*a*, and I/O channels (not shown) to couple CPC 600*a* via a link 614*a* to couple data set 604 and function data set **606*.

Similarly, located within CPC 600*b* is hardware 608*b*, which includes, for instance, I/S channels 610*b* to connect coupling facility 602 to CPC 600*b* via a bus 612*b*, and I/O channels(not shown) to couple CPC 600*b* via a link 614*b* to couple data set 604 and function data set 606.

In one embodiment, each CPC further includes an operating system 616*a*, 616*b*, respectively. Each operating system includes, as a part of XES services (see FIG. 1), a coupling facility resource manager (CFRM) 618*a*, 618*b*, respectively, which governs the coupling facility resource use in a sysplex. CFRM provides services to the installation to manage the coupling facility resources usage based on the customer environment. These services include, for instance, managing the gain/loss of function data set 606, which contains CFRM data; gain/loss of coupling facility 602 access; cleanup of coupling facility resources for system failure; and controlling the duplexing rebuild process of the present invention.

In one example, the coupling facility policy stored on function data set 606 includes, as policy data, a DUPLEX policy specification used to control duplexing for a given structure. This policy includes, for instance, the following options:

DUPLEX(DISABLED)—This option indicates that duplexing for a structure is not allowed. That is, the structure is to remain in simplex mode. Duplexing is not initiated automatically for the structure and may not be initiated manually. This option allows the installation the option to maintain some or all of the coupling facility cache structures in simplex mode at all times, if desired.

DUPLEX(ALLOWED)—This option indicates that duplexing for a structure may be started manually, but is not to be automatically initiated by the operating system. This option allows the installation to manually control the duplexing state of particular structures without enabling the operating system to automatically maintain the duplexed state for the structure, if desired.

DUPLEX(ENABLED)—This option indicates that duplexing for a structure is to be automatically initiated by the operating system, so as to maintain the duplexed state whenever possible. This option provides the highest availability for the structure data, by initiating duplexing for a structure in the simplex state whenever system events occur that may make successful duplexing of the structure possible. Some examples of this are as follows:

When a duplexed structure reverts to simplex mode (e.g., as a result of a failure which impacts one of the two structure instances). The operating system detects this and automatically re-initiates duplexing for the structure, to restore the duplexed state with a new secondary instance of the structure.

When a structure could not be duplexed because there was no coupling facility resource suitable for allocation of the secondary structure instance. When a new suitable coupling facility becomes available in the configuration, the operating system detects this and automatically initiates duplexing for the structure at that time.

When a structure could not be duplexed because there were active subsystem instances using the simplex structure who were unable to participate in the protocol for transitioning into the duplexed state. In the presence of such downlevel structure users, duplexing cannot be established. When these structure users are no longer connected to the structure, the operating system may detect that any remaining active users support the duplexing protocols and automatically initiate duplexing for the structure at that time.

The above CFRM policy externals provide the installation with control over the duplexing status of coupling facility cache structures used by subsystems (e.g., DB2) who support user-managed duplexing protocols.

A user gains access to a coupling facility structure through use of operating system services provided by the Cross-System Extended Services or XES component of OS/390. A user of a coupling facility structure is termed a connected XES user. XES supports the defined cache structures.

A connection is considered failed-persistent, when the connection is persistent and it fails. Likewise, a structure is considered failed-persistent, when the structure is non-persistent and failed persistent users exist. As described in detail in U.S. Pat. No. 5,465,359, Allen et al., "A Method And System For Managing Data and Users of Data in a Data Processing System," issued on Nov. 7, 1995, which is hereby incorporated herein by reference in its entirety, persistence for a connection means that the connection and the structure remain allocated if the connection terminates abnormally until all surviving connections have provided an event exit response. Similarly, persistence for a structure means that the structure remains allocated even after all connections to the structure have terminated.

A duplexing rebuild process can be invoked for a coupling facility structure, such as. a cache structure, such that a second duplexed copy of the structure is created. During the duplexing rebuild processing, a duplexing rebuild start is initiated and thereafter, a duplexing rebuild quiesce event is presented to each connector's event exit. The reason for the duplexing rebuild is also presented to the connector. The duplexing rebuild quiesce event requires a response from every active user.

Since XES is waiting for an event exit response for the duplexing rebuild quiesce event, the connectors either quiesce activity against the structure, and then provide an event exit response using an IXLEERSP OS/390 service; disconnect from the structure allowing others to continue in the duplexing rebuild process but not participating itself; or stop the duplexing rebuild process by issuing an IXLREBLD OS/390 service and providing a reason for stopping duplexing rebuild, as described below.

Assuming the connector chooses to participate in the duplexing rebuild process, the connector quiesces activity against the structure and provides an event exit response. Quiescing activity on the structure means that the connector completes-or terminates any outstanding requests and prevents new requests against the structure.

When the connector provides an event exit response for the duplexing rebuild quiesce event, the connector's connect token is temporarily invalidated in order to prevent new accesses to the coupling facility structure. Once the connector has provided an event exit response for the duplexing rebuild quiesce event, there should not be any outstanding requests. XES does not try to purge or complete any in progress requests.

When all connectors have provided an event exit response for the duplexing rebuild quiesce event, the connector's event exits are driven with a duplexing rebuild connect event and the connector issues IXLCONN REBUILD to allocate a secondary (or new) structure to be used during the duplexing rebuild. Once the connector is connected to the secondary structure, a temporary contoken and a vector token exist for referencing the secondary structure when both the secondary and primary structures exist. A connector can begin duplexing information into the secondary structure, as soon as the IXLCONN REBUILD request completes successfully. Further, after any active connectors confirm the duplexing rebuild quiesce events, any new connections to the structures are permitted.

If the primary structure is still accessible (i.e., the structure has not failed and the connector has connectivity), then the primary structure is accessed during the duplexing rebuild process in order to copy selective data from the primary structure to the secondary structure. Duplexing may not be established when the primary structure is unusable at this point.

As each connection finishes duplexing any necessary information into the secondary structure, the connections quiesce activity against both the primary and secondary structures, and then, issue IXLREBLD to indicate that duplexing rebuild processing is complete. As each connector issues IXLREBLD COMPLETE, both the temporary. and original connect tokens are invalidated in order to prevent accesses to both the primary and secondary structure. Once the connector has issued IXLREBLD COMPLETE, there should not be any outstanding requests. XES does not try to ensure that all outstanding requests have completed.

The duplexing rebuild process is not actually complete when an individual connector invokes IXLREBLD to indicate rebuild complete. Connectors are prevented from accessing the primary and secondary structures until the duplex established event is presented.

The IXLREBLD COMPLETE process causes a transition to a Rebuild Duplex Established phase. This phase is entered, once all connections have confirmed that the secondary structure has been initialized to contain a copy of any necessary data in the primary structure. On entering the Rebuild Duplex Established phase, the operating system informs any active subsystem instances that duplexing has been established, and requests that any necessary subsequent updates to data items be duplexed to both structure instances. At this point, the subsystem instances may resume use of the structure in duplexed mode; the rebuild quiesce is lifted and mainline access to data continues.

Once the Rebuild Duplex Established phase is reached, the structure remains in this phase indefinitely. Thus., the duplexing rebuild solution of the present invention is flexible and allows relatively unrestricted abilities to modify and update the usage of the duplexed structure, while it is in this phase of a duplexing rebuild. For example, subsystem instances who are using the structure are able to discontinue using the structure (disconnect), and then at a later time, start using the structure again(reconnect), while the structure remains in a duplexing rebuild.

As a further example, new subsystem instances who were not active at the time duplexing was established are able to start using the structure (connect), while the structure remains in a duplexing rebuild. Additionally, the structure remains in the duplexed state even if all active subsystem instances disconnect from the structure.

As yet a further example, it is possible to dynamically alter the size of the structure instances, while the structure remains in a duplexing rebuild. Further, it is possible to force the deletion of persistent users to the duplexed structure, or force the deletion of a persistent duplexed structure that is not actively being used.

While in this duplexed state, the operating system monitors the structure instances for failures and other conditions that would cause a transition to simplex state to be initiated. For example, if one of the two structure instances fails or loses connectivity to one or more of its active subsystem users, then that structure instance can no longer serve as a viable duplex copy of the structure. Thus, the operating system automatically initiates a transition back to simplex mode, keeping whichever structure instance was not affected by the failure. Once a switch to a structure has been requested, the rebuild cannot be stopped. (Note that a transition from duplexed state to simplex may also be initiated at any time via an operator command or a programming interface.) Once the structure has reverted to simplex mode, the operating system may be able to re-initiate a transition back to the duplexed state, if DUPLEX (ENABLED) is specified in the policy for the structure.

When a transition to simplex keeping the secondary structure is initiated, the structure is placed in the switching state (a subset of the Rebuild Duplex Established phase). The operating system then requests all of the active subsystem instances to again quiesce accesses to the data in the duplexed structure, so that a switchover to the secondary structure can be performed. (Once the switch has been requested, the duplexing rebuild process cannot be stopped.) When all subsystems confirm to the operating system that they have done this, via IXLREBLD DUPLEXCOMPLETE, the rebuild proceeds into the Rebuild Cleanup phase.

The duplexing rebuild process is not actually complete when an-individual connector invokes IXLREBLD to indicate duplexing rebuild complete. A connector is told that the duplexing rebuild process has completed when the duplexing rebuild process complete event has been presented to its event exit. Connectors are prevented from accessing the primary and secondary structures until the duplexing rebuild process complete event is presented because there is still the possibility of duplexing rebuild processing being terminated, which would cause the secondary structure to be deallocated and cause processing to continue using the primary structure.

On entry to the Rebuild Cleanup phase, the operating system informs the subsystem instances that the primary structure is no longer to be used, and when all subsystem instances confirm this to the operating system, the duplexing rebuild process is complete. The primary structure, which is no longer in use, is deallocated, leaving the former secondary structure in simplex mode as the only remaining structure instance. At this point, the operating system may be able to re-initiate a transition back to the duplexed state, if DUPLEX(ENABLED) is specified in the policy for the structure.

When a transition to simplex keeping the primary structure is initiated, the duplexing rebuild is stopped. All subsystem instances using the structure are requested by the operating system to quiesce accesses to the data in the duplexed. structure, so that a fallback to the primary structure can be performed. When all subsystems confirm to the operating system that they have done this, such that no accesses to the secondary structure are being performed or will be performed in the future by any user, the rebuild stop is completed. The new (secondary) structure, which is now no longer in use, is deallocated, leaving the former primary structure in simplex mode as the only remaining structure instance. At this point, the operating system may be able to re-initiate a transition back to the duplexed state, if DUPLEX(ENABLED) is specified in the policy for the structure.

In order to enter the Rebuild Cleanup Phase, connectors are presented a duplexing rebuild cleanup event. This event requires confirmation via IXLEERSP. Once all connectors have indicated that they have completed the duplexing rebuild process and XES begins notifying each connector via the rebuild cleanup event, the duplexing rebuild process cannot be stopped. If a duplexing rebuild stop request is initiated, the request is rejected with a reason code which indicates that the rebuild process cannot be stopped during the cleanup phase. If a start request is initiated, the request is rejected with a reason code which indicates that a rebuild request is already in progress. XES makes sure that no failure events that would require a new duplexing rebuild request to be initiated (new structure failure, loss of connectivity to the new structure) are presented to the connector during this window. The connector is notified of all failures that may occur in this window after the duplexing rebuild process complete event is presented. Additionally, XES no longer notifies the connector of any failures associated with the original structure (structure failure or loss of connectivity).

Before providing a response to the duplexing rebuild cleanup event, connectors should clean up all information in their control structures related to the primary structure. At this point, each connector should discard the temporary contoken and the old vector token (if applicable). The vector token returned on the rebuild connect is not temporary like the contoken and is used to access the structure after the rebuild has completed.

When a connector provides an event exit response to the duplexing rebuild cleanup event, XES purges outstanding requests; however, notification is only provided for synchronous requests where a unit of work has been suspended by XES. On completion of the IXLEERSP service, exits are only driven for activity against the newly rebuilt structure using the original contoken. The temporary contoken is no longer defined.

When all connections have provided an event exit response for the duplexing rebuild cleanup event, the connectors are presented the duplexing rebuild process complete event. All connections can resume normal usage of the structure in simplex mode. This is the end of the duplexing rebuild process.

When the duplexing rebuild process has completed, any failed-persistent connections which were not able to connect to the secondary structure during the rebuild process have been cleaned up. In order for a connection to be reconnected, the connection is to have previously been connected to the structure which is no longer the case for the set of failed-persistent connections.

In one embodiment, before a duplexing rebuild is to take place, a user is connected to a structure, such as a cache structure, via, for example, an operating system connection service, referred to as IXLCONN, which is described in further detail below. After connecting to a structure, a number of events may be reported to the connection. These events include, for instance:

(1) Rebuild Duplex Established—This event is presented when the secondary structure has been initialized to contain a copy of any necessary data in the primary structure.

(2) Switch Event—This event is initiated when a request has been made to transition from duplex mode to simplex mode, retaining the secondary structure instance. Once confirmed by all active connectors, via IXLREBLD DUPLEXCOMPLETE, the rebuild enters the rebuild cleanup phase.

(3) Rebuild Stop—This event is initiated when a request has been made to transition from duplex mode to simplex mode, retaining the primary structure instance.

(4) Rebuild Stop Process Complete—This event is presented to all connectors when rebuild stop processing is complete. Connectors are expected to resume normal usage of the primary structure in simplex mode.

Figure 7:
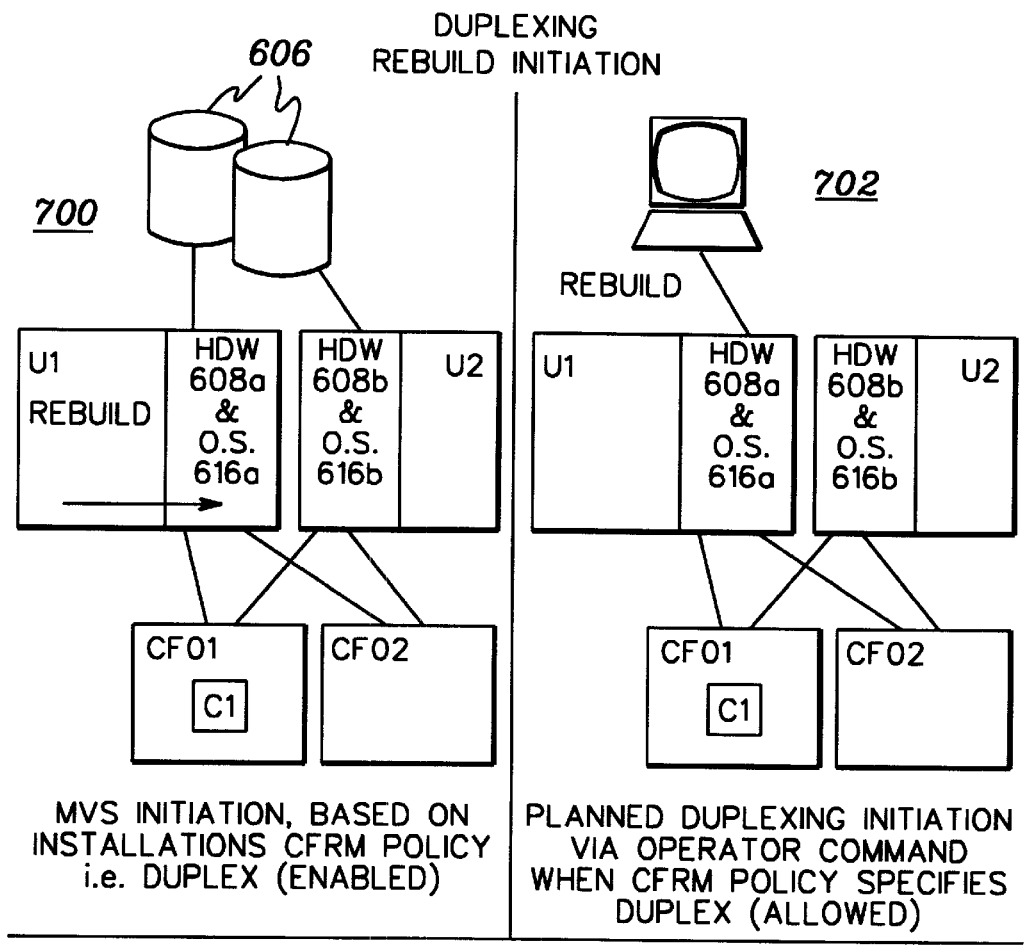
FIG. 7 depicts one example of an overview diagram demonstrating the manner in which duplexing rebuild initiation may be invoked, in accordance with the principles of the present invention.

In accordance with the principles of the present invention, the duplexing rebuild process is initiated to handle recovery from future failures. Thus, the installation specifies in the CFRM policy whether a structure should be duplexed or not. If the installation specifies DUPLEX(ENABLED) (see reference numeral 700 of FIG. 7), the operating system attempts to keep duplexing active and ready to recover from errors at all times. The operating system automatically initiates a duplexing rebuild in any of the following conditions, for example:

1. A policy change is initiated where the DUPLEX specification specified DUPLEX(ENABLED), when it previously specified ALLOWED or DISABLED;
2. A policy change that adds a coupling facility to the list of available coupling facilities in a duplex-enabled structure's preference list;
3. A duplexing rebuild completes or stops for a duplex-enabled structure, (this includes "reduplexing" of a structure when an error caused a stop or switch to occur in a previous duplexing rebuild); and
4. A new user connects to the structure, and the structure is not currently duplexed. (The additional connector may have altered the configuration of systems with connectors, as related to coupling facilities available for duplexing rebuild allocation, such that duplexing, if not already active, should be attempted again, as it may be more successful this time.)

For structures with CFRM policy specification of DUPLEX(ALLOWED) (see reference numeral 702 of FIG. 7), an operator manually initiates and re-initiates duplexing rebuilds, to allow recovery from errors.

As described above, a program or an operator may initiate the duplexing rebuild process. If an operator initiates the process, then, as one example, a SETXCF START REBUILD DUPLEX command is used. The SETXCF command can initiate structure duplexing rebuild processing for a single structure (or a list of structures), or initiate structure duplexing rebuild for all structures in a coupling facility. Structure duplexing rebuild processing may cause the specified structures to be duplexed at another location dynamically, with participation from connectors in the sysplex, which are connected to the target structure.

In one example, the SETXCF START, REBUILD, DUPLEX command has the following syntax (Some of the keywords listed below or in other macros herein, may be specified as required and others may be specified as optional. However, in another embodiment, the required keywords may not be requited.):

SETXCF START,REBUILD,DUPLEX,
    [,STRNAME=(strname[,strname] . . . )]
    [,CFNAME=(cfname[,cfname] . . . )]

Where:

CFNAME and STRNAME are mutually exclusive keywords.

STRNAME (strname{,strname} . . . ) specifies one or more coupling facility structures to be duplexed in, e.g., another coupling facility. If user-managed duplexing is not supported for the target structure, the duplexing operation is not started and the system issues a message to the operator.

CFNAME=(cfname{,cfname} . . . ) indicates one or more coupling facilities for which all structures are to be duplexed in, e.g., another coupling facility. The system attempts to start a duplexing operation for each structure that is currently allocated in the specified coupling facility. If structure duplexing is not supported for a particular structure, the system issues a message to the operator.

Figure 8:
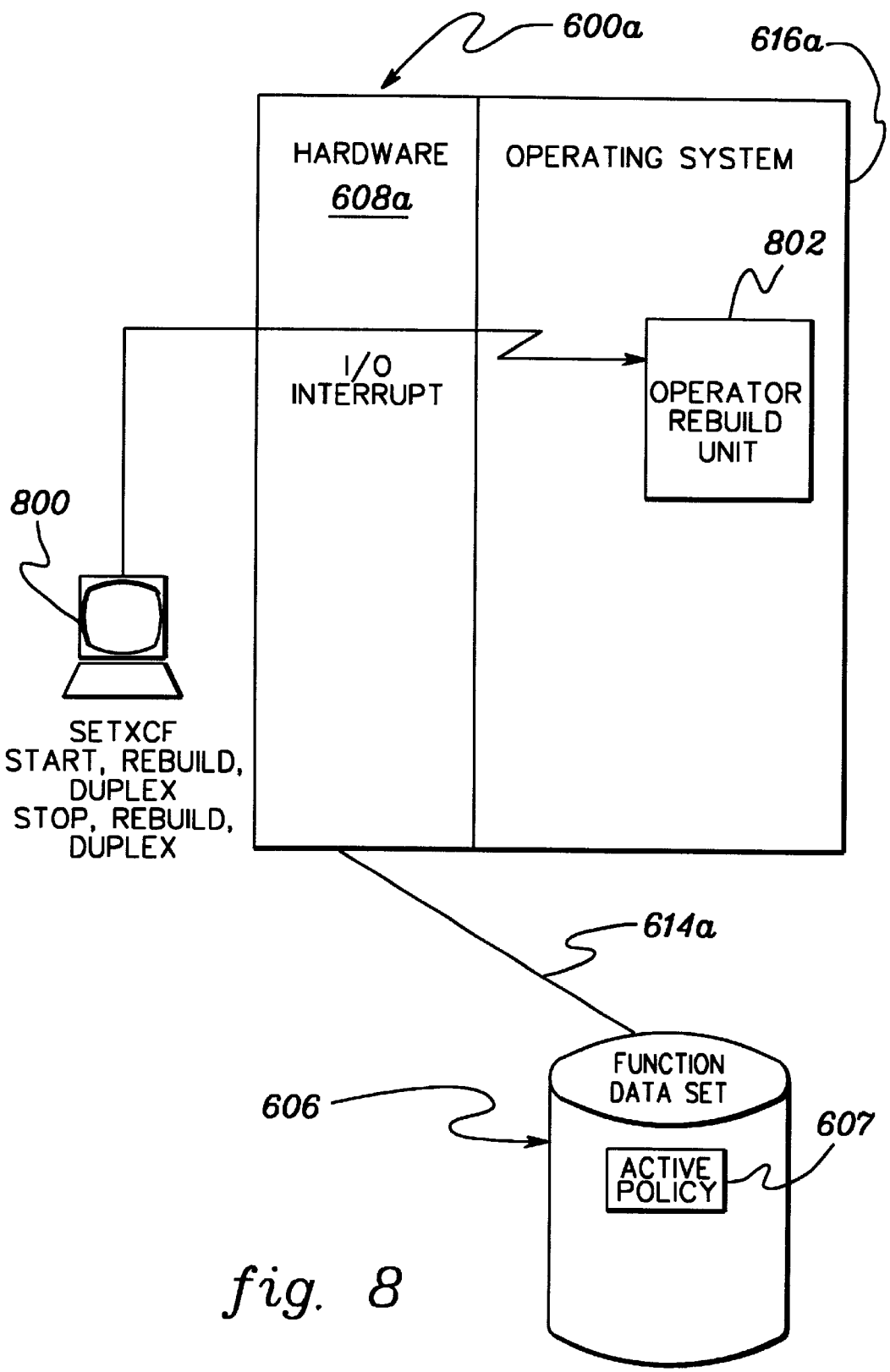
FIG. 8 illustrates one example of the SETXCF command for duplexing rebuild, in accordance with the principles of the present invention.

As shown in FIG. 8, when an operator enters the SETXCF START,REBUILD,DUPLEX command via a console 800, an I/O interrupt causes control to be passed to an operator rebuild unit 802 for initiating the rebuild process, as described below. Unit 802 is located within operating system 616a, which in turn is located within CPC 600a, along with hardware 608a. CPC 600a is coupled to function data set 606 via a link 614a. Function data set 606 includes active policy 607, which is used in the duplexing rebuild process as described herein.

Figure 9:
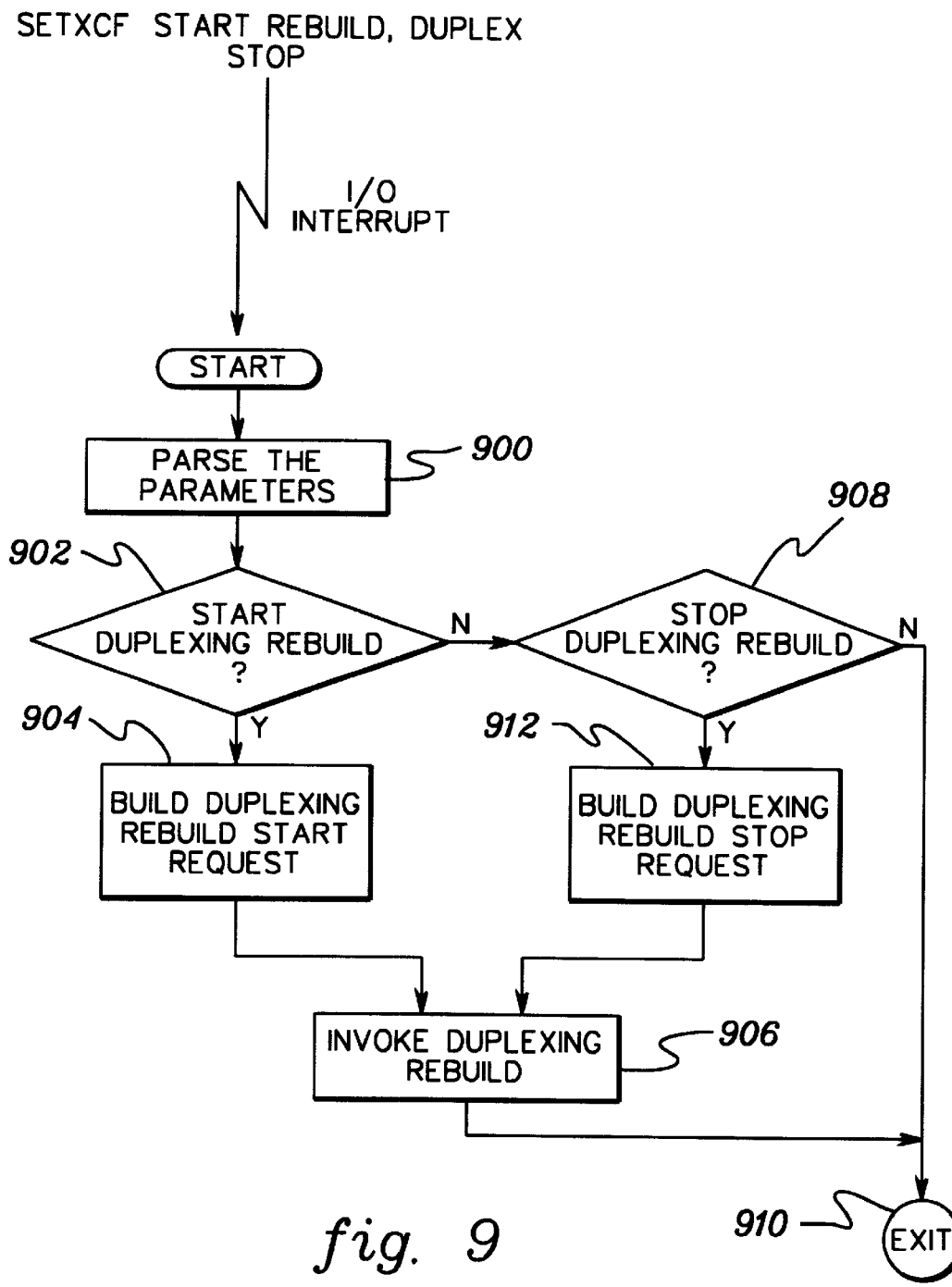
FIG. 9 depicts one embodiment of the logic associated with an operator duplexing rebuild routine, in accordance with the principles of the present invention.

One embodiment of the logic associated with an operator rebuild command is described in detail with reference to FIG. 9. For example, a SETXCF START,REBUILD, DUPLEX command causes an I/O interrupt to the operating system, which gives control to the start duplexing rebuild process. The parameters of the duplexing rebuild command are parsed in order to determine the attributes of the duplexing rebuild command, STEP 900 "PARSE THE PARAMETERS." Thereafter, a determination is made as to whether this is a start duplexing rebuild command, INQUIRY 902 "START DUPLEXING REBUILD?". If this is a start duplexing rebuild command, as indicated by the SETXCF REBUILD command, then a duplexing rebuild start request is built, STEP 904 "BUILD DUPLEXING REBUILD START REQUEST." In particular, an IXLREBLD macro is invoked.

One example of the syntax associated with IXLREBLD is described below:

```
IXLREBLD  REQUEST=STARTDUPLEX
              ,STRNAME=xstrname
              ,CFNAME=xcfname
              ,STARTREASON=CONNECTOR
                  [,USERCODE={xusercode|0}]
              ,STARTREASON=OPERATOR
          ,REQUEST=STOPDUPLEX
              ,STRNAME=xstrname
                 ,KEEP=NEW
                 ,KEEP=OLD
              ,CFNAME=xcfname
              ,IGNOREDUPLEX=NO
              ,IGNOREDUPLEX=YES
              ,STOPREASON=LOSSCONN
              ,STOPREASON=STRFAILURE
              ,STOPREASON=CONNECTOR
                  [,USERCODE=xusercode|0}]
              ,STOPREASON=OPERATOR
          ,REQUEST=DUPLEXCOMPLETE
              ,CONTOKEN=xcontoken
```

Where:
REQUEST({STARTDUPLEX|STOPDUPLEX|DUPLEX COMPLETE}) is a required keyword input which identifies the type of duplexing rebuild request.
REQUEST(STARTDUPLEX)—Start a duplexing rebuild for the specified structure name or the structures within the specified coupling facility.
  The following is a set of mutually exclusive keys. This set is required; only one key must be specified.
  STRNAME(xstrname) is the name of a structure to be duplexed or an address of a register that specifies the name of a structure to be duplexed.
  CFNAME(xcfname) is the name of a coupling facility that specifies the name of a coupling facility in which the structures are to be duplexed. Structure duplexing should be attempted for each structure allocated in the target facility.
  End of a set of mutually exclusive required keys.
  STARTREASON({CONNECTOR|OPERATOR}) is a required keyword input which indicates the reason for initiating duplexing rebuild processing.
  STARTREASON(CONNECTOR) specifies that the connector had an application specific reason for initiating the duplexing rebuild.
    {USERCODE({xusercode|0})] is the name of an optional input that specifies a user code which represents the connector's reason for initiating the duplexing rebuild. DEFAULT=0
  STARTREASON(OPERATOR) specifies that duplexing rebuild was initiated by an operator command.
REQUEST(STOPDUPLEX) Stop duplexing rebuild for the specified structure name or for the structures within the specified coupling facility, as desired.
  The following is a set of mutually exclusive keys. This set is required; only one key must be specified.
  STRNAME(xstrname) is the name of a structure in which duplexing is to be stopped or an address of a register that specifies the structure name for which duplexing rebuild is to be stopped.
  KEEP=NEW|OLD is a required keyword input that specifies which structure should remain after the duplexing rebuild has been stopped.
    KEEP=NEW specifies that duplexing rebuild should stop to switch to the secondary structure.

KEEP=OLD specifies that duplexing rebuild should stop to fall back to the primary structure.

CFNAME(xcfname) is the name of a coupling facility in which duplexing is to be stopped for each structure allocated in the target facility.

A STOPDUPLEX with KEEP(OLD) is initiated for each structure that is currently in duplexing rebuild with the secondary structure allocated in the specified coupling facility.

A STOPDUPLEX with KEEP(NEW) is initiated for each structure that is currently in duplexing rebuild with the primary structure allocated in the specified coupling facility.

End of a set of mutually exclusive required keys.

IGNOREDUPLEX=NO|YES is an optional keyword input that indicates whether the CFRM active policy DUPLEX specification should be used or not to restart a duplexing rebuild at the completion of the stop processing. In certain situations, if the CFRM active policy indicated DUPLEX(ENABLED), the operating system automatically restarts a duplexing rebuild when the duplexing rebuild completes or is stopped. DEFAULT:NO IGNOREDUPLEX=NO specifies that the CRFM active policy DUPLEX specification should not be ignored. The operating system automatically restarts duplexing rebuild, if appropriate.

IGNOREDUPLEX=YES specifies that the CRFM active policy DUPLEX specification should be ignored. The operating system does not automatically restart duplexing rebuild. This does not prevent a duplexing rebuild from being started at any point after the stop completion processing, however. The policy DUPLEX (ENABLED) specification should be changed to DUPLEX(DISABLED or ALLOWED), if the automatic initiation of duplexing by the operating system is not desired.

End of a set of mutually exclusive required keys.

STOPREASON ({LOSSCON|STRFAILURE|CONNECTOR|OPERATOR}) is a required keyword input which indicates the reason for stopping the duplexing rebuild processing.

STOPREASON (LOSSCONN) specifies that a loss of connectivity to the structure was the reason for stopping the duplexing rebuild process.

STOPREASON(STRFAILURE) indicates that a structure failure for the structure was the reason for stopping the duplexing rebuild process.

STOPREASON(CONNECTOR) specifies that the connector had an application specific reason for stopping the duplexing rebuild process.

[USERCODE ({xusercode|0})] is the name of an optional fullword input that specifies a user code which represents the connector's reason for stopping the duplexing rebuild process. DEFAULT:0

STOPREASON(OPERATOR) specifies that duplexing rebuild processing was stopped because of an operator command.

REQUEST(DUPLEXCOMPLETE) indicates that duplexing rebuild switch processing is complete for the specified connection and the connector is ready to go forward with the secondary structure.

CONTOKEN(xcontoken) is the name of an input field that specifies the connect token of the responding connection.

Returning to FIG. 9, and in particular, to STEP 904, subsequent to building the start request, a duplexing rebuild service is invoked, STEP 906 "INVOKE DUPLEXING REBUILD", as described below.

Returning to INQUIRY 902 "START DUPLEXING REBUILD?", if this is not a start duplexing rebuild request, then a further determination is made as to whether the SETXCF REBUILD command indicated a stop duplexing rebuild, INQUIRY 908 "STOP DUPLEXING REBUILD?". If this is neither a start or stop duplexing rebuild command, then the operator rebuild command is complete, STEP 910 "EXIT." Otherwise, if this is a stop duplexing rebuild request, then a duplexing rebuild stop request is built, STEP 912 "BUILD DUPLEXING REBUILD STOP REQUEST." Similar to building the duplexing rebuild start, duplexing rebuild stop is built by invoking the rebuild macro, described above. Subsequently, a duplexing rebuild service is invoked, STEP 906. After invoking the duplexing rebuild service, the operator duplexing rebuild command is complete, STEP 910. "EXIT."

The duplexing rebuild service, which is invoked at STEP 906 during the operator command, or by a program, is given control from the IXLREBLD macro. The IXLREBLD macro allows duplexing rebuild processing to start for one or more structures in a facility, to stop for one or more structures in a facility or to complete duplexing rebuild processing.

One embodiment of the logic associated with a duplexing rebuild service (which also includes other rebuild services) is described in detail with reference to FIGS. 10a–10m. Initially, a determination is made as to whether the rebuild service was initiated by an implicit entry request, INQUIRY 1000 "REBUILD IMPLICIT ENTRY?". In particular, a check is made to see if an indicator is set in a rebuild parameter list, or whether the entry point of the rebuild module indicated an implicit entry. If a rebuild implicit entry request was not made, then the active policy is read and locked from the function data set, STEP 1001 "READ AND LOCK THE ACTIVE POLICY (AP) FROM FUNCTION DATA SET." In one example, the data set is read and locked via, for example, the procedure described in U.S. Pat. No. 5,305,448 for "Shared Access Serialization Featuring Second Process Lock Steal And Subsequent Write Access Denial To First Process" by Insalaco et al (Attorney Docket No. P09-88-007), issued on Apr. 19, 1994, which is hereby incorporated herein by reference in its entirety. Subsequently, or if there was a rebuild implicit entry request, then a further determination is made as to whether the structure to participate in rebuild is specified in the active policy, INQUIRY 1002 "STRUCTURE SPECIFIED IN AP?".

Should the structure not be specified in the active policy, then processing of the rebuild service ends, STEP 1003 "EXIT." Otherwise, processing continues and a determination is made as to whether the structure is allocated as indicated by the coupling facility data of the active policy, INQUIRY 1004 "STRUCTURE ALLOCATED?".

If the structure is not allocated, then once again processing ends, STEP 1003 "EXIT." However, if the structure is allocated, then a determination is made as to whether this is a rebuild start request, INQUIRY 1005, "REBUILD START REQUEST?". Should this be a rebuild start request, then a check is made to determine if the rebuild is a duplexing rebuild, INQUIRY 1006 "DUPLEXING REBUILD?". Should a duplexing rebuild be requested, the CFRM policy is checked to determine if duplexing is ALLOWED or ENABLED, INQUIRY 1007. If neither ALLOWED or ENABLED is specified, then an error code is generated, STEP 1008 and the request ends, STEP 1009.

If, however, the policy indicates either ALLOWED or ENABLED, then a determination is made as to whether the rebuild is permitted, INQUIRY 1010. Similarly, if duplexing rebuild is not requested, INQUIRY 1006, then a determination is made as to whether the rebuild is permitted. If the rebuild is not permitted, then processing of the rebuild service ends, STEP 1003 "EXIT". However, if rebuild is permitted, as indicated by information saved in the active policy from the connect service, then a further determination is made as to whether a duplexing rebuild is being started, INQUIRY 1011. If a duplexing rebuild is being started, then a further check is made as to whether duplexing rebuilds are permitted by all connectors to the structure, INQUIRY 1012. (Note that should a user attempt to use the IXLCONN service, indicating that its application supports duplexing rebuild (i.e., AllowDupRebld=YES), but does not specify TYPE=CACHE, the AllowDupRebld specification is ignored and the default of NO is used. This allows the checking performed at INQUIRY 1012 to prevent duplexing rebuilds for other structure types, such as list and lock structures.) If duplexing rebuild is not permitted by all the connectors, then processing continues with STEP 1008. An error is generated, STEP 1008, and the request ends, STEP 1009.

However, if duplexing rebuild is permitted by all the connectors, or if duplexing rebuild is not being started, INQUIRY 1011, then processing continues, as described herein. In particular, a determination is made as to whether a rebuild stop is in progress, INQUIRY 1013 "REBUILD STOP IN PROGRESS?". If a rebuild stop is in progress, then processing of the rebuild service ends, STEP 1003 "EXIT." Otherwise, another inquiry is made to determine if rebuild is already in progress for the structure, INQUIRY 1014 (FIG. 10*b*) "REBUILD IN PROGRESS?". Should rebuild already be in progress, then processing of the rebuild service ends, STEP 1015 "EXIT."

Should rebuild not be in progress for the structure, and there are no active users, INQUIRY 1016 "ANY ACTIVE USERS?", then processing of the rebuild service ends. However, if there are active users, then a confirm string, based on the active users to respond, is built in the status area of the active policy, STEP 1017 "BUILD CONFIRM STRING BASED ON ACTIVE USERS TO RESPOND." Thereafter, an indication is made in the structure record status area, specifying that the quiesce phase of the rebuild service is in progress, STEP 1018 "INDICATE REBUILD IN PROGRESS: QUIESCE PHASE." Subsequently, a determination is made as to whether duplexing rebuild is requested, INQUIRY 1019. If duplexing rebuild has been initiated, then an indication of duplexing rebuild is saved, STEP 1020. Thereafter, or if duplexing rebuild is not requested, then the notification of rebuild quiesce is initiated, STEP 1021. This indication contains an indication of the type of rebuild. Notification of the quiesce phase is initiated via, for instance, a rebuild event notification routine.

Figure 11:
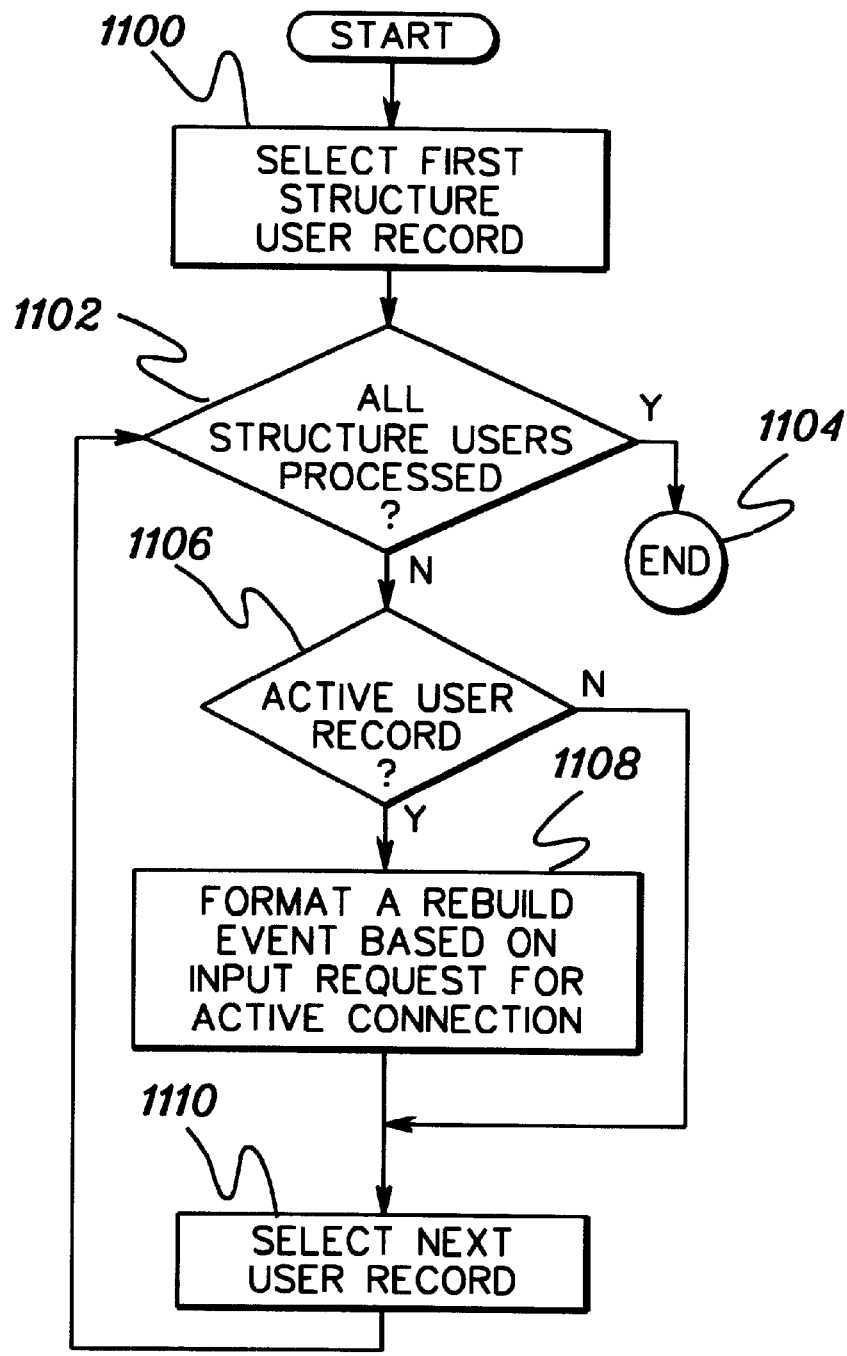
FIG. 11 illustrates one embodiment of the logic associated with a rebuild event notification routine, in accordance with the principles of t he present invention.

One embodiment of the logic associated with a rebuild event notification routine is explained in detail with reference to FIG. 11. Initially, the first structure user record from the active policy is selected, STEP 1100 "SELECT FIRST STRUCTURE USER RECORD." Thereafter, a determination is made as to whether all of the structure users have been processed, INQUIRY 1102 "ALL STRUCTURE USERS PROCESSED?". If all of the structure users have been processed, then processing of the rebuild event notification routine is ended, STEP 1104 "END." Otherwise, a further determination is made as to whether the user record is active, as indicated in the active policy, INQUIRY 1106 "ACTIVE USER RECORD?". Should the user record be active, then a rebuild event based on input requests for an active connection is formatted, STEP 1108. In particular, a parameter list is built using the input request, such as, for instance, rebuild quiesce. The parameter list is passed to the event exits, as described herein. Subsequently, or if the user record is not active, the next user record is selected, STEP 1110 "SELECT NEXT USER RECORD" and flow passes to INQUIRY 1102 "ALL STRUCTURE USERS PROCESSED?".

Returning to FIG. 10*b* and, in particular, to STEP 1021 "INITIATE NOTIFICATION OF REBUILD QUIESCE", after initiating notification, an inquiry is made into whether the rebuild service was invoked by a rebuild implicit entry, INQUIRY 1022 "REBUILD IMPLICIT ENTRY?". Should a rebuild implicit entry be made, then processing of the rebuild service ends, STEP 1015 "EXIT." Otherwise, the active policy is written to the function data set and the function data set is unlocked, STEP 1023. One embodiment of the write and unlock process is described in U.S. Pat. No. 5,305,448 for "Shared Access Serialization Featuring Second Process Lock Steal And Subsequent Write Access Denial To First Process" by Insalaco et al, issued on Apr. 19, 1994, hereby incorporated herein by reference in its entirety.

Figure 10A:
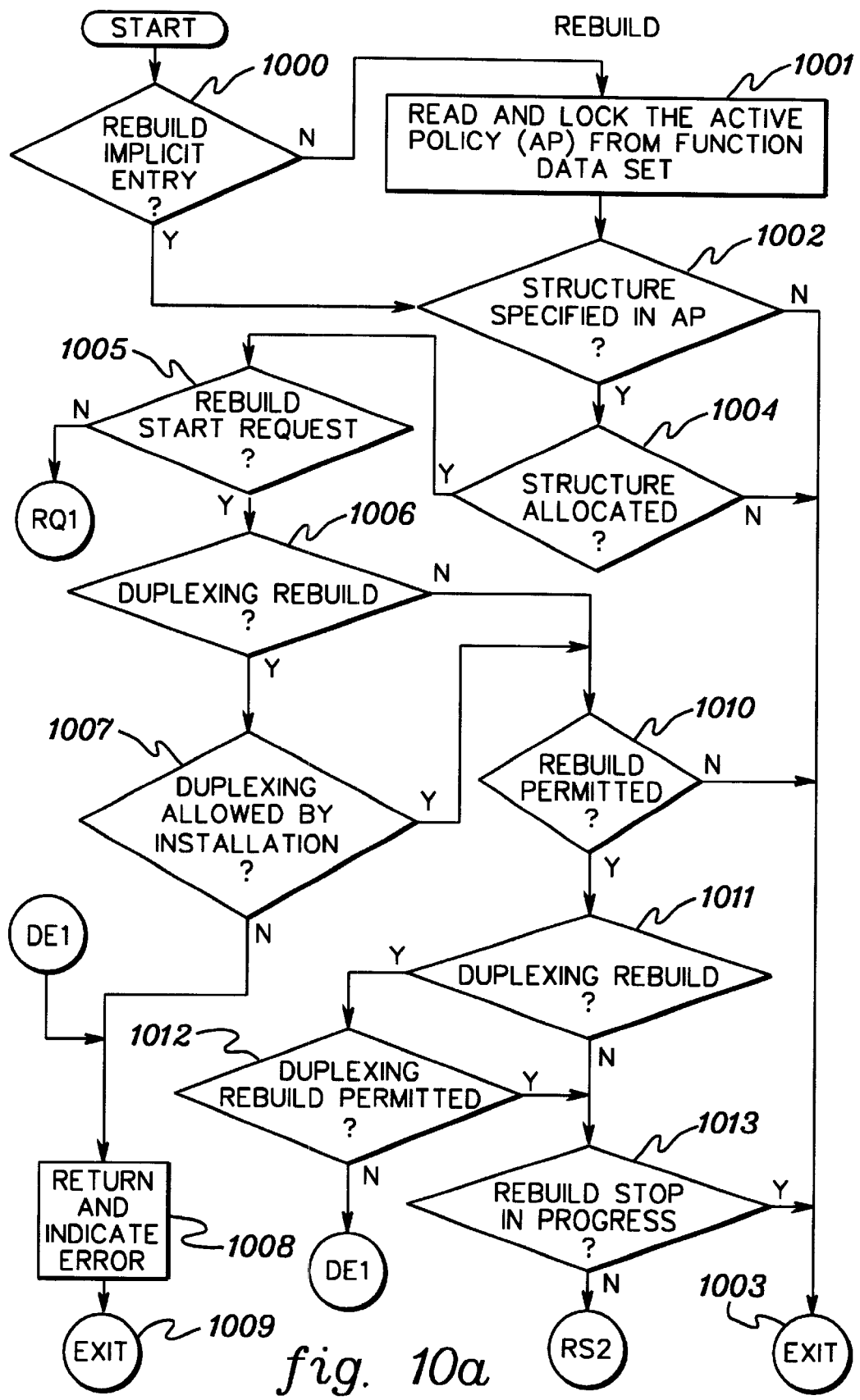
FIGS. 10a–10m depict one embodiment of the logic associated with a rebuild service, which supports the duplexing rebuild capability in accordance with the principles of the present invention.

Returning to INQUIRY 1005 of FIG. 10*a*, if a rebuild start request was not initiated, then a determination is made as to whether quiesce was confirmed by the responding user via an event exit response, described below, INQUIRY 1024 (FIG. 10*c*) "CONFIRM QUIESCE?". If quiesce was confirmed, then the confirm string for the responding user is updated, STEP 1025, and another determination is made as to whether all active users have responded, INQUIRY 1026, "ALL ACTIVE USERS RESPONDED?". If all the active users have responded, then an indication is made in the structure record in the active policy, indicating that a rebuild quiesce sync point has been reached, STEP 1027. Subsequently, the rebuild phase specified in the structure record is updated to indicate that it is now in the connect phase, STEP 1028 "UPDATE REBUILD PHASE: CONNECT PHASE." Additionally, the confirm string, based on active users to respond, is built, STEP 1029, and notification of rebuild connect is initiated, STEP 1030, as described above.

Subsequent to initiating notification of rebuild connect, or if all of the active users have not responded, INQUIRY 1026, then processing continues with INQUIRY 1022 (FIG. 10*b*) "REBUILD IMPLICIT ENTRY?".

Returning to INQUIRY 1024 (FIG. 10*c*) "CONFIRM QUIESCE?", if quiesce is not confirmed, then a further determination is made as to whether the rebuild service was invoked to report processing is complete, INQUIRY 1031 (FIG. 10*d*) "REBUILD COMPLETE?". Should rebuild processing be complete, then the confirm string entry associated with the rebuild complete caller is updated, STEP 1032, and a determination is made as to whether rebuild is complete for all active users, INQUIRY 1033 "ALL ACTIVE USERS REBUILD COMP.?". If rebuild is complete for all active users, then a determination is made as to whether this is a duplexing rebuild, INQUIRY 1034.

Figure 10B:
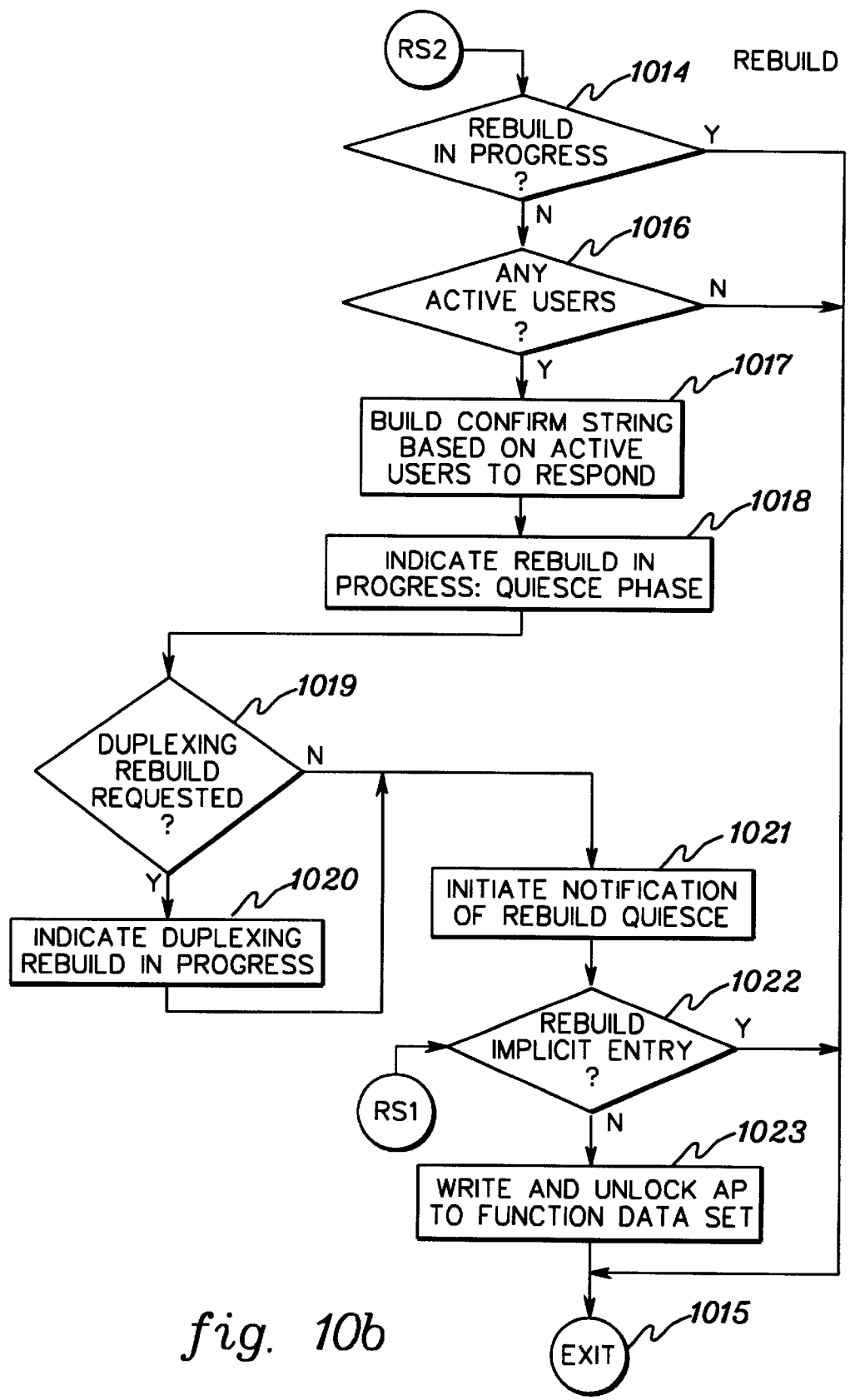
Figure 10C:
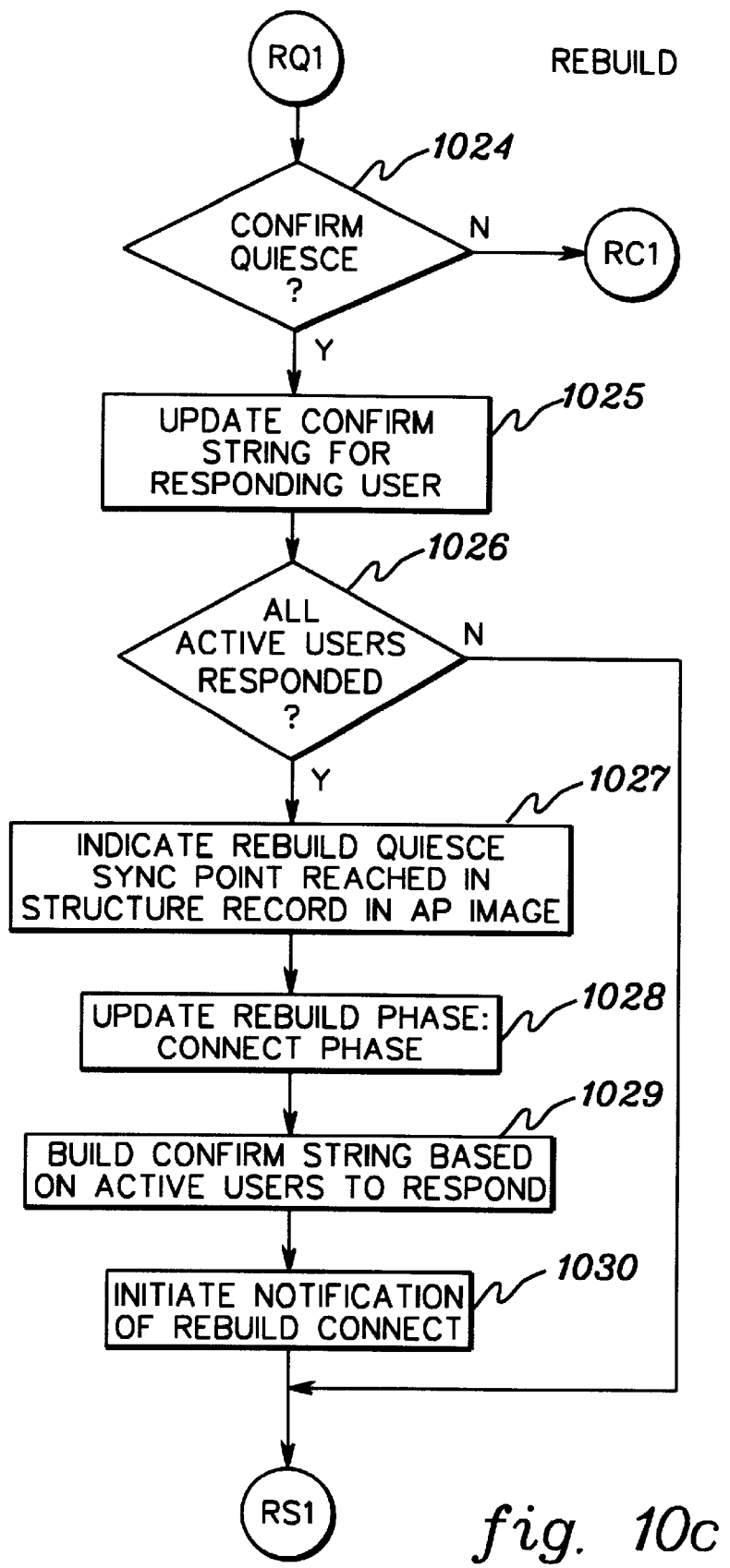
Figure 10D:
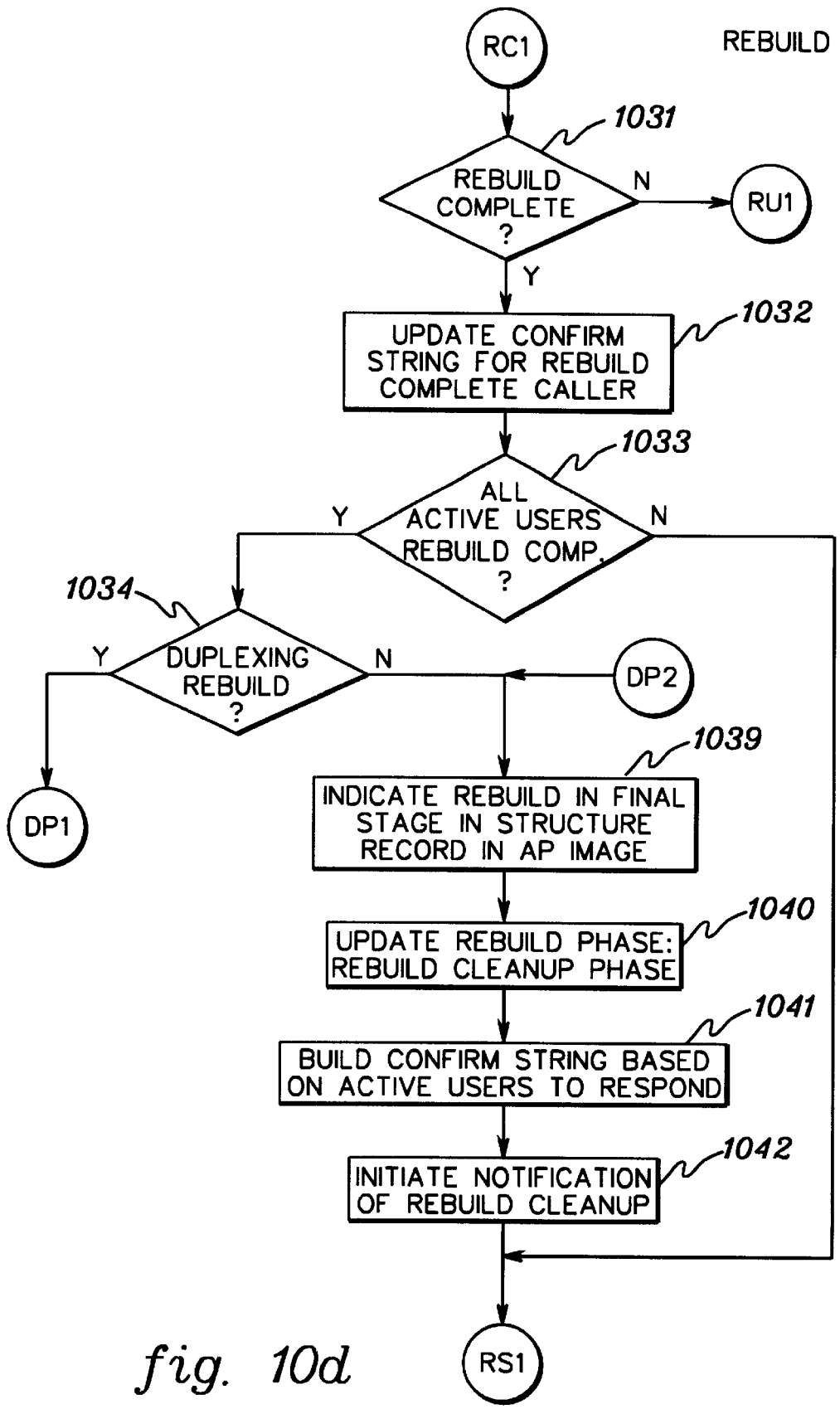
Figure 10E:
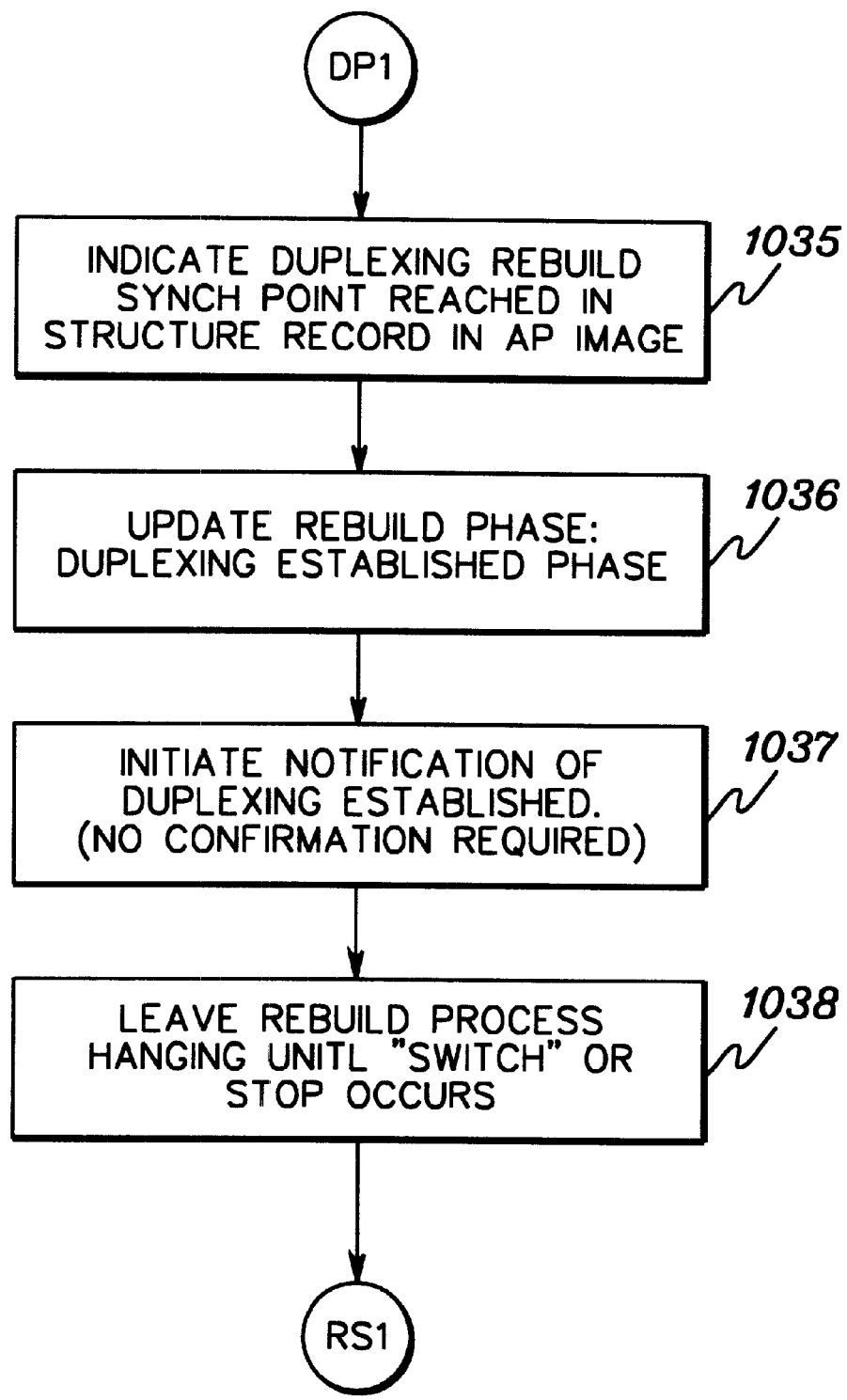
Figure 10F:
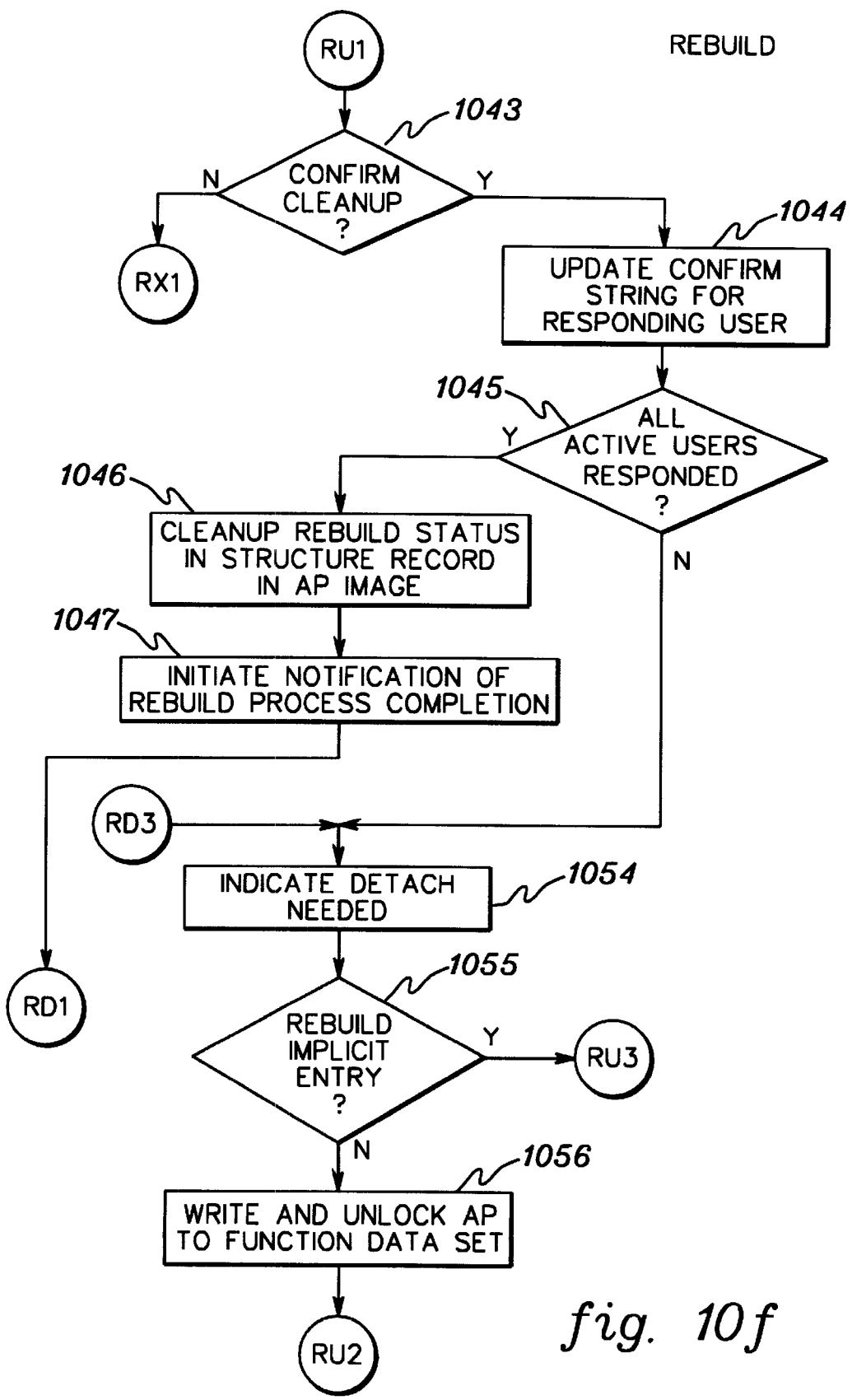

Should the rebuild be a duplexing rebuild, then the CFRM policy is updated with an indication that the rebuild complete synch point was reached, STEP 1035 (FIG. 10*e*). Further, the rebuild phase is updated to move to the Duplex Established phase, STEP 1036.

Thereafter, notification of the Duplex Established phase is initiated to inform users that the Duplexing Established phase has been reached, STEP 1037. Duplexing rebuild persists in that state until it is stopped or switched, STEP 1038. The stopping or switching may occur due to an operator initiated command or an error on one of the structures, one of the coupling facilities containing the structures, or the physical connectivity to the coupling facilities. The switching or stopping may be triggered automatically by the operating system. Processing then continues with INQUIRY 1022 of FIG. 10*b*.

Returning to INQUIRY 1034 (FIG. 10*d*), if the rebuild is determined not to be a duplexing rebuild, then an indication is made in the structure record in the active policy image that rebuild is in the final stage, STEP 1039. Thereafter, the rebuild phase is updated, indicating the rebuild cleanup phase, STEP 1040 "UPDATE REBUILD PHASE: REBUILD CLEANUP PHASE."

Subsequently, the confirm string, based on active users to respond, is built, STEP 1041, and notification of rebuild cleanup is initiated via the rebuild event notification, described above, STEP 1042 "INITIATE NOTIFICATION OF REBUILD CLEANUP." Thereafter, or if rebuild is not complete for all active users, INQUIRY 1033, processing passes to INQUIRY 1022 "REBUILD IMPLICIT ENTRY?" (FIG. 10*b*).

Returning to INQUIRY 1031 (FIG. 10*d*), "REBUILD COMPLETE?", if rebuild processing is not complete, then a determination is made as to whether the active user has confirmed cleanup via an event exit response, INQUIRY 1043 (FIG. 10*f*) "CONFIRM CLEANUP?". If the responding user has confirmed cleanup, then the confirm string entry for the responding user is updated, STEP 1044 "UPDATE CONFIRM STRING FOR RESPONDING USER", and a further determination is made as to whether all active users have responded, INQUIRY 1045 "ALL ACTIVE USERS RESPONDED?". If all of the active users have responded, then the rebuild status in the structure record in the active policy image is cleaned up, STEP 1046, and notification of rebuild process completion is initiated, STEP 1047 "INITIATE NOTIFICATION OF REBUILD PROCESS COMPLETION."

Figure 10G:
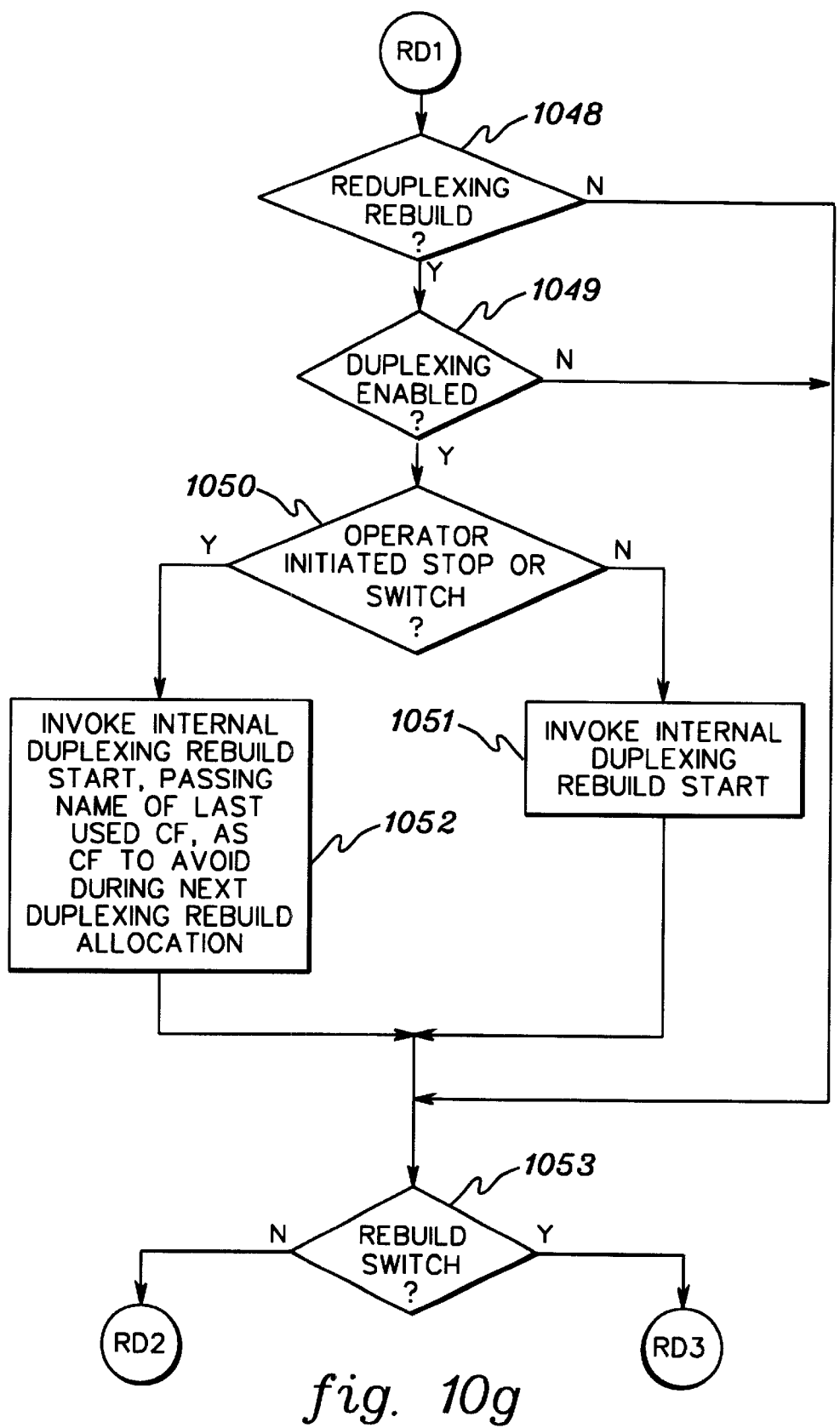
Figure 10H:
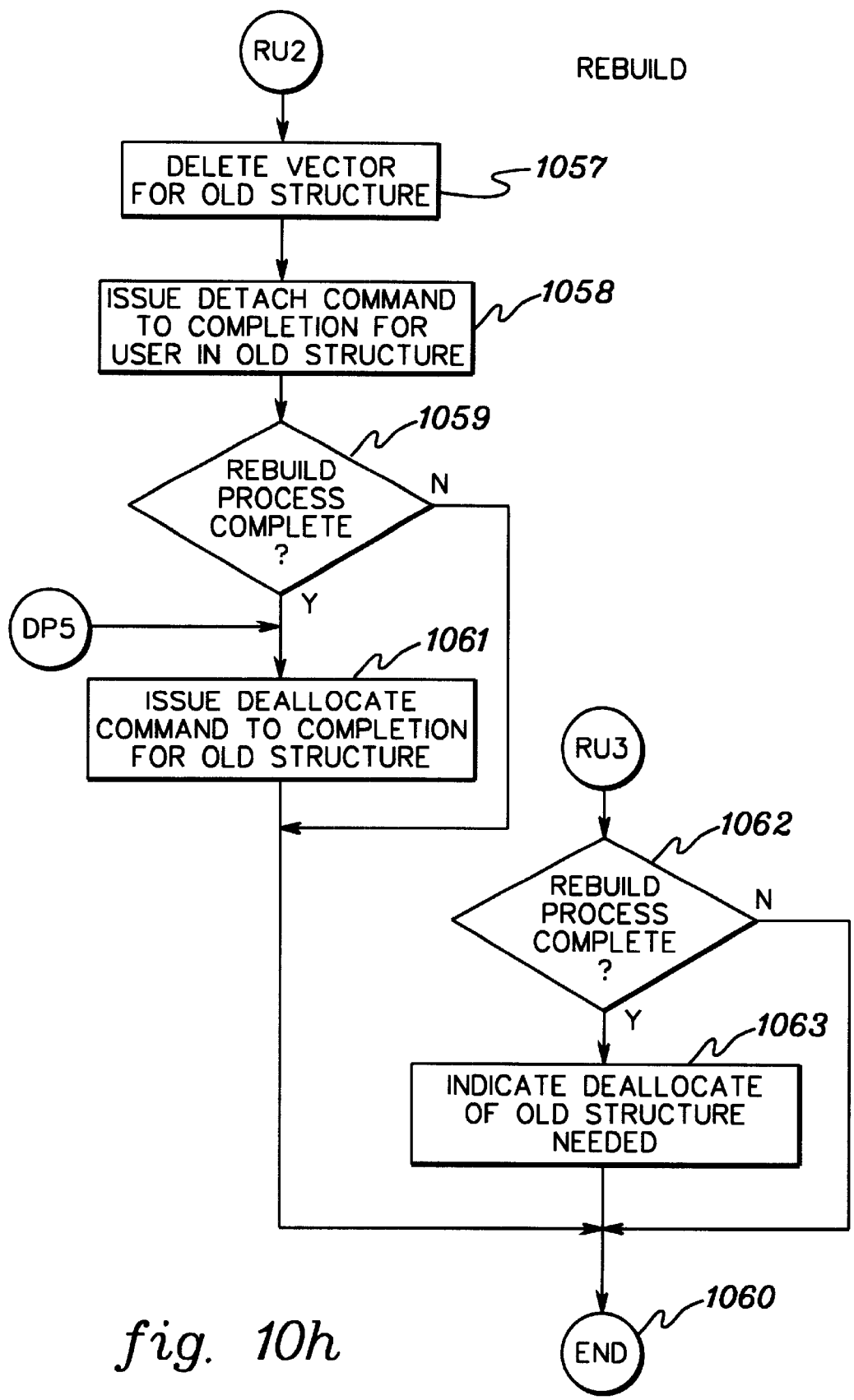

Since a duplexing rebuild process can be reentered, enabling the system to be ready to recover from the next error, a determination is made as to whether the rebuild that is completing is a rebuild for which reduplexing is to be performed, INQUIRY 1048 (FIG. 10*g*). If the completing rebuild is a duplexing rebuild, then a further determination is made as to whether the installation specified DUPLEX (ENABLED), INQUIRY 1049. Should DUPLEX (ENABLED) be specified in the CFRM active policy, then the reason associated with the stop/switch is interrogated, INQUIRY 1050. If the reason is not due to an operator initiated command, internal rebuild processing is invoked to start a new duplexing rebuild for that structure, STEP 1051. If, however, the reason is due to an operator initiated command, the internal rebuild processing is invoked and the coupling facility name of the last used coupling facility is passed to it, STEP 1052. This coupling facility will be avoided during allocation processing, which provides the installation with a way to remove all structures from a coupling facility, without having the automatic duplexing process place the structure back in the coupling facility. The duplexing rebuild initiated by the reduplexing process is stopped if another appropriate coupling facility (besides the last used coupling facility) cannot be found.

Once a new duplexing rebuild has been initiated, or DUPLEXING(ENABLED) is not specified, INQUIRY 1049, or a decision not to reduplex has been made, INQUIRY 1048, processing proceeds to INQUIRY 1053, where a correct return is generated based on the type of rebuild completion that was occurring. In particular, if this was not a rebuild switch, INQUIRY 1053, then processing continues with STEP 1092 of FIG. 10*k*, to be described below. If, however, the rebuild is a rebuild switch, INQUIRY 1053, then an indication is made in the active policy that detach is needed for the secondary structure, STEP 1054 "INDICATE DETACH NEEDED" of FIG. 10*f*. Similarly, such an indication is made, when all of the active users have not responded, INQUIRY 1045.

After indicating detach is needed, STEP 1054, an inquiry is made into whether entry into the rebuild service was an implicit entry, INQUIRY 1055 "REBUILD IMPLICIT ENTRY?". Should the entry into rebuild processing not be an implicit entry, the active policy is written to the function data set and the function data set is unlocked, STEP 1056 "WRITE AND UNLOCK AP TO FUNCTION DATA SET." Subsequently, a vector associated with the secondary structure is deleted, STEP 1057 (FIG. 10*h*) "DELETE VECTOR FOR OLD STRUCTURE" and a detach command is processed to completion for the user in the secondary structure, STEP 1058. In particular, a detach-local-cache command is issued to atomically remove the identification of a local cache to a coupling facility cache and to free the specified local-cache identifier. One embodiment of a detach-local-cache command is described in detail in U.S. Pat. No. 5,515,499 for "Method And System For Reconfiguring A Storage Structure Within A Structure Processing Facility" by Allen et al., issued on May 7, 1996, which is hereby incorporated herein by reference in its entirety.

Subsequent to completing the detach user command, a determination is made as to whether the rebuild process is complete, INQUIRY 1059 "REBUILD PROCESS COMPLETE?". In particular, a check is made to see if all users have responded with a confirm cleanup. If all users have not responded and the rebuild process is not complete, then processing of the rebuild service ends, STEP 1060 "END." However, if rebuild processing is complete, then a deallocate command is processed to completion for the secondary structure, STEP 1061 "ISSUE DEALLOCATE COMMAND TO COMPLETION FOR OLD STRUCTURE." In particular, the cache structure is deallocated. One embodiment of deallocating a structure is described in detail in U.S. Pat. No. 5,515,499 for "Method And System For Reconfiguring A Storage Structure Within A Structure Processing Facility" by Allen et al., issued on May 7, 1996, which is hereby incorporated herein by reference in its entirety. Subsequent to completing the deallocate command, processing of the rebuild service is complete, STEP 1060 "END."

Returning to FIG. 10*f*, and in particular, to INQUIRY 1055 "REBUILD IMPLICIT ENTRY?", if this is an implicit entry, then a determination is made as to whether the rebuild process is complete, INQUIRY 1062 (FIG. 10*h*) "REBUILD PROCESS COMPLETE?". If rebuild processing is not complete, then processing of the rebuild service ends, STEP 1060. Otherwise, an indication of deallocation is made in the active policy for the old structure, STEP 1063, and processing of the rebuild service ends, STEP 1060.

Returning to INQUIRY 1043 (FIG. 10*f*) "CONFIRM CLEANUP?", if cleanup was not confirmed by a responding user, then a determination is made as to whether this is a rebuild stop request, INQUIRY 1064 (FIG. 10*i*) "REBUILD STOP REQUEST?". Should this be a rebuild stop request, then a determination is made as to whether the rebuild phase was earlier than the cleanup phase, INQUIRY 1065 "REBUILD PHASE EARLIER THAN CLEANUP?" If the rebuild phase is not earlier than the cleanup phase, then processing of the rebuild service is complete, STEP 1066 "EXIT."

Otherwise, a check is performed to determine if a duplexing rebuild is in progress, INQUIRY 1067. If a duplexing rebuild is not in progress, then the structure record in the active policy image for the rebuild process is updated to indicate that the rebuild process is being ended, STEP 1068, and a rebuild stop reason is placed in the structure record of the active policy image, STEP 1069.

Thereafter, the confirm string, based on active users to respond, is built in the status area of the structure record, STEP 1070, and the. rebuild phase is updated, indicating the stop phase, STEP 1071 "UPDATE REBUILD PHASE: STOP PHASE." Thereafter, a notification of rebuild stop is initiated via rebuild event notification, described above, STEP 1072, and flow passes to INQUIRY 1022 "REBUILD IMPLICIT ENTRY?" (FIG. 10b).

Figure 10I:
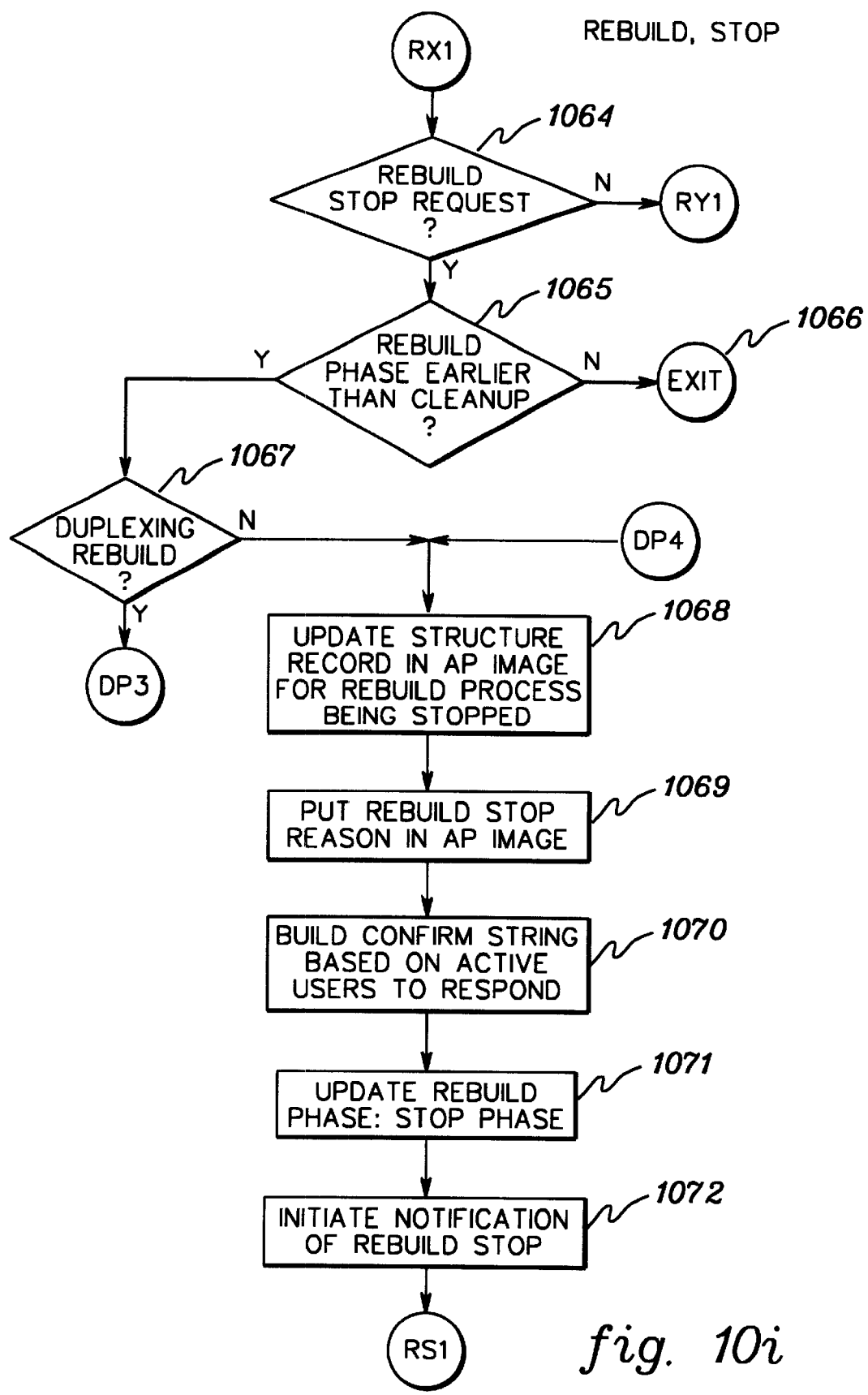
Figure 10J:
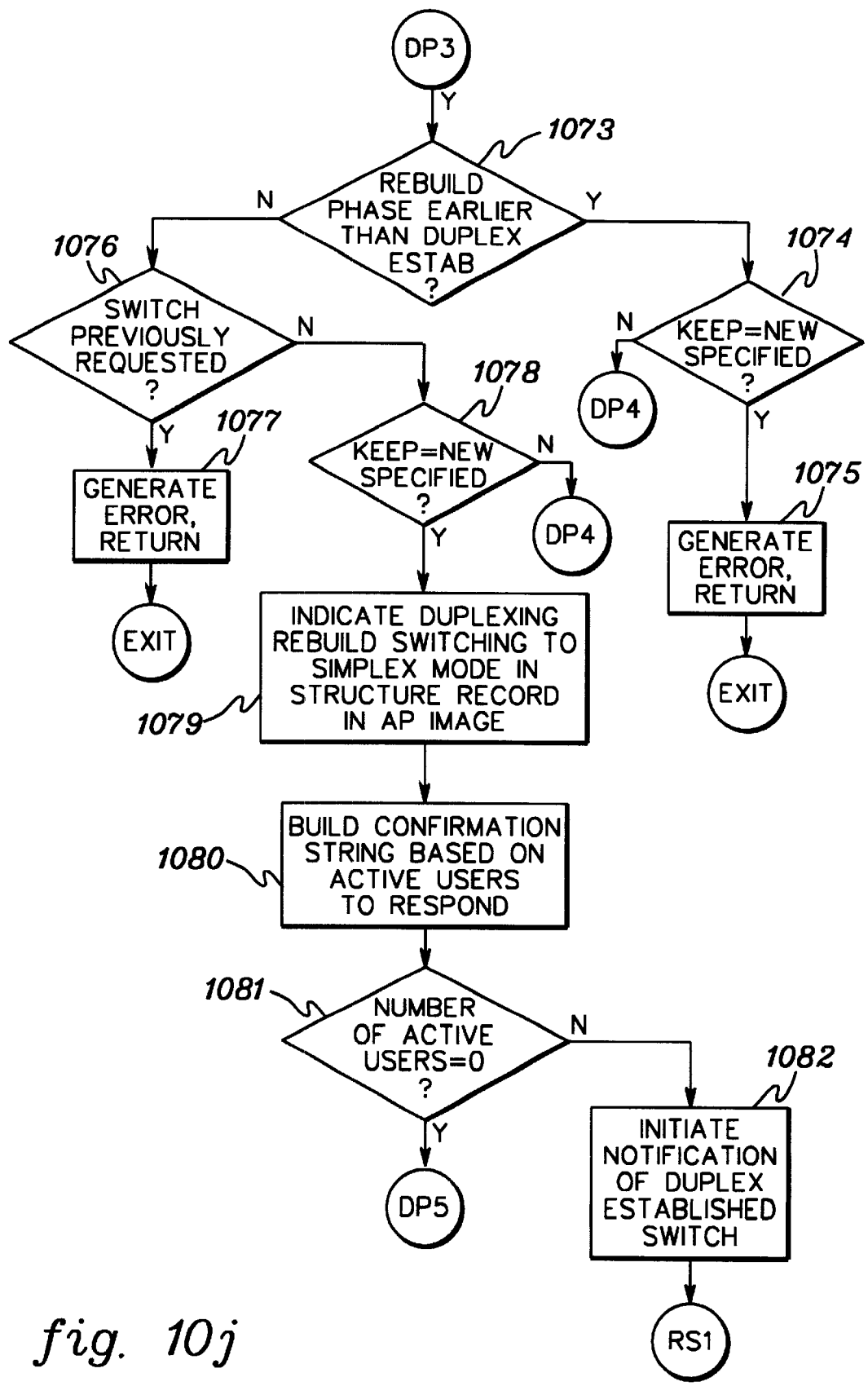

Returning to INQUIRY 1067 of FIG. 10i, if a duplexing rebuild is in process, then a determination is made as to whether the rebuild is in a rebuild phase earlier than the established phase, INQUIRY 1073 (FIG. 10j). If the rebuild is in a phase earlier than the duplex established phase, then a check is made to see whether KEEP=NEW is specified, INQUIRY 1074. If KEEP=NEW is specified, then an error return code is generated, STEP 1075, and processing is complete. However, if KEEP=NEW is not specified, then processing continues with STEP 1068 of FIG. 10i.

Returning to INQUIRY 1073 of FIG. 10j, if the rebuild is not in a phase earlier than the duplex established phase, then a further determination is made as to whether a switch was previously requested, INQUIRY 1076. If a switch has been previously requested, then an error code is generated, STEP 1077, and no further processing is done with this request. Otherwise, it is possible to perform a stop or a switch to switch to the new structure instance and leave the duplexing rebuild process. Thus, a determination is made as to whether the KEEP parameter specifies NEW, INQUIRY 1078. If the KEEP parameter equals OLD or is defaulted to, then processing continues with STEP 1068 of FIG. 10i. On the other hand, if KEEP=NEW is specified, then the switch process occurs. For example, the CFRM policy for this structure is updated to indicate that the duplexing switch state is being entered, STEP 1079. Additionally, a confirmation string based on the current set of active connectors to respond is built, STEP 1080.

Subsequently, a determination is made as to the number of active users or connectors, INQUIRY 1081. Should the number of active users be greater than zero, then notification of the switch event is initiated, STEP 1082. Processing then proceeds to INQUIRY 1022 of FIG. 10b, where the changes to the CFRM policy are committed. The duplexing switch process continues as connectors respond.

Returning to INQUIRY 1081 of FIG. 10j, if the number of active users is equal to zero, then rebuild process complete processing occurs. In particular, processing continues with STEP 1061 of FIG. 10h.

Figure 10K:
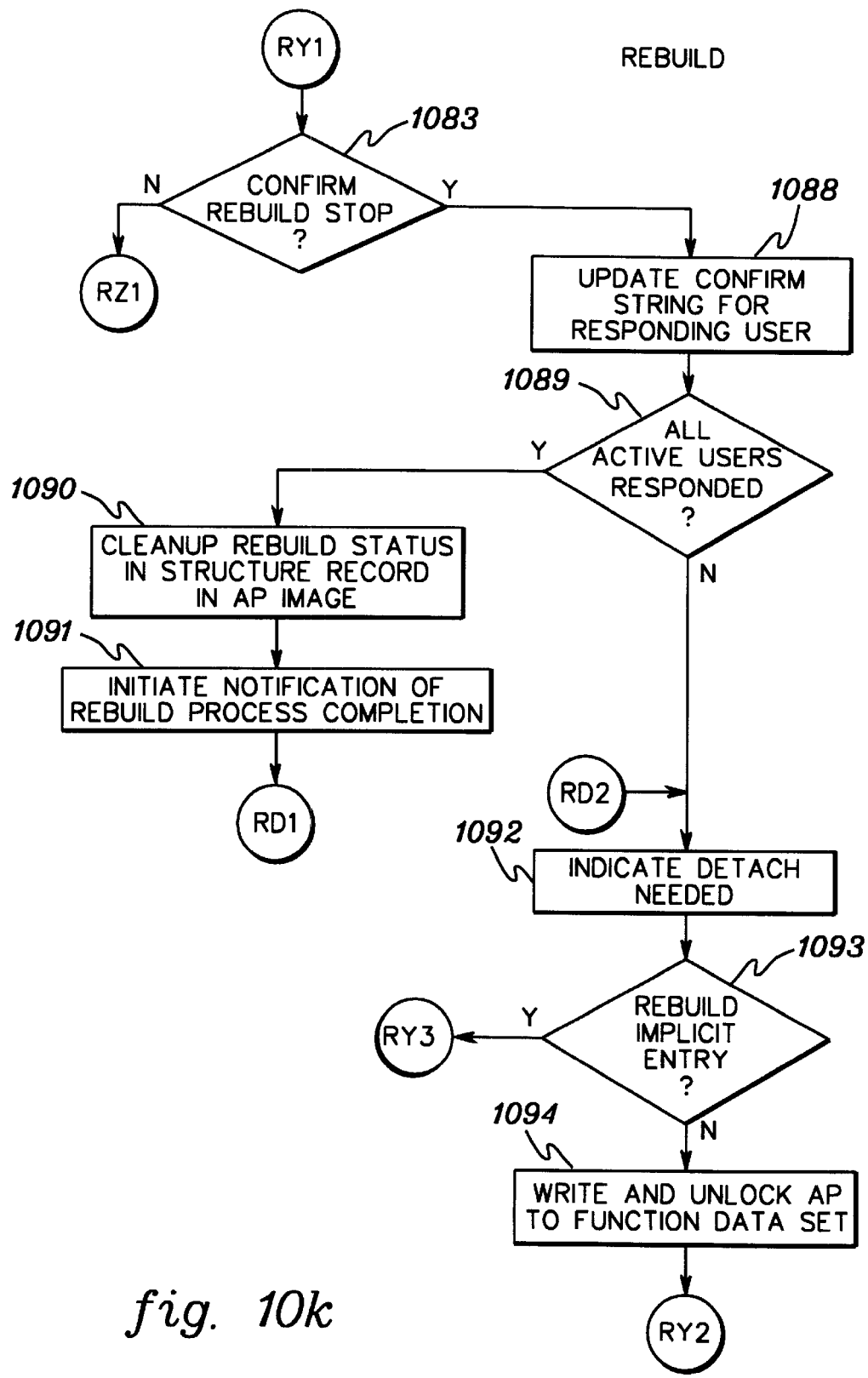

Returning to INQUIRY 1064 (FIG. 10i), "REBUILD STOP REQUEST," if this is not a rebuild stop request, then a further determination is made as to whether a responding user has confirmed the rebuild stop via an event exit response, INQUIRY 1083 "CONFIRM REBUILD STOP?" (FIG. 10k).

Figure 10L:
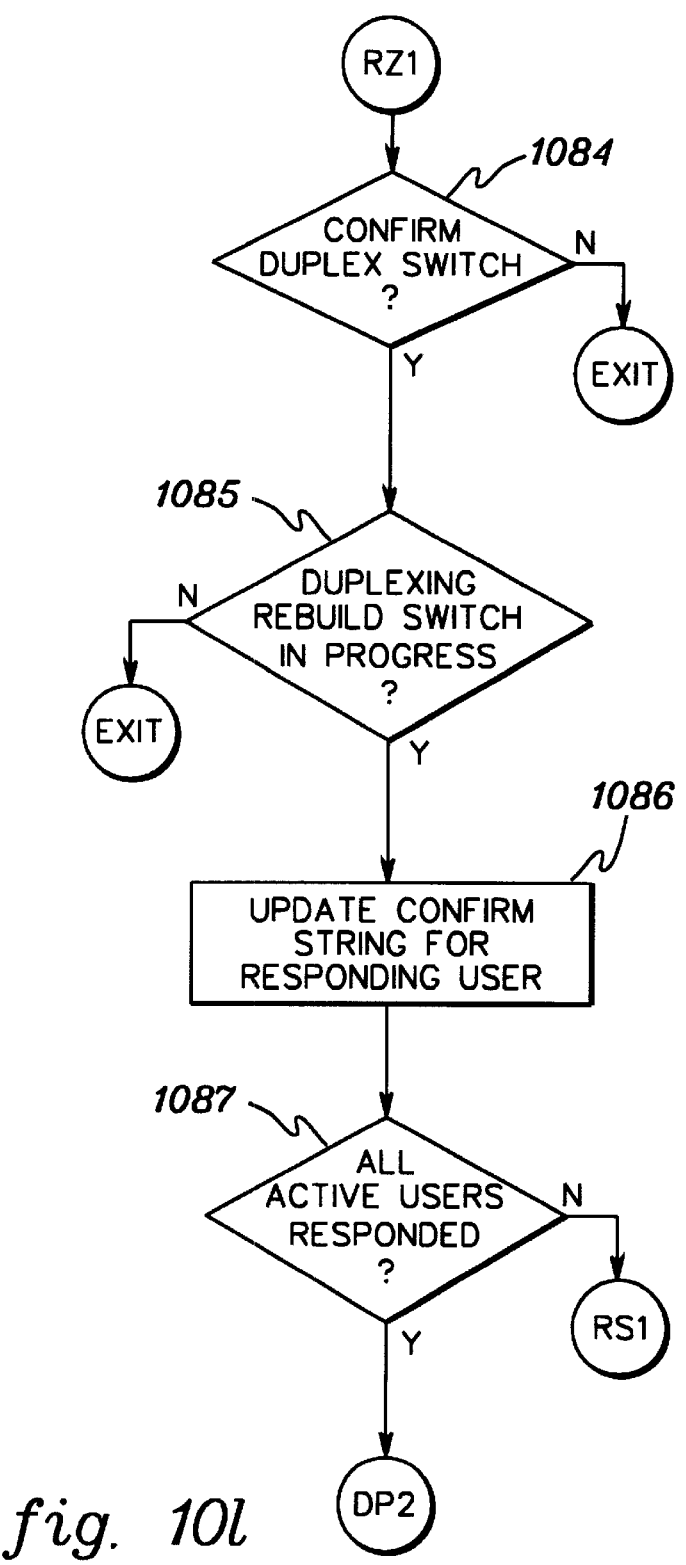

If a rebuild stop is not being confirmed, then a further check is made as to whether it is a duplex switch, INQUIRY 1084 (FIG. 10L). If it is not a duplex switch, then processing is complete. However, if the request is a confirmation of a duplex switch, then a determination is made as to whether a duplexing rebuild switch is in progress, INQUIRY 1085. If the rebuild switch is not expected, then processing ends. However, if the confirmation is expected, then a confirm string for the responding user is updated, STEP 1086. Thereafter, a determination is made as to whether all active users have responded, INQUIRY 1087. If all active users have not responded, then processing continues with INQUIRY 1022, FIG. 10b. On the other hand, if all active users have responded, then processing continues with STEP 1039 of FIG. 10d.

Returning to INQUIRY 1083 of FIG. 10k, if a confirmation of rebuild stop has been made, then the confirm string entry for the responding user is updated, STEP 1088, and a further inquiry is made into whether all active users have responded, INQUIRY 1089 "ALL ACTIVE USERS RESPONDED?". If all the active users have responded, then the rebuild status in the structure record in the active policy image is cleaned up, STEP 1090, and notification of rebuild stop process complete is initiated, STEP 1091. Thereafter, processing continues with the reduplexing processing at INQUIRY 1048 of FIG. 10g.

Returning to INQUIRY 1089 (FIG. 10k), if all the active users have not responded, then an indication is made that detach is needed for the user from the new structure, STEP 1092 "INDICATE DETACH NEEDED."

Figure 10M:
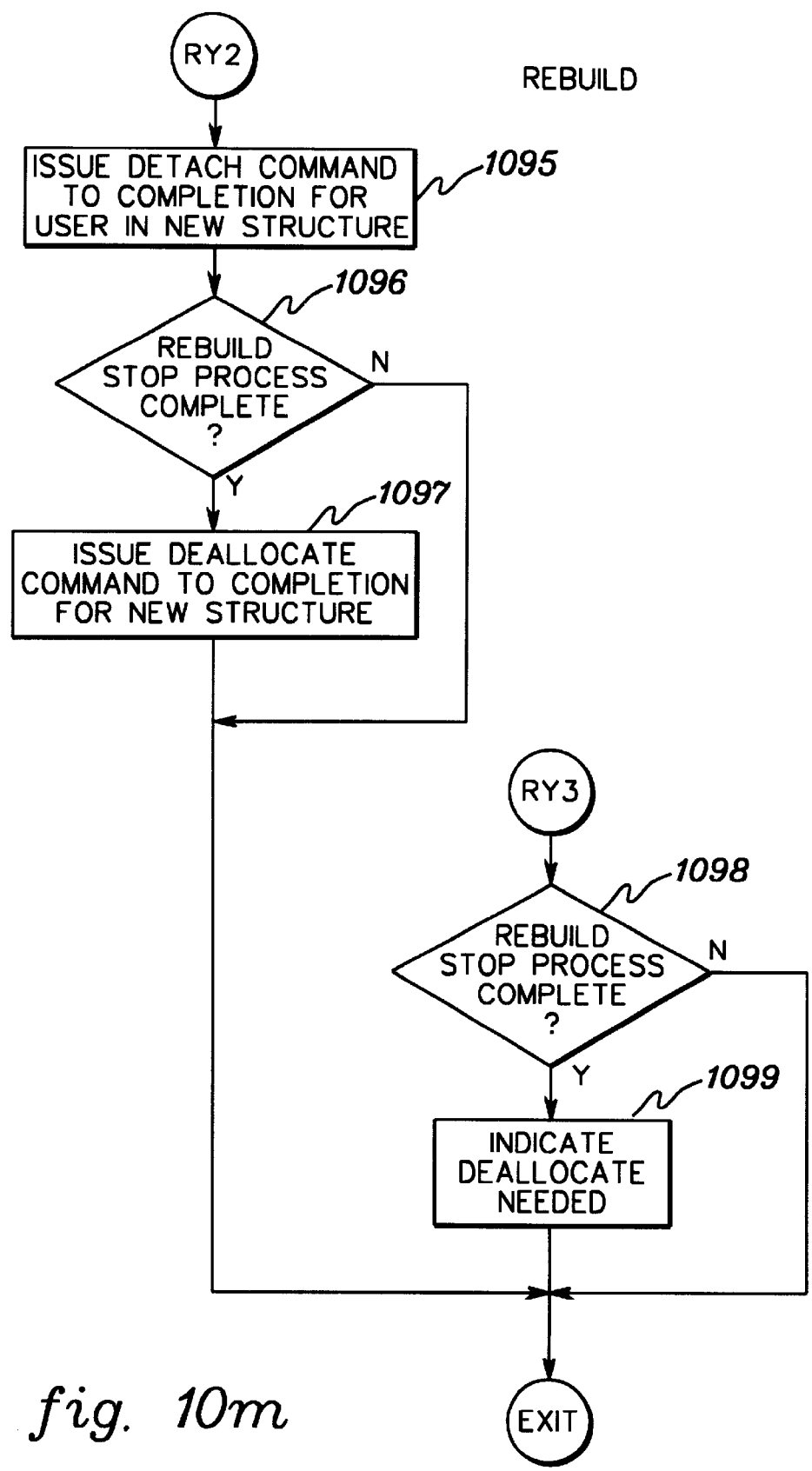

Subsequent to indicating that detach is needed, a determination is made as to whether the rebuild service was entered via an implicit entry, INQUIRY 1093 "REBUILD IMPLICIT ENTRY?". Should this not be an implicit entry, then the active policy is written to the function data set and the function data set is unlocked, STEP 1094 "WRITE AND UNLOCK AP TO FUNCTION DATA SET." Thereafter, the detach command is processed to completion for the user in the new structure, STEP 1095 (FIG. 10m). After completing the detach command, then a determination is made as to whether the rebuild stop process is complete, INQUIRY 1096 "REBUILD STOP PROCESS COMPLETE?".

If the rebuild stop is complete, then a deallocate command is processed to completion for the new structure, STEP 1097. After completing the deallocate command, or if the rebuild stop process is not complete, then processing of the rebuild service is complete.

Returning to INQUIRY 1093 (FIG. 10k), "REBUILD IMPLICIT ENTRY?", if entry was implicit, then a determination is made as to whether the rebuild stop process is complete, INQUIRY 1098 (FIG. 10m) "REBUILD STOP PROCESS COMPLETE?". Should the rebuild stop process be complete, then an indication that deallocation is needed is made, STEP 1099 "INDICATE DEALLOCATE NEEDED", and processing of the rebuild service is complete. On the other hand, if the rebuild stop process is incomplete, then processing of the rebuild service is complete.

As described above with reference to the rebuild service of FIGS. 10a–10m, at certain selected times, the active users of the structure(s) respond, indicating that they have received a particular event and have complied with any desired procedures. As one example, at STEP 1021 of FIG. 10b, an event is presented to the connector's event exit, specifying a rebuild quiesce event and at INQUIRY 1024 (FIG. 10c), a determination is made as to whether the quiesce event was confirmed by the connector.

In order to confirm the quiesce. event or other events, in one example, an event exit response is provided. IXLEERSP is one example of a service which is invoked in response to events presented to the event exit. Not all events require a response. The IXLEERSP interface defines the events for which a response is applicable.

If an event exit response can be provided synchronously from the event exit, then a return code can be set in an event exit parameter list (e.g., IXLYEEPL). If the response is to be provided asynchronously, then the responding connected XES user invokes the IXLEERSP service to provide the event exit response. In one embodiment, there are some events which require an IXLEERSP response.

A connector responds to an event via the IXLEERSP service after completing all processing for the event. A connected XES user receives events in the event exit in the sequence in which the events were reported. For example, a related connector receives an event indicating that a connection is active (new connection or existing connection event for a given connection), before receiving a disconnect or failed connection event for that connection. In most cases, each connection to the structure receives the events in the same sequence; however, when a rebuild quiesce event occurs, and then a rebuild stop event occurs before all connectors are told about the rebuild quiesce event, the rebuild quiesce event is filtered and only the rebuild stop event is presented. Other examples of such filtering may also exist.

One example of the syntax associated with an event exit interface, and in particular, IXLEERSP, is described in detail below.

```
IXLEERSP   EVENT=DISCFAILCONN
              ,SUBJCONTOKEN=xsubjcontoken
              ,EVENTSEQ#=xeventseq#
              ,RELEASECONN={NO|YES}
           ,EVENT=EXISTINGCONN
              SUBJCONTOKEN=xsubjcontoken
           ,EVENT=REBLDQUTESCE
           ,EVENT=REBLDSTOP
           ,EVENT=REBLDCLEANUP
           ,EVENT=REBLDCONNFAIL
              ,SUBJCONTOKEN=xsubjcontoken
              ,EVENTSEQ#=xeventseq#
           ,CONTOKEN=xcontoken
```

Where:
EVENT ({DISCFAILCONN|EXISTINGCONN|REBLDQUIESCE|REBLDSTOP|REBLDCLEANUP|REBLDCONNFAIL}) is a required keyword input which identifies the event the connector's response is for.

EVENT(DISCFAILCONN—is a disconnected or failed connection event (EEPLDISFAILCONNECTION).
  SUBJCONTOKEN(xsubjcontoken) is the name of a required input field that specifies the connect token the response is for. The connect token specified should be the value presented to this connection in the event exit parameter list (EEPL, field EEPLSUBJCONTOKEN).
  EVENTSEQ#(xeventseq#) is the name of a required input field that specifies the subject event sequence number. The event sequence number specified should be the value presented to this connection in the event exit parameter list (EEPL, field EEPLEVENTSEQ#).
  RELEASECONN({NO|YES}) is a required keyword input which indicates whether the connection should remain persistent or be released.
    NO specifies XES should continue processing for the failed connection. The connector issuing IXLEERSP has completed all processing for the failed connection. The persistence attribute of the connection is not affected by this response.
    YES specifies XES should continue processing for the failed connection and indicates that this connection is no longer required to be persistent. The connector :issuing IXLEERSP has completed all processing for the failed connection.

EVENT(EXISTINGCONN) is an existing failed-persistent connection event (EEPLEXISTINGCONNECTION). This response indicates that a failed-persistent connection no longer needs to be persistent, i.e., can be released.
  SUBJCONTOKEN (xsubjcontoken) is described above.

EVENT(REBLDQUIESCE) is a rebuild quiesce event (EEPLREBUILDQUIESCE).

EVENT(REBLDSTOP) is a rebuild stop event (EEPLREBUILDSTOP).

EVENT(REBLDCLEANUP) is a rebuild cleanup event (EEPLREBUILDCLEANUP).

EVENT(REBLDCONNFAIL) is a rebuild connect failure event (EEPLREBUILDCONNECTFAILURE).
  SUBJCONTOKEN(xsubjcontoken) and EVENTSEQ# (eventseq#) are described above.

CONTOKEN(xcontoken) is the name of a required field that specifies the connect token of the responding connection.

Figure 12A:
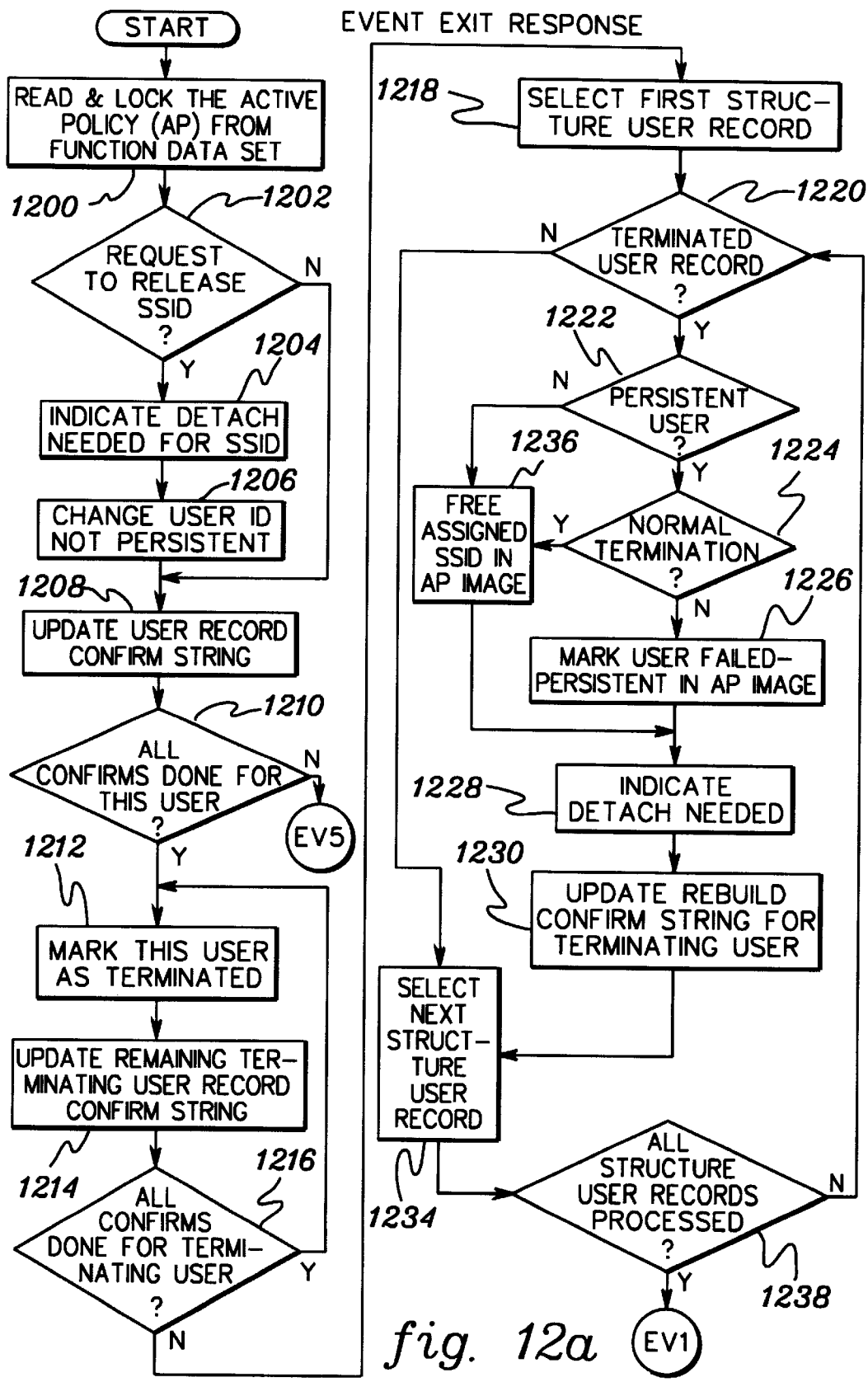
FIGS. 12a–12d depict one embodiment of the logic associated with an event exit response service, in accordance with the principles of the present invention.
Figure 12B:
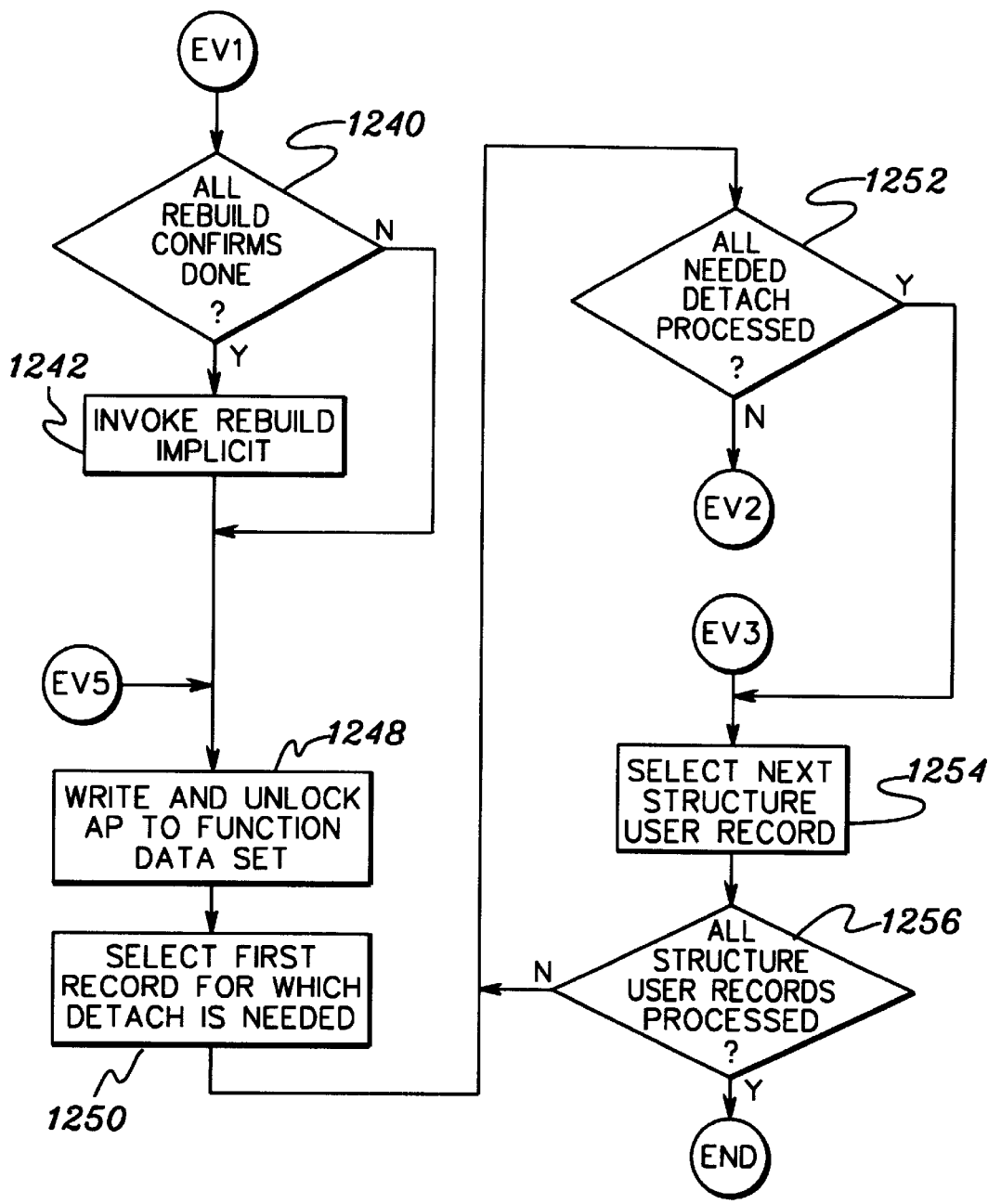
Figure 12C:
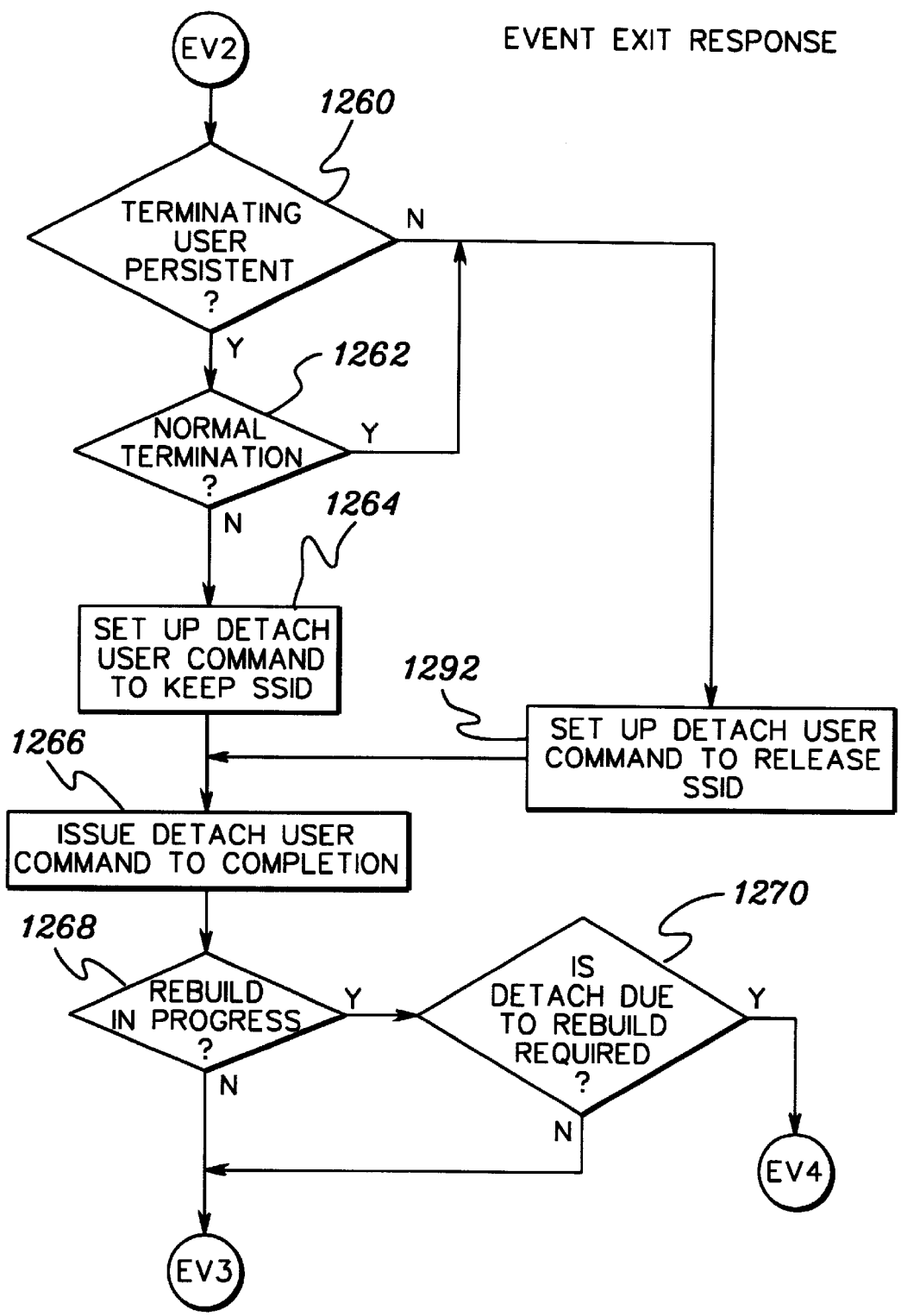
Figure 12D:
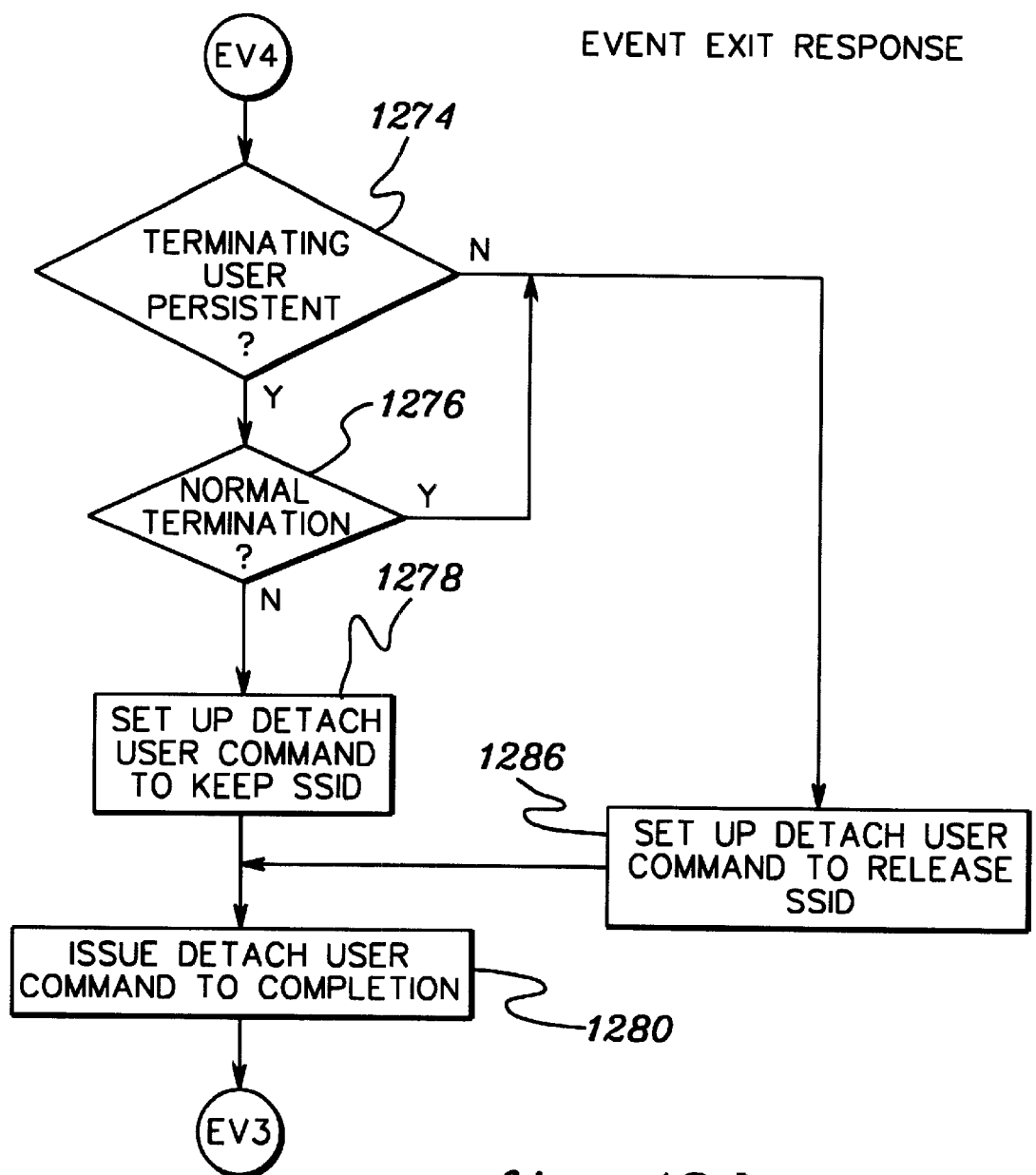

One embodiment of the logic associated with an event exit response, such as the IXLEERSP service, is described in detail with reference to FIGS. 12a–12d. Referring to FIG. 12a, the active policy is read from the function data set and the function data set is locked, STEP 1200 "READ AND LOCK THE ACTIVE POLICY (AP) FROM THE FUNCTION DATA SET." Thereafter, a determination is made as to whether there is a request to release the LCID for a cache, INQUIRY 1202 "REQUEST TO RELEASE SSID?" (SSID is used herein as a subsystem ID, which is equivalent herein to the LCID.) In particular, RELEASECONN on IXLEERSP indicates this. Should there be such a request, detach is indicated for the SSID, STEP 1204 "INDICATE DETACH NEEDED FOR SSID."

After the indication of detach is made, the identified user's status is changed to not persistent, STEP 1206 "CHANGE USER ID NOT PERSISTENT." Subsequent to changing the user ID or if there is no request to release the SSID, the user record confirm string in the active policy is updated, STEP 1208 "UPDATE USER RECORD CONFIRM STRING."

Thereafter, if all the confirms are done for this user, INQUIRY 1210 "ALL CONFIRMS DONE FOR THIS USER?", the user is marked as terminated in the user record of the active policy, STEP 1212, the remaining terminating user record confirm string is updated, STEP 1214, and once again, a determination is made as to whether all the confirms are done for the terminating user, INQUIRY 1216 "ALL CONFIRMS DONE FOR TERMINATING USER?".

If all the confirms are done, flow pass to STEP 1212 "MARK THIS USER AS TERMINATED." However, if all the confirms are not done, the first structure user record is selected, STEP 1218 "SELECT FIRST STRUCTURE USER RECORD." Should the user record be terminated, INQUIRY 1220 "TERMINATED USER RECORD?", the user be persistent, INQUIRY 1222, and abnormal termination occur, INQUIRY 1224, the user is marked as failed-persistent in the active policy image in virtual storage, STEP 1226 "MARK USER FAILED-PERSISTENT IN AP IMAGE."

Subsequent to marking the user, an indication is made in the active policy that detach is needed, STEP 1228 "INDI- CATE DETACH NEEDED." Thereafter, the rebuild confirm string for the terminating user is updated, STEP 1230. Subsequent to updating the confirm string, or if the user record is not terminated, INQUIRY 1220, the next structure user record is selected, STEP 1234. "SELECT NEXT STRUCTURE USER RECORD." Similarly, if the user is not persistent or termination is normal, the assigned SSID in the active policy image in virtual storage is freed, STEP 1236 "FREE ASSIGNED SSID IN AP IMAGE," and flow passes to STEP 1228 "INDICATE DETACH NEEDED."

After selecting the next structure user record, STEP 1234, if all of the structure user records have not been processed, INQUIRY 1238, flow passes to INQUIRY 1220 "TERMINATED USER RECORD?" and processing continues, as described above. However, when all of the structure user records have been processed, a determination is made as to whether all the rebuild confirms are done, INQUIRY 1240 (FIG. 12*b*) "ALL REBUILD CONFIRMS DONE?". Should all of the confirms be done, a rebuild implicit routine is invoked, STEP 1242 "INVOKE REBUILD IMPLICIT."

Figure 13:
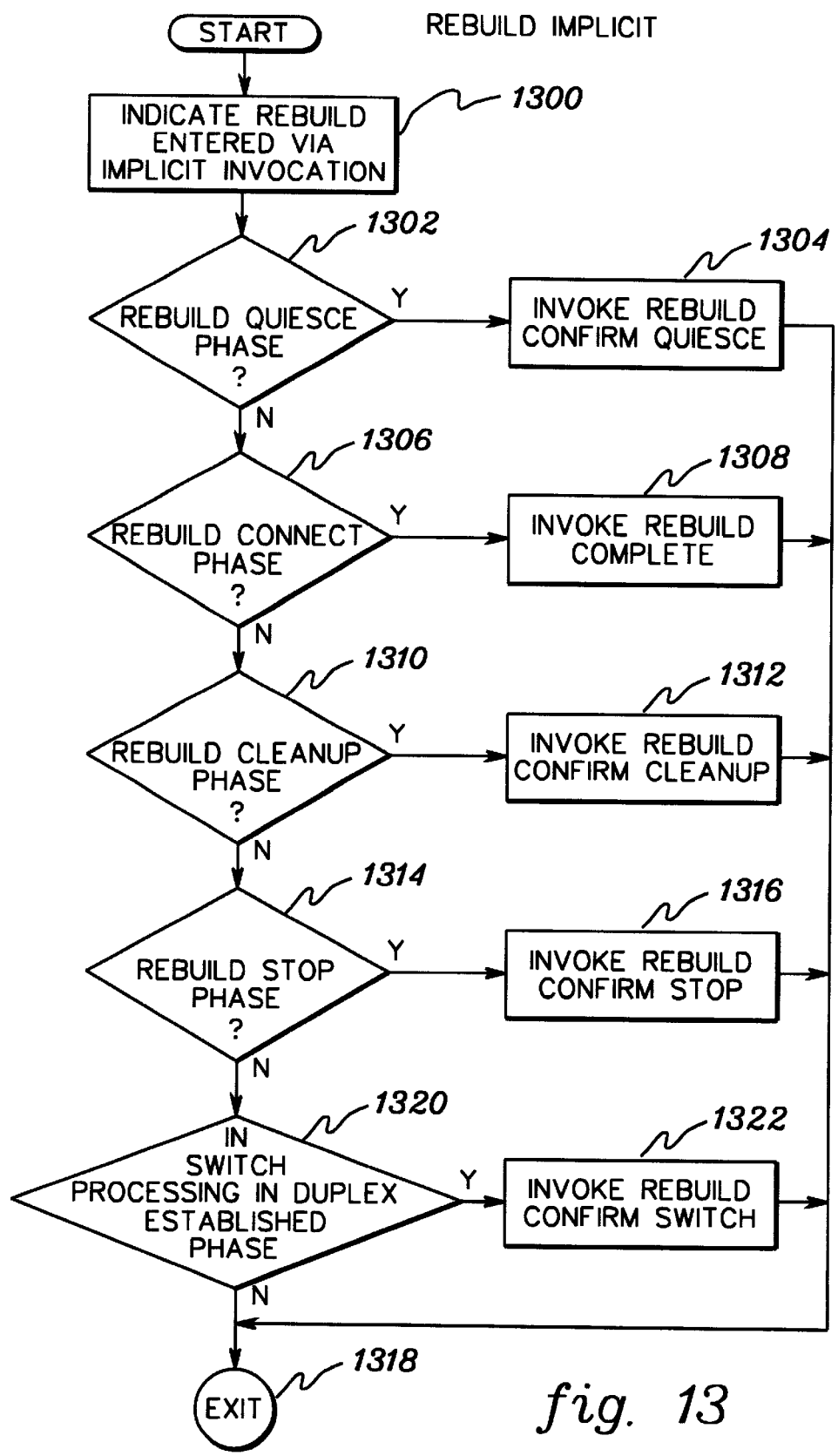
FIG. 13 depicts one embodiment of the logic associated with a rebuild implicit routine, which supports the duplexing rebuild capability in accordance with the principles of the present invention.

One embodiment of the logic associated with a rebuild implicit routine is described in detail with reference to FIG. 13. Initially, an indication is made that rebuild is entered via an implicit invocation, STEP 1300 "INDICATE REBUILD ENTERED VIA IMPLICIT INVOCATION." In one example, this indication may be made in the rebuild parameter list or simply as the entry point to the rebuild module. Subsequently, a determination is made as to whether there is a rebuild quiesce phase, INQUIRY 1302 "REBUILD QUIESCE PHASE?". Should there be a rebuild quiesce phase, then rebuild confirm quiesce is invoked, STEP 1304. In particular, the rebuild service is invoked specifying confirm quiesce. Thereafter, processing of the rebuild implicit routine is complete.

If there is not a rebuild quiesce phase and there is a rebuild connect phase, INQUIRY 1306 "REBUILD CONNECT PHASE?", then rebuild complete is invoked, STEP 1308 "INVOKE REBUILD COMPLETE." In one example, this is accomplished by invoking the rebuild service and specifying rebuild complete.

If there is not a rebuild connect phase, but there is a rebuild cleanup phase, INQUIRY 1310 "REBUILD CLEANUP PHASE?", then a rebuild confirm cleanup is invoked in a similar manner to rebuild complete, described above, STEP 1312 "INVOKE REBUILD CONFIRM CLEANUP." On the other hand, if there is not a rebuild cleanup phase, then a determination is made as to whether there is a rebuild stop phase, INQUIRY 1314 "REBUILD STOP PHASE?". Should there be a rebuild stop phase, then rebuild confirm stop is invoked, STEP 1316, and processing of the rebuild implicit routine is complete, STEP 1318.

On the other hand, if there is not a rebuild stop phase, a determination is made as to whether there is a duplex established phase with switch, INQUIRY 1320. If so, then a rebuild confirm switch process is invoked, STEP 1322, and processing of the rebuild implicit routine is complete, STEP 1318.

Returning to FIG. 12*b* and, in particular, to STEP 1242 after invoking the rebuild implicit routine or if all of the rebuild confirms are not done, INQUIRY 1240, the active policy is written to the function data set, which is unlocked, STEP 1248 "WRITE AND UNLOCK AP TO FUNCTION DATA SET."

After writing the active policy, the first record for which detach is needed, as indicated in the active policy, is selected, STEP 1250, and a determination is made as to whether all needed detach processing is complete, INQUIRY 1252 "ALL NEEDED DETACH PROCESSED?". If all of the detach processing is complete, the next structure user record is selected, STEP 1254 "SELECT NEXT STRUCTURE USER RECORD", and if all of the structure user records are not processed, INQUIRY 1256 "ALL STRUCTURE USER RECORDS PROCESSED?", flow returns to INQUIRY 1252 "ALL NEEDED DETACH PROCESSED?".

However, if all of the user structure records are processed, INQUIRY 1256, processing of the event exit response is complete.

Returning to INQUIRY 1252, if all of the needed detach processing is not complete, a determination is made as to whether the termination is of a persistent user, INQUIRY 1260 (FIG. 12*c*) "TERMINATING USER PERSISTENT?". If it is a persistent user, and termination is abnormal, INQUIRY 1262 "NORMAL TERMINATION?", the detach user command is set up to keep the SSID, STEP 1264 "SET UP DETACH USER COMMAND TO KEEP SSID." Further, the detach user command is processed to completion, STEP 1266 "ISSUE DETACH USER COMMAND TO COMPLETION".

Subsequently, a determination is made as to whether rebuild is in progress, INQUIRY 1268 "REBUILD IN PROGRESS?". If rebuild is in progress, then a further determination is made as to whether detach is needed because of the rebuild process, INQUIRY 1270 "IS DETACH DUE TO REBUILD REQUIRED?". If detach is not needed or if rebuild is not in progress, flow passes to STEP 1254 (FIG. 12*b*) "SELECT NEXT STRUCTURE USER RECORD," and processing continues as described above.

Returning to INQUIRY 1270 (FIG. 12*c*) "IS DETACH DUE TO REBUILD REQUIRED?", if detach is needed then a determination is made as to whether the terminating user is persistent, INQUIRY 1274 (FIG. 12*d*) "TERMINATING USER PERSISTENT?". If the terminating user is persistent and termination is abnormal, INQUIRY 1276 "NORMAL TERMINATION?", the detach user command is set up to keep the SSID, STEP 1278. Subsequently, the detach user command is processed to completion, STEP 1280 "ISSUE DETACH USER COMMAND TO COMPLETION", and processing continues with STEP 1254 (FIG. 12*b*) "SELECT NEXT STRUCTURE USER RECORD."

Returning to INQUIRY 1274 (FIG. 12*d*), "TERMINATING USER PERSISTENT?", if the terminating user is not persistent or termination is normal, INQUIRY 1276 "NORMAL TERMINATION?", then the detach user command to release the SSID is set up, STEP 1286. Thereafter, the detach user command is processed to completion, STEP 1280, and processing continues with STEP 1254 (FIG. 12*b*) "SELECT NEXT STRUCTURE USER RECORD."

Returning to INQUIRY 1260 (FIG. 12*c*) "TERMINATING USER PERSISTENT?", if the termination is not of a persistent user or there is normal termination, INQUIRY 1262, the detach user command is set up to release the SSID, STEP 1292. Thereafter, flow passes to STEP 1266 "ISSUE DETACH USER COMMAND TO COMPLETION" and processing continues, as described above.

Returning to INQUIRY 1210 (FIG. 12*a*) "ALL CONFIRMS DONE FOR THIS USER?", if all of the confirms are not done, flow passes to STEP 1248 (FIG. 12*b*) "WRITE AND UNLOCK AP TO FUNCTION DATA SET," as described above.

As part of the structure duplexing rebuild process, described above, each user connected to the structure being duplexed invokes a connect service (e.g., IXLCONN) with a REBUILD keyword. For instance, at STEP 1030 of FIG. 10c, notification of rebuild connect is initiated and a rebuild event exit is presented to the connector's event exit. Thereafter, each connector issues IXLCONN REBUILD, described below, to allocate a new structure for duplexing rebuild. This special connect request does not define a new connection. A connect request with the REBUILD keyword allocates a new structure for use in the duplexing rebuild process, if a peer connection has not already allocated a structure for duplexing rebuild. This special connect request assigns new resources to the original connection identified by the connection name specified as an input to the connect service.

The new structure allocated for a duplexing rebuild is allocated in the first coupling facility in the preference list which meets the following requirements: it is a different coupling facility than that of the primary structure; the volatility requirements requested; has connectivity to the systems which have connections to their original structure; has available space greater than or equal to the requested structure size; does not contain a structure in the exclusion list (in one example, the exclusion list is located in the active policy and designates if coupling facility structures should occupy different coupling facilities, if possible); and has connectivity to the system trying to allocate the structure.

If there are pending policy changes that affect the structure being rebuilt, the pending policy is used for allocating the new structure. If no facilities in the preference list meet the above-defined requirements, then XES first tries to allocate the structure without the exclusion list requirement, then without the volatility requirement. If a facility is still not suitable, then the structure is allocated in the coupling facility with the most available space and still has full connectivity to the original connectors. If the structure is successfully allocated, the structure size may be smaller than the requested size.

In one embodiment, an IXLCONN macro is the interface through which requests to connect to a new structure during the duplexing rebuild process is requested. An IXLCONN request to connect to a new structure during the duplexing rebuild process is specified through the REBUILD parameter, as described below. A requester of IXLCONN REBUILD is already a connector to the structure which is the target of the duplexing rebuild, i.e., the connector specifies the same structure name and connection name as the original connection.

In one embodiment, the IXLCONN macro has the following syntax (some of the keywords for IXLCONN and other services described herein are designated as required, but may be optional in another embodiment):

```
IXLCONN    STRNAME=xstrname
           [,STRSIZE={xstrsize |0}]
           [,CONDATA={xcondata|ALL ZEROES}]
           ,STRDISP={KEEP|DELETE}
           ,CONDISP=KEEP
               ,CONNAME=xconname
           ,CONDISP=DELETE
               [,CONNAME={xconname|GENERATED NAME }]
           [,NONVOLREQ={NO|YES}]
           EVENTEXIT=xeventexit
           ,TYPE=CACHE
               [,ELEMCHAR={xelemchar|0}]
               [,MAXELEMNUM={xmaxelemnum|16}]
               [,DIRRATIO={xdirratio|1}]
               [,ELEMENTRATIO={xelementratio|1}]
               [,ADJUNCT={NO|YES}]
```

-continued

```
               ,VECTORLEN=xvectorlen
               ,NUMCOCLASS=xnumcoclass
           ,ALLOWREBLD{YES|NO}
               ,ALLOWDUPREBLD{YES|NO}
               [REBUILD]
           ,ANSAREA=xansarea
           ,ANSLEN=xanslen
```

Where:
STRNAME(xstrname) is the name of a required input that specifies the structure name the user wishes to connect to. The logical structure name provides the ability to map the request to a physical facility. The name is defined in the active policy. In one example, the structure name is 16 characters long, padded on the right with blanks if necessary.

[STRSIZE({xstrsize|0})] is the name of an optional input that specifies the structure size. This size is used to allocate the structure, if the size is smaller than the structure size defined in the active policy. If the size is not smaller than the policy size, the policy size is used to allocate the structure.

Regardless of whether the connector specified size or the policy size is used; the structure may always be allocated using less than the requested space when there are limited facility resources available. The actual structure size is returned in the connect answer area.

When STRSIZE is 0 (default), the structure size in the active policy is used.

[{CONDATA({xcondata|ALL ZEROES})] is the name of an optional input that specifies connector data that is provided to this connection's exits and can be used as the invoker wishes. DEFAULT: ALL_ZEROES STRDISP({KEEP|DELETE}) is a required keyword input which defines an attribute of the structure to be allocated. The disposition of a structure defines whether the structure is persistent when there are no longer any defined connections (active or failed-persistent).

KEEP structure always remains allocated.

DELETE structure is deleted when there are no active or failed-persistent connections.

CONDISP({KEEP|DELETE}) is a required keyword input which defines an attribute of the connection. The disposition of a connection defines whether the connection is persistent, if the connection abnormally terminates.

CONDISP(KEEP) connection is in a failed-persistent state after abnormal termination. There are several ways that a failed-persistent connection can be cleaned up: 1) via the IXLEERSP macro, described herein, after all serving connectors have cleaned up for the terminated connection, 2) by reconnecting as the terminated user (by specifying the same CONNAME on IXLCONN), or 3) via an IXLFORCE macro, which can be invoked to force deletion of the failed-persistent connection. (IXLFORCE is described in, for example, U.S. Pat. No. 5,634,702, entitled "A METHOD AND SYSTEM FOR MANAGING ONE OR MORE COUPLING FACILITIES IN A DATA PROCESSING SYSTEM," Allen et. al., issued May 27, 1997, which is hereby incorporated herein by reference in its entirety, as noted above.)

CONNAME(xconname) is the name of a required input that specifies a name by which the user wishes to be identified. The name is to be unique within the scope of the given structure.

If the name provided matches the name of another active connection to the same structure, then the connect request is rejected. If the name provided matches the name of a connection in the failed-persistent state and all peer connections have acknowledged via a return code in the event exit parameter list (EEPL) or have issued IXLEERSP, then the connection is re-established (reconnected). Otherwise, the connection is rejected. On a reconnection, a new CONTOKEN is returned to the user in the answer area. For all supported exits, the CONNAME for the subject of the event is presented.

CONDISP(DELETE) connection is not defined after abnormal termination.

[CONNAME({xconname|GENERATED_NAME})] is the name of an optional input that specifies a name by which the user wishes to be identified. The name is to be unique within the scope of a given structure.

If the CONNAME keyword is not specified, then a unique name is generated and returned to the user in the answer area. The attributes and characteristics of CONNAME are described above.

[NONVOLREQ({NO|YES})] is an optional keyword input which indicates whether the structure requires that the coupling facility be non-volatile. DEFAULT: NO.

NO The structure may be allocated in any facility regardless of the volatility attribute of the facility.

YES The structure should be allocated in a facility that is non-volatile. The user is to check the CONAVOLATILE flag in the connect answer area to determine whether the non-volatility requirement was honored.

EVENTEXIT(xeventexit) is a required input. It is the name of the user's event exit. The user's event exit receives control in SRB mode, enable and unlocked.

TYPE(CACHE) is a required keyword input which defines the structure type for the structure to which the user is connecting to.

TYPE(CACHE) specifies a cache structure.

[ELEMCHAR({xelemchar|0})] is the name of an optional byte input that specifies the element characteristic. The element characteristic defines the element size. The element size is specified as the power of two in the following formula:

$$256*(2**ELEMCHAR).$$

For example: If ELEMCHAR=0, then each data element is 256 bytes.

The data written to and read from the structure is called a data entry. A data entry can be up to, for instance, 16 times the data element size.

[MAXELEMNUM({xmaxelemnum|16})] is the name of an optional byte input that specifies the maximum number of data elements per data entry. MAXELEMNUM is, for example, in the range of 1 and 16 decimal. The value specified for MAXELEMNUM is to be greater than or equal to the ELEMENTRATIO divided by DIRRATIO. This restriction ensures that all possible data elements allocated in a structure can be assigned to directory entries. MAXELEMNUM is ignored if ELEMENTRATIO is zero. DEFAULT: 16

[DIRRATIO({xdirratio|1})] is the name of an optional byte input that contains the directory part of the directory-to-element ratio. DIRRATIO is to be greater than zero. DEFAULT: 1

[ELEMENTRATIO({xelementratio|1})] is the name of an optional byte input that contains the element part of the directory-to-element ratio.

If the element portion of the directory-to-element ratio is zero, then the cache structure is allocated without data elements. DEFAULT: 1

(ADJUNCT({NO|YES})] is an optional keyword input which indicates whether an adjunct entry for each cache entry is needed. Each adjunct entry is, for instance, 64 bytes. DEFAULT: NO NO Specifies no adjunct entries should be allocated.

YES Specifies adjunct entries should be allocated.

VECTORLEN(xvectorlen) is the name of a required input that contains the number of local buffers in the user's local cache, which require concurrent registration. The value of this field is used to allocate resources which map the local buffers in the user's cache to the named entries in the cache structure.

NUMCOCLASS(xnumcoclass) is the name of a required fullword input that contains the number of castout classes.

NUMSTGCLASS(xnumstgclass) is the name of a required fullword input that contains the number of storage classes.

[ALLOWREBLD({YES|NO})] is an optional keyword input which indicates whether structure rebuild can be initiated against this structure.

Structure rebuild causes connectors to a structure to allocate another structure with the same name and rebuild data (if applicable) into the new structure. This procedure can be used, for instance, to change the location and/or attributes of the structure. Structure rebuild is also intended for planned reconfiguration and recovery scenarios. DEFAULT: YES YES Structure rebuild is supported for this structure.

[ALLOWDUPREBLD (YES|NO})] is an optional keyword input which indicates whether duplexing rebuild-can be initiated against this structure. Duplexing rebuild causes a secondary structure to be created with the same name as the primary structure. The secondary structure has a duplex copy of selective data of the primary structure.

YES Structure duplexing rebuild is supported.

NO structure duplexing rebuild is not supported.

NO Structure rebuild is not supported for this structure. If an application chooses not to support structure rebuild, then the application provides its own interfaces for planned reconfiguration either through normal shut down procedures or through a command interface. These procedures provide the operator with the ability to stop an application's use of a structure in a coupling facility.

[REBUILD] is an optional keyword which indicates that this connector is already connected to this structure but is now issuing IXLCONN as part of the rebuild process (rebuild is initiated via IXLREBLD, described above). If the structure is not already in rebuild or duplexing rebuild, then the connect request is rejected.

If the new structure for rebuild or duplexing rebuild has not yet been allocated, then IXLCONN allocates a new structure with the same name and uses the attributes specified on connect. This connection is connected to the new structure allocated for rebuild or duplexing rebuild.

The IXLCONN REBUILD request is issued from the same address space and same system as the original IXLCONN which connected this user to the structure. The IXLCONN REBUILD request can be used from a task other than the connecting task.

The first connector to issue IXLCONN REBUILD defines the attributes of the new structure. The attributes of the new structure are determined from the attributes specified on IXLCONN and attributes defined by a pending policy change.

The following keywords are ignored when REBUILD is specified: CONDISP, STRDISP, CONDATA, ALLOWREBLD, EVENTEXIT, CONTEXIT, NOTIFYEXIT, and LISTTRANEXIT. Note that some of these keywords are required in this embodiment, and therefore, are still specified when REBUILD is specified. DEFAULT: NO DEFAULT ANSAREA(xansarea) is a required input. It is the name of the answer area to contain the data being returned by the IXLCONN service routine. The answer area begins, for instance, on a double word boundary.

ANSLEN(xanslen) is the name of a required fullword input that contains the length of the ANSAREA.

One embodiment of the logic associated with a connection service, such as IXLCONN, is described in detail with reference to FIGS. 14a–14d. When invoking the IXLCONN service, the connected XES user identifies the coupling facility structure that it wishes to access. This is accomplished by specifying the coupling facility structure name (STRNAME).

Figure 14A:
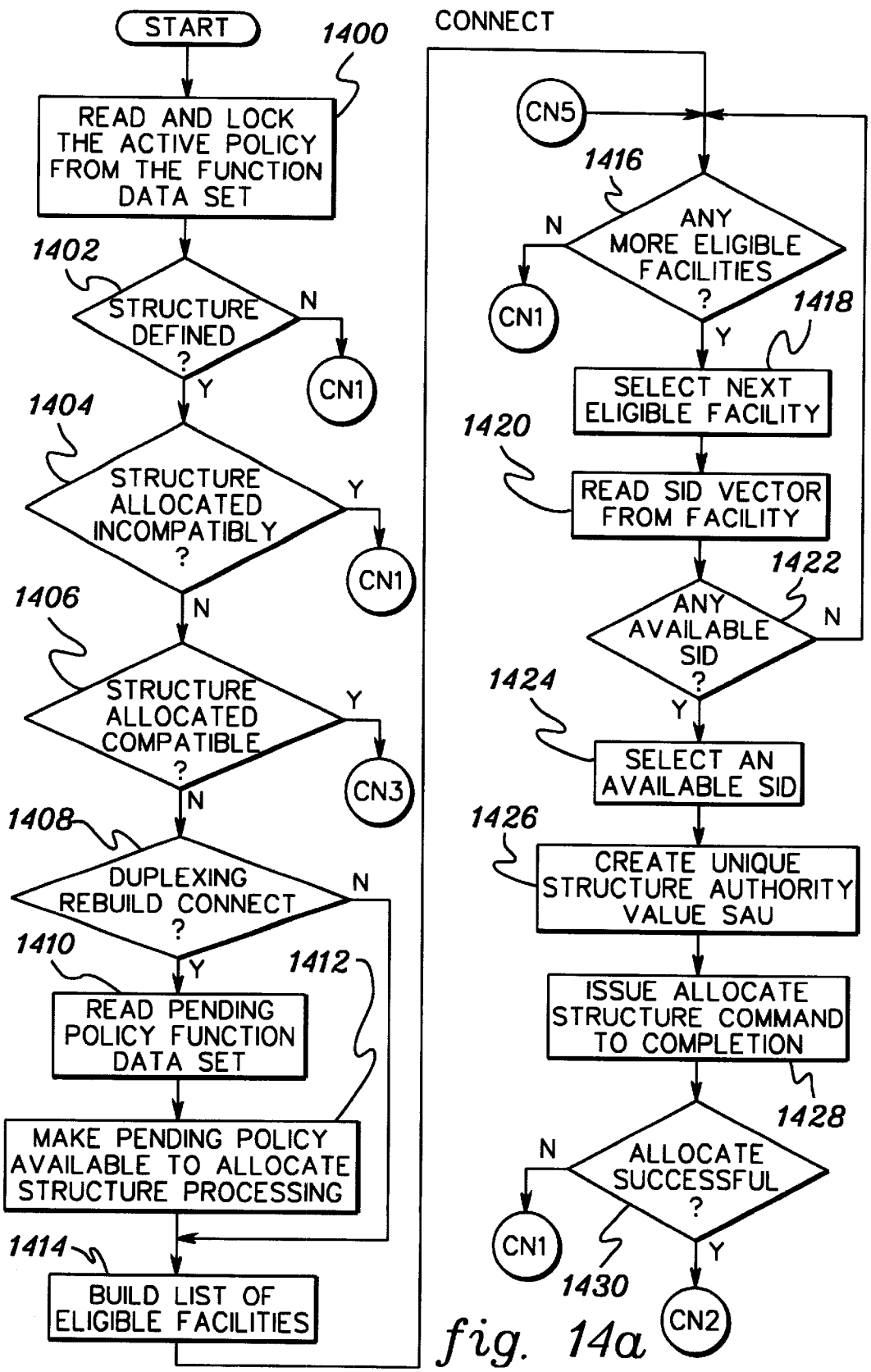
FIGS. 14a–14d depict one embodiment of the logic associated with a connect service, which supports the duplexing rebuild capability in accordance with the principles of the present invention.
Figure 14B:
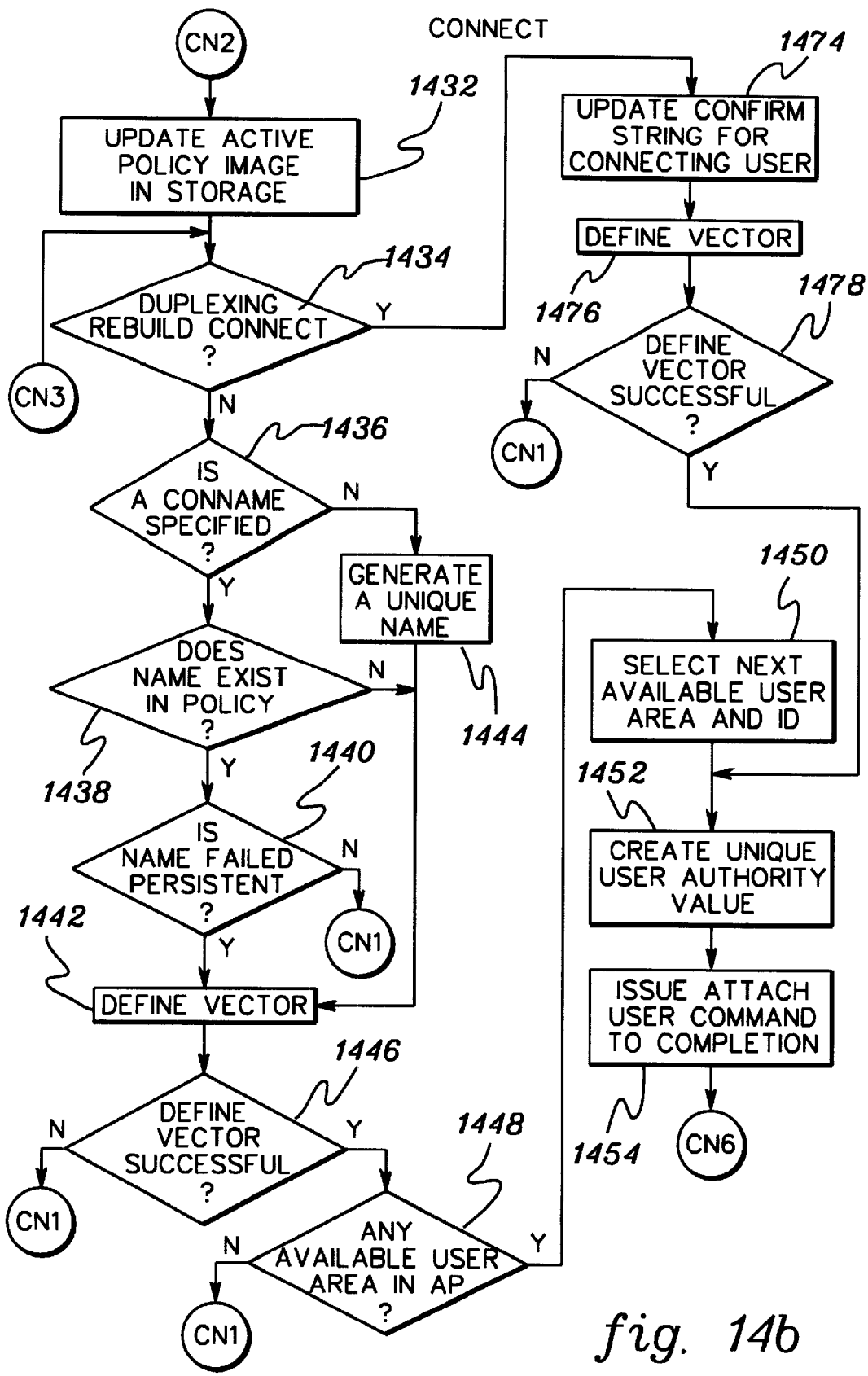

Referring to FIG. 14a, initially, the active policy on the function data set is read and locked, STEP 1400 "READ AND LOCK THE ACTIVE POLICY FROM THE FUNCTION DATA SET." Subsequently, a determination is made as to whether the structure name specified on the connect service is defined, INQUIRY 1402 "STRUCTURE DEFINED?". In particular, the presence of a structure record in the active policy is checked. Should the structure be defined, a check is made to see if it is allocated incompatibly, INQUIRY 1404 "STRUCTURE ALLOCATED INCOMPATIBLY?". This is determined, for instance, by checking the information in the structure controls in the coupling facility.

If a structure is not allocated incompatibly and is not allocated compatibly (i.e., the structure is not allocated), INQUIRY 1406 "STRUCTURE ALLOCATED COMPATIBLE?", a determination is made as to whether this is a duplexing rebuild connection, INQUIRY 1408 "DUPLEXING REBUILD CONNECT?". If this is a duplexing rebuild connection, then the pending policy is read from the function data set, STEP 1410 "READ PENDING POLICY FROM FUNCTION DATA SET," and the pending policy is made available to the allocate structure processing, STEP 1412. In particular, pending policy changes, if any, are used in building the list of eligible facilities, as described in the next step.

Subsequent to making the pending policy available or if this is not a duplexing rebuild connection, INQUIRY 1408, then a list of eligible facilities is built, STEP 1414 "BUILD LIST OF ELIGIBLE FACILITIES." In particular, a preference list in the structure record of the active policy is utilized to determine which coupling facilities are candidates for the structure. From those facilities, the eligible facilities are selected. Each eligible facility has connectivity to the system trying to allocate the structure; is a different coupling facility than that of the primary structure instance; meets the volatility requirement requested by the connector; and has available space greater than or equal to the requested structure size or, if no facility in the policy list has free space greater than or equal to the requested structure size, the facility with the largest amount of free space is chosen.

Subsequent to building the list of eligible facilities, it is ascertained as to whether there are any more eligible facilities, INQUIRY 1416 "ANY MORE ELIGIBLE FACILITIES?". If so, the next eligible facility is selected, STEP 1418 "SELECT NEXT ELIGIBLE FACILITY." After selecting the next eligible facility, the SID vector is read from the global controls associated with the coupling facility, STEP 1420 "READ SID VECTOR FROM FACILITY."

From the SID vector, a determination is made as to whether any available SID exists in the vector, INQUIRY 1422 "ANY AVAILABLE SID?". Should an available SID not exist, flow passes to INQUIRY 1416 "ANY MORE ELIGIBLE FACILITIES?". However, should an available SID exist, it is selected, STEP 1424 "SELECT AN AVAILABLE SID," and a unique structure authority value (SAU) is created (as described above with reference to FIG. 2), STEP 1426 "CREATE UNIQUE STRUCTURE AUTHORITY VALUE SAU." Thereafter, an allocate structure command is issued to completion, STEP 1428 "ISSUE ALLOCATE STRUCTURE COMMAND TO COMPLETION?". One embodiment of an allocate command is described in detail in U.S. Pat. No. 5,515,499 for "Method And System For Reconfiguring A Storage Structure Within A Structure Processing Facility" by Allen et al., issued on May 7, 1996, which is hereby incorporated herein by reference in its entirety.

Once the allocate command completes and it is successful, INQUIRY 1430 "ALLOCATE SUCCESSFUL?", the active policy image in virtual storage is updated in order to indicate the successful allocation of a structure, STEP 1432 (FIG. 14b) "UPDATE ACTIVE POLICY IMAGE IN STORAGE."

Subsequently, a determination is made as to whether this is a duplexing rebuild connection, INQUIRY 1434 "DUPLEXING REBUILD CONNECT?". Should this not be a duplexing rebuild connection, a determination is made as to whether a CONNAME is specified as an input on IXLCONN, INQUIRY 1436 "IS A CONNAME SPECIFIED?". Should a CONNAME be specified, a further determination is made to ascertain whether the name exists in the active policy, INQUIRY 1438 "DOES NAME EXIST IN POLICY?" If the name exists, it is checked to see if it is failed-persistent, INQUIRY 1440 "IS NAME FAILED-PERSISTENT?".

When the name is indicated as failed-persistent, or if the name does not exist in the policy, INQUIRY 1438, a vector is defined at the central processing complex where the connector is executing, STEP 1442 "DEFINE VECTOR." In particular, a local bit vector is defined for a cache for cache coherency. In addition to the above, if a CONNAME is not specified, INQUIRY 1436, a unique name is generated, STEP 1444, and flow passes to STEP 1442 "DEFINE VECTOR."

Should the vector definition be successful, INQUIRY 1446 "DEFINE VECTOR SUCCESSFUL?", a further check is made to determine whether there is any available space in the active policy to record user information, INQUIRY 1448 "ANY AVAILABLE USER AREA IN AP?".

If there is an available user area (i.e., an unused area for a new connection or reuse of existing area for a re-connect), it is selected along with the next available user id (for a reconnect, the same user id is used), STEP 1450 "SELECT NEXT AVAILABLE USER AREA AND ID." Thereafter, a unique user authority request operand is created and an attach user command is processed to completion, STEPS 1452, 1454. When there is a successful attach, INQUIRY 1456 (FIG. 14c) "ATTACH SUCCESSFUL?", the active policy image is updated in virtual storage to indicate such, STEP 1458 "UPDATE AP FOR ATTACH USER," and notification of the connect is initiated, STEP 1460 "INITIATE NOTIFICATION OF CONNECT." One embodiment of an attach command and a notification command are described in detail in U.S. Pat. No. 5,515,499 for "Method And System For Reconfiguring A Storage Structure Within A Structure Processing Facility" by Allen et al., issued on May 7, 1996, which is hereby incorporated herein by reference in its entirety.

After initiating notification of the connect, a determination is made as to whether this is a duplexing rebuild connection, INQUIRY 1462 "DUPLEXING REBUILD CONNECT?". If this is not a duplexing rebuild connection, the active policy is written from virtual storage to the function data set and the active policy in the function data set is unlocked, STEP 1464 "WRITE AND UNLOCK AP TO FUNCTION DATA SET" and the connect process is complete.

On the other hand, if this is a duplexing rebuild connection, then a further inquiry is made to determine if all the active users have initiated a duplexing connect rebuild, INQUIRY 1466 "ALL ACTIVE USERS CONNECT DUPLEXING REBUILD?". This is determined by the set bits in the confirm string of the users record. If all of the active users have not requested duplexing rebuild connect, then flow passes to STEP 1464 "WRITE AND UNLOCK AP TO FUNCTION DATA SET." Otherwise, a confirm string is built in the structure record of the active policy based on active users to respond with IXLREBLD complete, STEP 1472, and flow passes to STEP 1464 "WRITE AND UNLOCK AP TO FUNCTION DATA SET."

Returning to INQUIRY 1434 (FIG. 14*b*), should this be a duplexing rebuild connection, the confirm string for the connecting user is updated, STEP 1474. Thereafter, a local bit vector is defined for cache coherency, STEP 1476 "DEFINE VECTOR."

Should the vector definition be successful, INQUIRY 1478, flow passes to STEP 1452 "CREATE UNIQUE USER AUTHORITY VALUE," processing continues, as described herein. However, if the vector is defined unsuccessfully, flow passes to STEP 1480(FIG. 14*d*) "SET ERROR INDICATOR", as described below.

Returning to INQUIRY 1456 (FIG. 14*c*), if the attach is unsuccessful, a determination is made as to whether the vector was defined successfully, INQUIRY 1482 (FIG. 14*d*) "DEFINE VECTOR SUCCESSFUL?". When the vector is defined successfully, the vector is released, STEP 1484 "RELEASE VECTOR." After releasing the vector or if the vector definition is unsuccessful, a determination is made as to whether the attach was successful, INQUIRY 1486 "ATTACH SUCCESSFUL?".

Figure 14C:
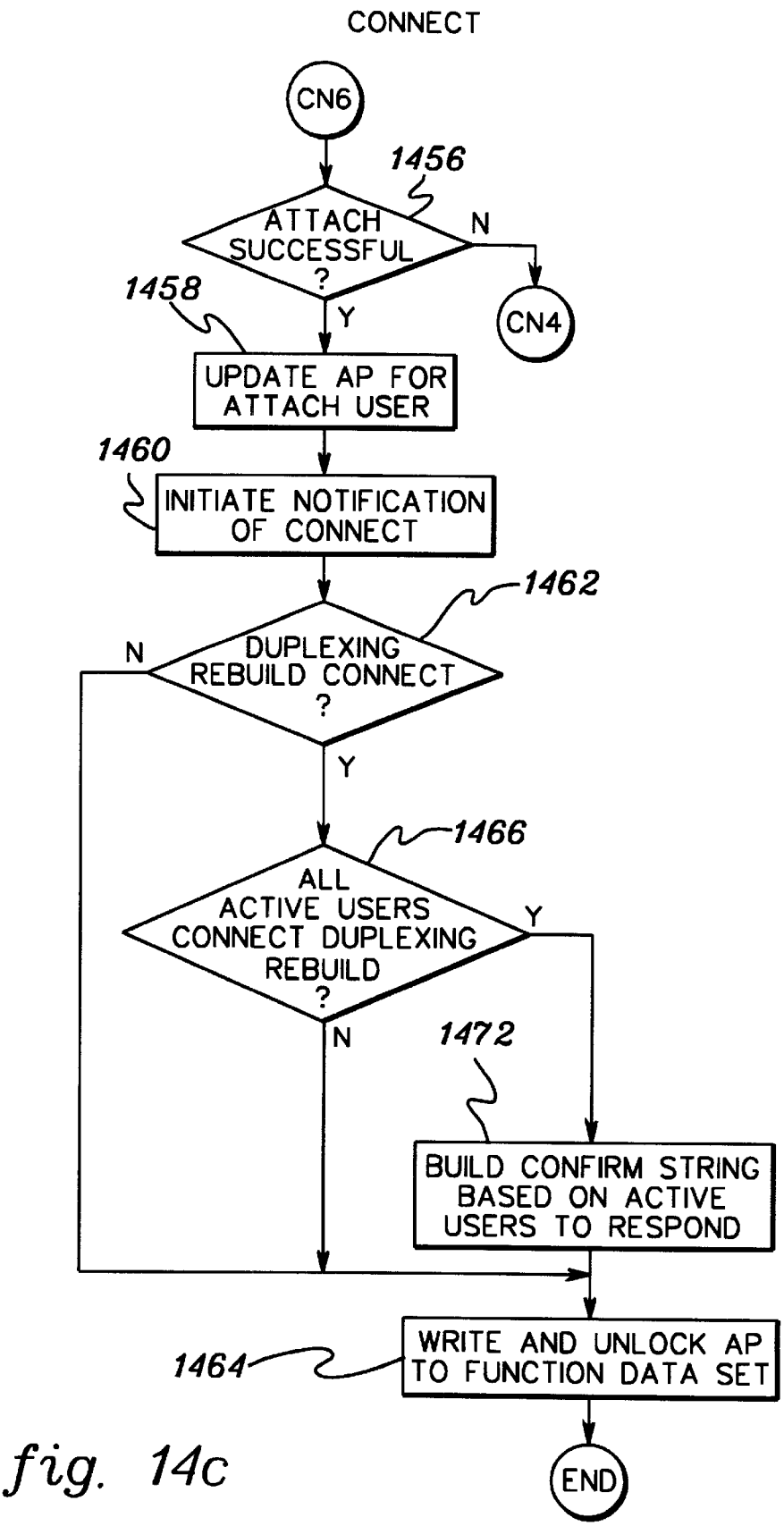
Figure 14D:
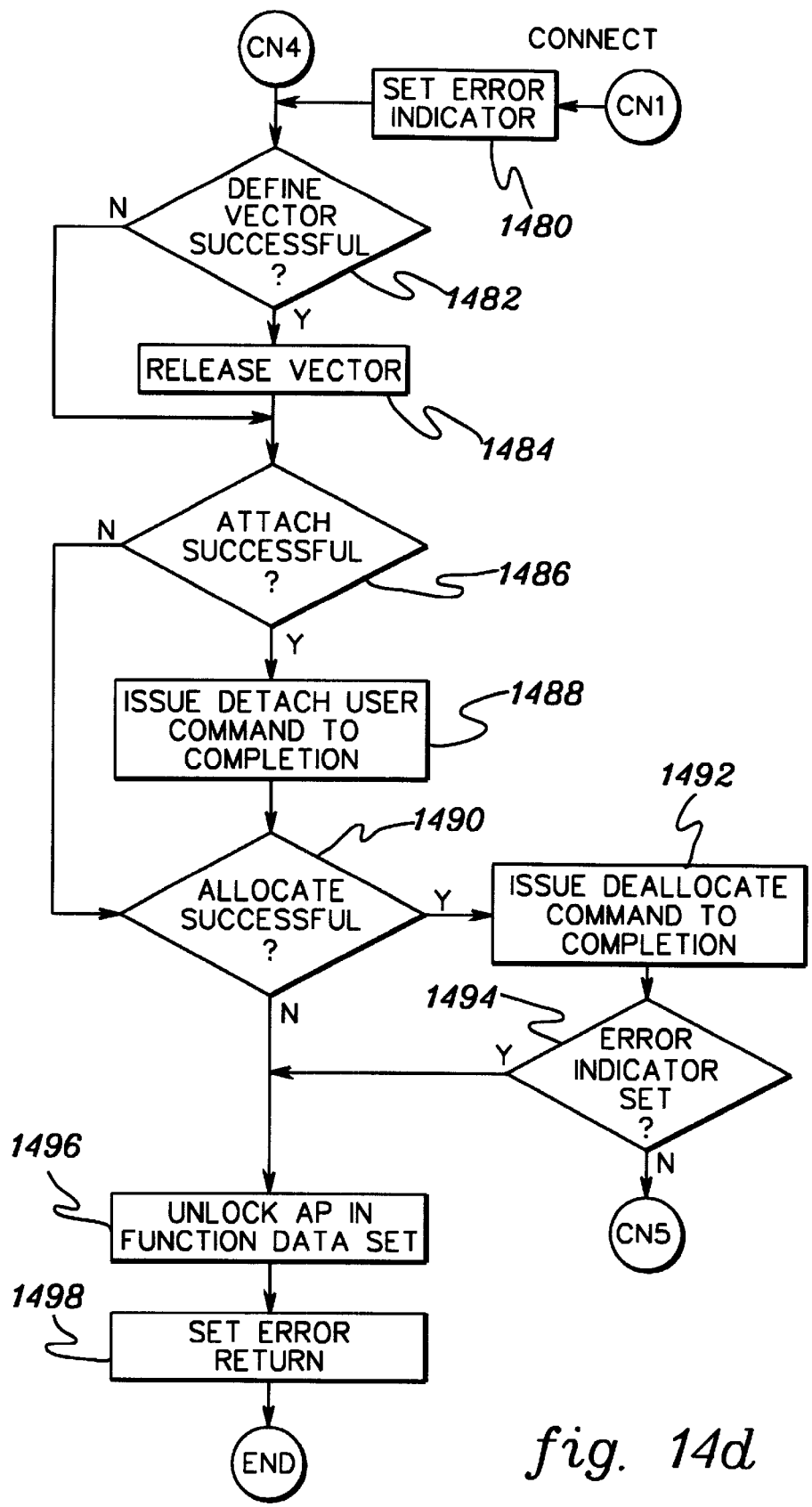

In particular, this inquiry is made to enable back-out of connect processing for failures which occur after the ATTACH successful condition at INQUIRY 1456 of FIG. 14*c*.

Should the attach be successful, a detach user command is processed to completion, STEP 1488 "ISSUE DETACH USER COMMAND TO COMPLETION."

After the detach user command or if the attach was unsuccessful, a determination is made as to whether the allocate was successful, INQUIRY 1490 "ALLOCATE SUCCESSFUL?". Should the allocate be successful, a deallocate command is processed to completion, STEP 1492 "ISSUE DEALLOCATE COMMAND TO COMPLETION."

Subsequent to processing the deallocate command to completion, a check of the error indicator is made, INQUIRY 1494. Should the error indicator not be set, flow returns to INQUIRY 1416 (FIG. 14*a*) "ANY MORE ELIGIBLE FACILITIES?". Otherwise, if the error indicator is set, INQUIRY 1494 (FIG. 14*d*), or if allocate is unsuccessful, INQUIRY 1490, the active policy in the function data set is unlocked, STEP 1496 "UNLOCK AP IN FUNCTION DATA SET," and an error code is returned, STEP 1498 "SET ERROR RETURN."

Returning to INQUIRIES 1402 (FIG. 14*a*), 1404, 1416, 1430, 1440 (FIG. 14*b*), 1446 and 1448, if the structure is undefined, or the structure allocation is incompatible, or there are no more eligible facilities or the allocate is unsuccessful or the name is not failed persistent or the vector definition is unsuccessful or there are not any available user areas in the active policy, flow passes to STEP 1480 (FIG. 14*d*) "SET ERROR INDICATOR." Thereafter, processing continues with INQUIRY 1482 "DEFINE VECTOR SUCCESSFUL?", as described above.

Returning to INQUIRY 1406 (FIG. 14*a*), should the structure allocation be compatible, flow passes to INQUIRY 1434 (FIG. 14*b*) "DUPLEXING REBUILD CONNECT?" and processing continues, as described above.

On successful completion of the IXLCONN service routine, the requesting connected XES user is returned data in the connect answer area specified by the connected XES user through the ANSAREA keyword on the IXLCONN macro. The connect answer area returns a temporary connect token which is used on the mainline services used to access the secondary structure as part of the duplexing rebuild process. The original contoken is used with other interfaces, such as IXLEERSP and IXLREBLD, described herein. The temporary contoken is only presented to IXLCONN, the requester.

For connections to cache structures, the connector's original connect token is re-validated, permitting the connector to access the primary structure, provided that the primary structure is still accessible.

The connect answer area contains an indication of whether the structure the user is connected to is in a special state such as duplexing rebuild in progress or duplexing rebuild stop in progress. Information that the connector would have received in the event exit for a duplexing rebuild start or a duplexing rebuild stop, if the user had been connected at the time the event occurred is provided in the connect answer area.

In addition, the connect answer area contains a connection and structure version number. A structure version number is unique within the scope of a structure name. The structure version number changes (ascending) each time a new structure is allocated for the same structure name. For example, when a new structure is allocated for duplexing rebuild, the structure version number is greater than the structure version number assigned to the original structure. A connection version number is unique within the scope of the structure name. The connection version number changes (ascending) for each new connection. For example, if a failed-persistent connection is reconnected, the new connection version number is greater than the connection version number assigned to the previous instance of the connection. However, when a user invokes the connect service with the REBUILD keyword, the connection version number is equivalent to the original connection's version number because a duplexing rebuild connect request does not define a new connection. A duplexing rebuild connect request only defines additional resources to be owned by the original connection.

The connect answer area also contains information about the rules used to allocate the structure. There are flags in the connect answer area which indicate whether the exclusion list could be used for allocating the structure and whether the structure was allocated in a facility which had full connectivity to the original set of connections. The actual structure size and maximum structure size are returned in the connect answer area. The maximum size is the policy structure size at the time the structure was allocated. A zero return code is set in the cases where the structure is allocated with less space, not according to the exclusion list, or not with full connectivity to the original set of connections.

Further, in the answer area, a connection identifier is presented. This connection identifier is equal to the connection identifier assigned to the original connection. Additionally, attribute information for the coupling facility structure to which the connected XES user is connected is provided. The connected XES user is responsible for verifying that the attributes of the coupling facility structure are acceptable. If the attributes are unacceptable, the user may release its connection by disconnecting, or stop duplexing rebuild processing by issuing IXLREBLD.

Yet further, a vector token and vector length for those connections to a cache structure is provided. This token is needed for accessing the new structure and continues to be needed when duplexing rebuild is complete. This token should only be discarded if the duplexing rebuild is stopped, such that the primary structure instance is retained.

Further, upon successful completion of the IXLCONN REBUILD request, the requesting connected user is connected to the requested coupling facility structure. If the connected XES user is the first to allocate the new coupling facility structure, it is connected to the coupling facility structure in the initialized state. A flag in the connect answer area indicates whether the connection allocated the coupling facility structure or not.

If the connected XES user is not the first to allocate the new coupling facility structure (i.e., it is or was in use by other connections) the requesting connected XES user is connected to a coupling facility structure that may reflect requests previously issued by other connections to the structure.

In addition, upon successful completion, the requester may request all other supported XES functions that are valid for the type of structure to which the user is connected, and the requester is notified about all connections connected to the new structure through its event exit. All active connections to the new structure are also notified of the new connection through their event exits. Information about a new connection is presented by the duplexing rebuild new connection event.

The new connection may receive events describing existing connections before the duplexing rebuild connect request completes. The set of existing connections presented to the new connection is a snap shot of all active and failed-persistent connections defined at the instant the new connection was allocated.

If the duplexing rebuild connect request fails due to task termination before returning to the requester, the rebuild connect failure event is sent to all peer connections. This is the only case where rebuild connect termination is separate from connection termination.

If the user connects after the rebuild process has been initiated, IXLCONN sets a return and reason code indicating that additional status information is available about the connection and/or structure. There are two bits in the connect answer area which indicate whether the structure is in duplexing rebuild or duplexing rebuild stop processing. Both of these states require the connector to participate in the duplexing rebuild process. If the connector does not wish to participate in the duplexing rebuild process, then the connector should disconnect. If the connector does not wish duplexing rebuild processing to continue for the structure, the connector can stop duplexing rebuild processing.

The connect service may return a return code indicating that new connections are not permitted while duplexing rebuild is in process. This return code is set when new connections occur after the duplexing rebuild cleanup phase is entered.

Figure 15:
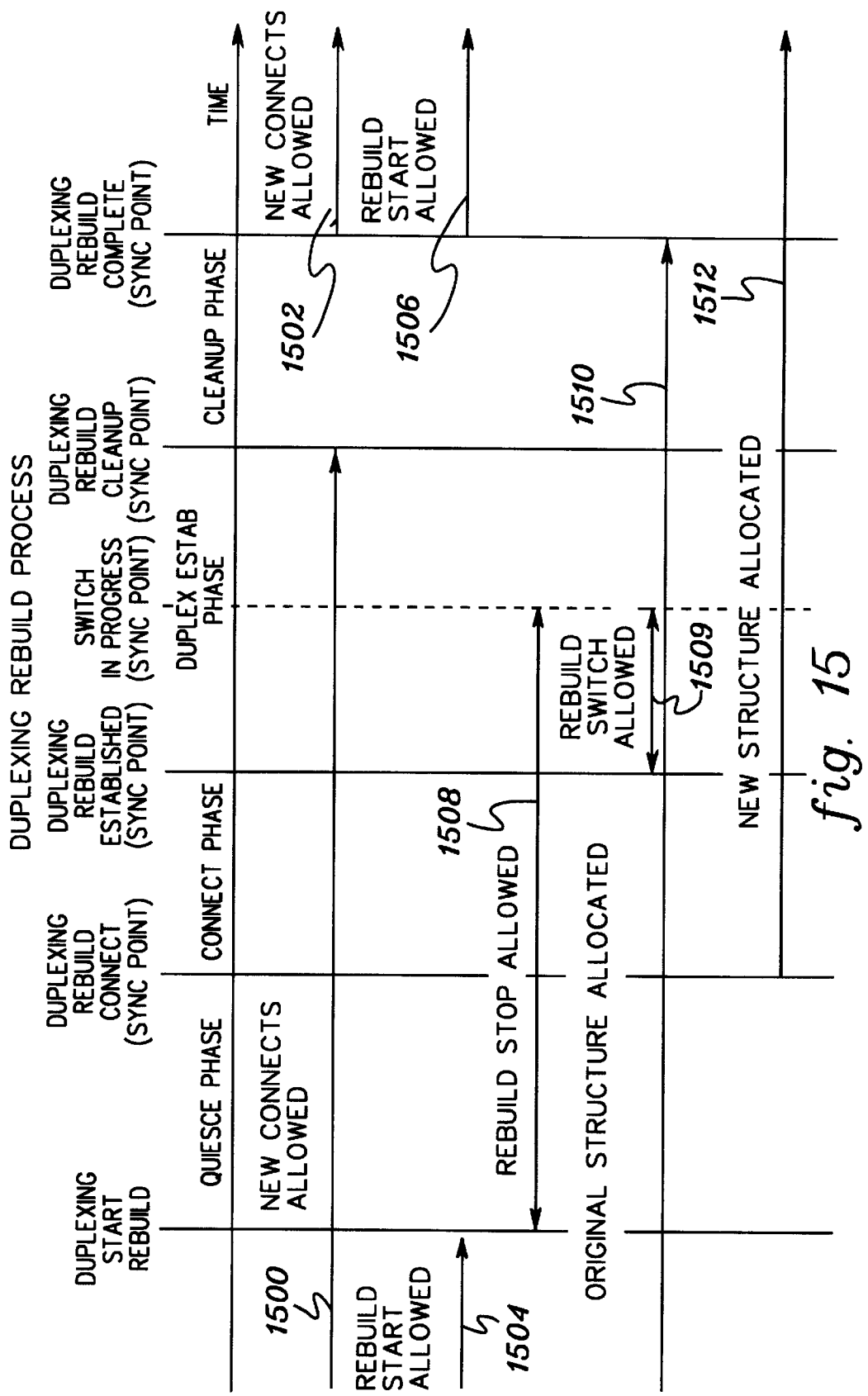
FIG. 15 depicts one embodiment of an overview chart illustrating the synchronization points for the duplexing rebuild process, in accordance with the principles of the present invention.

One embodiment of duplexing rebuild processing is described in detail above, in accordance with the principles of the present invention. As described herein, during duplexing rebuild processing, there are a number of synchronization points. A summary of these points for duplexing rebuild is depicted in FIG. 15. As shown in FIG. 15, there are four phases of duplexing rebuild processing following duplexing start rebuild: the quiesce phase, connect phase, duplex established phase and cleanup phase. Additionally, there are five synchronization points, which include: (1) duplexing rebuild connect, (2) duplexing rebuild established, (3) switch in progress, (4) duplexing rebuild cleanup and (5) duplexing rebuild complete.

Prior to the duplexing rebuild start and the duplexing rebuild cleanup synchronization points, new connections are allowed (reference numeral 1500). When a new original connect is successful, information is passed back to the caller to inform them of the rebuild status. They are then expected to catch up in the duplexing rebuild process, by:

1) Issuing a IXLCONN REBUILD request to connect to the secondary structure;
2) Propagating data from the primary structure into the secondary structure, as appropriate to the exploiter's protocols;
3) Issuing the IXLREBLD COMPLETE request to join the duplex established phase, if the duplex established phase has been reached by the peer connectors; and
4) Issuing a IXLREBLD DUPLEXCOMPLETE request to confirm a switch, if switch has been requested.

New connects are also allowed, after duplexing rebuild is complete (reference numeral 1502).

Prior to the duplexing start rebuild request or subsequent to the duplexing rebuild complete sync point, duplexing rebuild start is allowed (reference numerals 1504 and 1506).

A duplexing rebuild stop (reference numeral 1508) is allowed after a duplexing rebuild start and into the duplex established phase, until a switch is requested.

A duplexing switch is allowed (reference numeral 1509) between the duplexing rebuild established sync point and the switch in progress sync point.

In addition, prior to the duplexing rebuild complete sync point, the original structure is still allocated (reference numeral 1510). A new structure is allocated after the duplexing rebuild connect sync point (reference numeral 1512).

In accordance with the principles of the present invention, after initiating the duplexing rebuild processing, the duplexing rebuild processing may be halted. A duplexing stop rebuild request can be initiated for a number of reasons, including loss of connectivity to the secondary structure, loss of connectivity to the primary structure, structure failure for the primary structure, structure or facility failure of secondary structures, user failure, insufficient connectivity, insufficient structure size, change in plan, operator request, or a connector specific reason with a user code. XES implicitly stops the duplexing rebuild when the secondary structure allocated for duplexing rebuild fails before the duplexing rebuild cleanup phase has been reached. The reason for stopping a duplexing rebuild is provided as input on the IXLREBLD interface using the REASON keyword. The reason provided is presented to all the connectors when they are notified of the duplexing stop rebuild request.

Figure 16A:
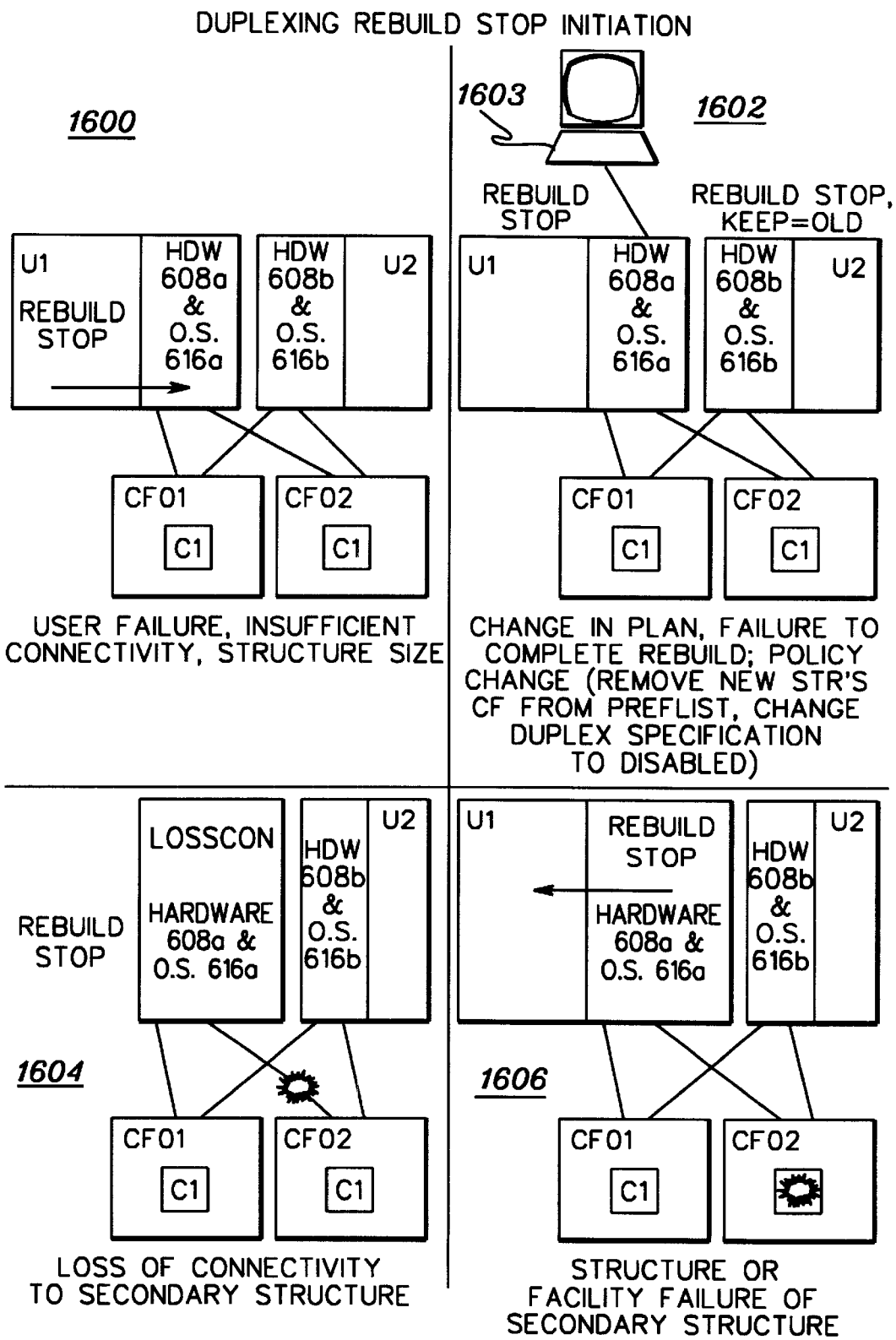

Some of the above causes for initiation are depicted in FIGS. 16a–16b. As shown, in quadrant 1600 (FIG. 16a), a duplexing rebuild stop can be initiated due to user failure, insufficient connectivity and insufficient structure size. For example, assume two users (U1 and U2) are connected via hardware 608a, 608b, respectively, to coupling facility (CF01) and coupling facility (CF02), each of which include a structure C1. Should, for instance, a duplexing rebuild structure in coupling facility CF02 be insufficient in size, user U1 can issue a duplexing rebuild stop.

Referring to quadrant 1602, it is shown that a duplexing rebuild stop command with KEEP=OLD may be issued by an operator at console 1603, which is coupled to operating system 616a via hardware 608a. (The configuration in quadrants 1602, 1604 and 1606 are similar to that of quadrant 1600 and, therefore, are not explained in detail again.) The operating system may issue the stop command due to an operator specified policy change, such as the duplex specification is changed to DISABLED, or the secondary structure's coupling facility is removed from the preference list (Preflist).

Referring to quadrant 1604, if operating system 616a detects a loss of connectivity to the secondary structure, e.g., C1 of CF02, then the operating system may issue a duplexing rebuild stop program request.

Similarly, in quadrant 1606, if operating system 616a detects the failure of a secondary structure, such as C1 in CF02 or of the facility itself, the operating system initiates a duplexing rebuild stop operation and notifies connected users.

Likewise, in FIG. 16b, it is shown that a duplexing switch (with KEEP=NEW) can be initiated, by user U1, due to user failure, insufficient connectivity and insufficient structure size (see quadrant 1608).

Referring to quadrant 1610, it is shown that a duplexing rebuild stop command with KEEP=NEW may be issued by an operator at console 1603. The operator may issue the stop command due to a policy change, such as the old coupling facility is removed from the structure preference list (Preflist).

Referring to quadrant 1612, if operating system 616a detects a loss of connectivity to the primary structure, e.g., C1 of CF01, then the operating system may issue a duplexing rebuild stop program request with KEEP=NEW.

Similarly, in quadrant 1614, if operating system 616a detects the failure of a primary structure, such as C1 in CF01 or of the facility itself, the operating system initiates a duplexing rebuild stop operation and notifies connected users.

In one embodiment, as described above, a duplexing rebuild stop request may be initiated by an operator command, such as SETXCF STOP REBUILD DUPLEX. In one example, the stop command has the following syntax:

```
SETXCF    STOP, REBUILD, DUPLEX
          ,STRNAME=(strname[,strname] ...)
          [,KEEP=NEW|OLD]
          ,CFNAME=(cfname[,cfname] ...)
```

Where:
   STRNAME=(strname[,strname] . . . ) indicates one or more coupling facility structures for which duplexing rebuild is to be stopped.

The KEEP keyword is also specified, which indicates which of the duplexed structures should remain after the duplexing operation has stopped.
      KEEP=NEW specifies that processing should switch to the secondary structure.
      KEEP=OLD specifies that processing should fall back to the primary structure.

If the CFRM active policy specifies that the structure is DUPLEX(ENABLED), it is possible that the system will attempt to duplex the structure again immediately after the completion of the SETXCF STOP processing. To avoid this, the structure's DUPLEX setting is changed in the CFRM policy to DUPLEX(ALLOWED) before initiating the SETXCF STOP or to DUPLEX(DISABLED), which causes XES to initiate the stop processing. The structure's DUPLEX setting can be changed back to DUPLEX (ENABLED) when required.

CFNAME=(cfname[,cfname] . . . ) specifies one or more coupling facilities for which structure duplexing rebuild is to stop.

Duplexing is stopped for each structure in each specified coupling facility so that no structures involved in structure duplexing processing remain in the coupling facility. The structures are processed serially. If the specified coupling facility contains the secondary structure in the duplexed pair of structures, the system falls back to the primary structure. If the specified coupling facility contains the primary structure in the duplexed pair of structures, the system switches to the secondary structure.

When duplexing is stopped for all structures in a coupling facility, there is no need for the operator to specify which structure instance is to be kept. Since, in this embodiment, only one of the two structure instances for a duplexed structure can be allocated in the designated coupling facility, specifying the CFNAME implicitly designates either the primary or secondary structure instance (whichever one happens to be allocated in that coupling facility). On this type of duplexing rebuild stop request, as each duplexed structure is processed, the structure instance which is allocated in the designated coupling facility is the one which will be deallocated; the other structure instance (the one not present in the designated coupling facility) is the one that will be kept as the simplex structure. Since each structure is processed independently, this may result in the primary structure instance being kept as the simplex structure instance for some structures, while the secondary structure instance is kept as the simplex structure instance for other structures. Essentially, this command gives the operator the ability to remove any and all duplexed structure instances from a designated coupling facility, with a single command.

The logic associated with the duplexing rebuild stop command is described above with reference to the rebuild service of FIGS. 10a–10m.

In order for a duplexing rebuild stop request to be successful, the structure is to be in duplexing rebuild, prior to the rebuild switch sync point and there are to be active connections to the structure. Note that if all connections terminate, the duplexing rebuild process automatically stops, is completed, or is left intact in Duplex Established state based on the phase of duplexing rebuild processing.

Once a duplexing rebuild stop request has completed successfully, all connectors are notified via the duplexing rebuild stop event. This event is presented to each connector's event exit. This event requires that the connector stop duplexing into the secondary structure and stop accessing the primary structure. The connector should discard the temporary contoken and the new vector token (if applicable).

In accordance with the principles of the present invention, when a connector disconnects in the middle of the duplexing rebuild process, the user's connection to the primary and potentially the secondary structure are cleaned up. Disconnect processing cleans up the connector's connections to the secondary structure, if the connector had successfully completed an IXLCONN REBUILD request. Peer connections receive a disconnected or failed connection event in their event exit as usual.

If a connection terminates during duplexing rebuild processing, any connections to the structure are notified in their event exit of the disconnect or failed connection event. It is the responsibility of the remaining connections to determine whether the duplexing rebuild process should be continued or stopped because of the terminated connection. When all connections have provided an event exit response for the terminated connection event, outstanding event exit responses for duplexing rebuild related events are cleaned up.

If all connections terminate during duplexing rebuild processing, the duplexing rebuild is automatically terminated, completed or left intact based on the phase of duplexing rebuild processing. Any resources allocated to support the duplexing rebuild process are cleaned up, if it is stopped or completed.

A connection that abnormally terminates during the duplexing rebuild process is placed into a failed persistent state, if the connection specified a connection disposition of KEEP at connect time. However, the connection cannot reconnect between the point where the duplexing rebuild cleanup event is presented up until the duplexing rebuild process completes. After the duplexing rebuild process is complete, the connection may or may not be reconnected depending on the following: 1) whether at the time of failure the duplexing rebuild connect had been successful or not and 2) whether the duplexing rebuild process completed successfully or was stopped.

If the duplexing rebuild connect was not successful at the time of failure and the duplexing rebuild process completed successfully, then the connection would not be reconnected because the user was never connected to the secondary structure.

If the duplexing rebuild connect was not successful and the duplexing rebuild process was stopped, then the connection would be reconnected because the connection was once connected to the structure.

If the duplexing rebuild connect was successful, the connection is reconnected regardless of whether the duplexing rebuild process completed successfully or was stopped. The connection is connected to both the primary and the secondary structure. Therefore, the connection is reconnected to the structure that exists based on whether the duplexing rebuild completed or terminated.

An IXLDISC service is the vehicle by which a connected XES user releases its access to XES services and the coupling facility structure. Upon return from XES, the requesting connected XES user is denied any further access to XES-supported functions. To re-establish access authorization, the connected XES user issues an IXLCONN request. A connected XES user may request IXLDISC services either because it is terminating due to failure or because it no longer requires access to a coupling facility structure.

One embodiment of the syntax associated with an IXLDISC macro is described in detail below. The IXLDISC service routine is given control from the IXLDISC macro to disconnect a user from an XES structure. The IXLDISC service only supports disconnection from a single structure per invocation. If a user wishes to disconnect multiple connections, it issues the IXLDISC macro once for each connection. one example of the syntax is as follows:

```
IXLDISC    CONTOKEN=xcontoken
           [,DISCDATA=xdiscdata|ALL_ZEROES]
           [,REASON={NORMAL|FAILURE}]
           [,RETCODE=xretcode]
           [,RSNCODE=xrsncode]
```

Where:
CONTOKEN(xcontoken) is the name of a required input field that specifies the connect token returned to the invoking user in the answer area when it requested the IXLCONN service.
DISCDATA is the name of an optional input that specifies connector data that is to be provided to other connection's event exits, and can be used as the invoker wishes. DEFAULT: ALL ZEROES
[REASON({NORMAL|FAILURE})] is an optional keyword input which identifies the reason for disconnecting from a structure. The disconnect reason is presented to all surviving connected XES users in the event exit parameter list. The reason in conjunction with the connection disposition affects the state of the connection upon completion of the disconnect. DEFAULT: NORMAL
  NORMAL—Normal termination. The connection disposition specified on IXLCONN does not apply. A disconnect specifying normal termination is considered a normal connection termination; therefore, the connection is not persistent, even if persistence is specified to the IXLCONN service. The connection disposition attribute is applicable only in abnormal terminations such as a disconnect specifying failure, system failure, task termination, and address space termination.
  FAILURE—Termination due to a failure. The connection disposition specified on IXLCONN does apply. The connection is placed in a failed-persistent state, if the connection disposition is KEEP.
[RETCODE(xretcode)] is the name of an optional output variable into which the return code is to be copied from GPR 15.
[RSNCODE(xrsncode)] is the name of an optional output variable into which the reason code is to be copied from GPR 0.

With reference to FIGS. 17*a*–17*f,* one embodiment of the logic associated with the IXLDISC service is described in detail. Initially, the active policy is read from the function data set and a lock is placed in the active policy, STEP 1700 (FIG. 17*a*) "READ AND LOCK THE ACTIVE POLICY (AP) FROM FUNCTION DATA SET." Then, the structure users affected by the disconnect/failed call are selected, STEP 1702 "SELECT STRUCTURE USERS AFFECTED BY DISCONNECT/FAILED CALL." Further, the first affected user is selected, STEP 1704 "SELECT FIRST AFFECTED USER."

If all of the affected users have not been processed, INQUIRY 1706 "ALL AFFECTED USERS PROCESSED?", then the active policy image in virtual storage is updated to reflect the user record as terminating, STEP 1708 "UPDATE AP IMAGE IN STORAGE USER RECORD TERMINATING." Thereafter, the next affected user is selected, STEP 1710 "SELECT NEXT AFFECTED USER" and processing passes to INQUIRY 1706 "ALL AFFECTED USERS PROCESSED?"

When all of the affected users have been processed, the first affected user is selected, STEP 1712 "SELECT FIRST AFFECTED USER." If all of the affected users have not been processed, INQUIRY 1714 "ALL AFFECTED USERS PROCESSED," then a determination is made as to whether there are any active users of the structure, INQUIRY 1716 "ANY ACTIVE USERS OF STRUCTURE?". Should there be no active users of the structure, and the terminating user is persistent, INQUIRY 1718, and termination is not normal, INQUIRY 1720, the user record is marked in the image copy of the active policy as failed-persistent, STEP 1722 "MARK USER FAILED-PERSISTENT IN AP IMAGE," and processing continues, as described herein.

Should the terminating user not be persistent, INQUIRY 1718, or there is normal termination, INQUIRY 1720, then the assigned SSID in the active policy image is freed, STEP 1724 "FREE ASSIGNED SSID IN AP IMAGE." (As used herein, SSID refers to a subsystem ID, which is an LCID for a cache structure.)

Figure 17A:
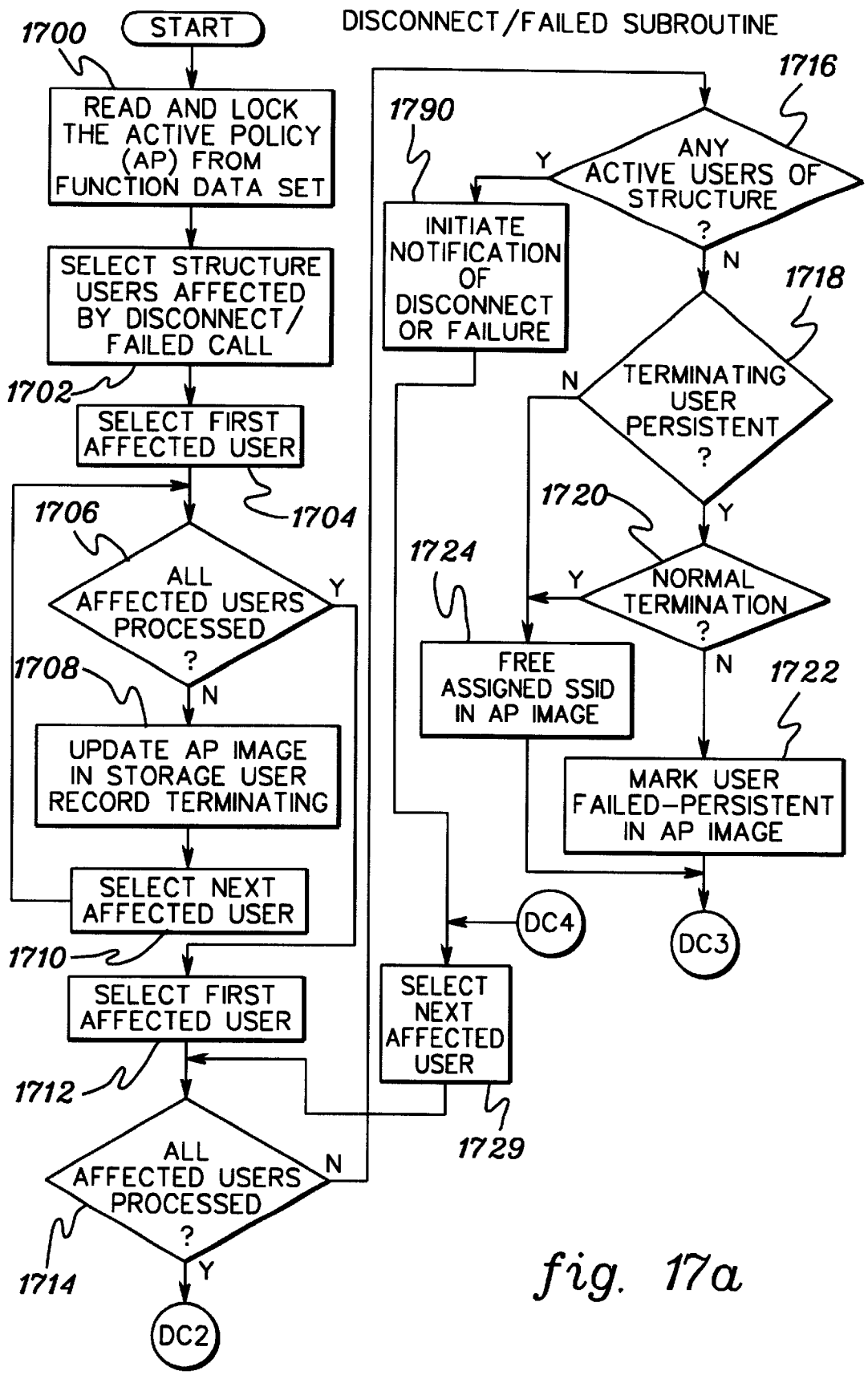
FIGS. 17a-17f depict one embodiment of the logic associated with a disconnect/failed routine, in accordance with the principles of the present invention.
Figure 17B:
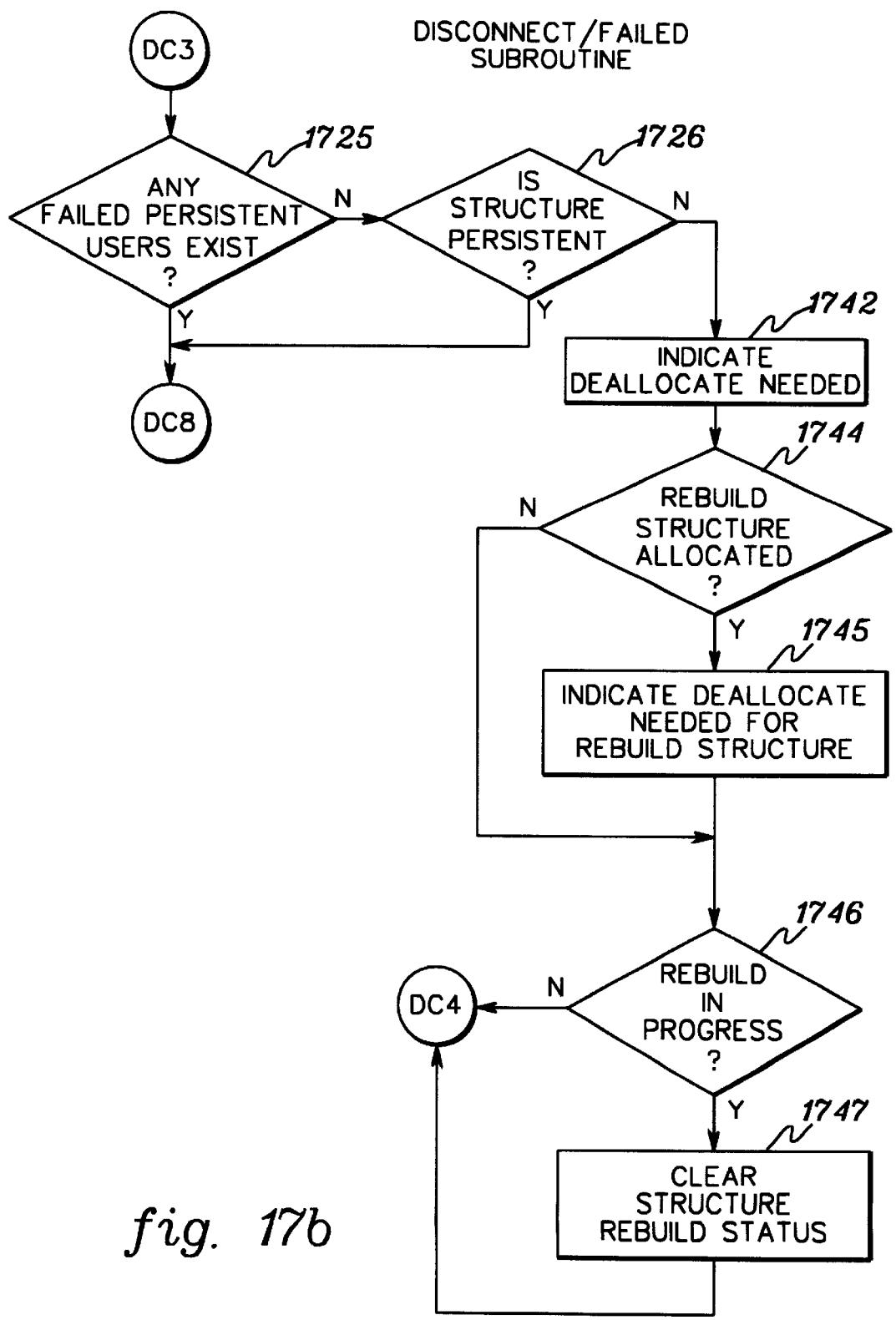
Figure 17C:
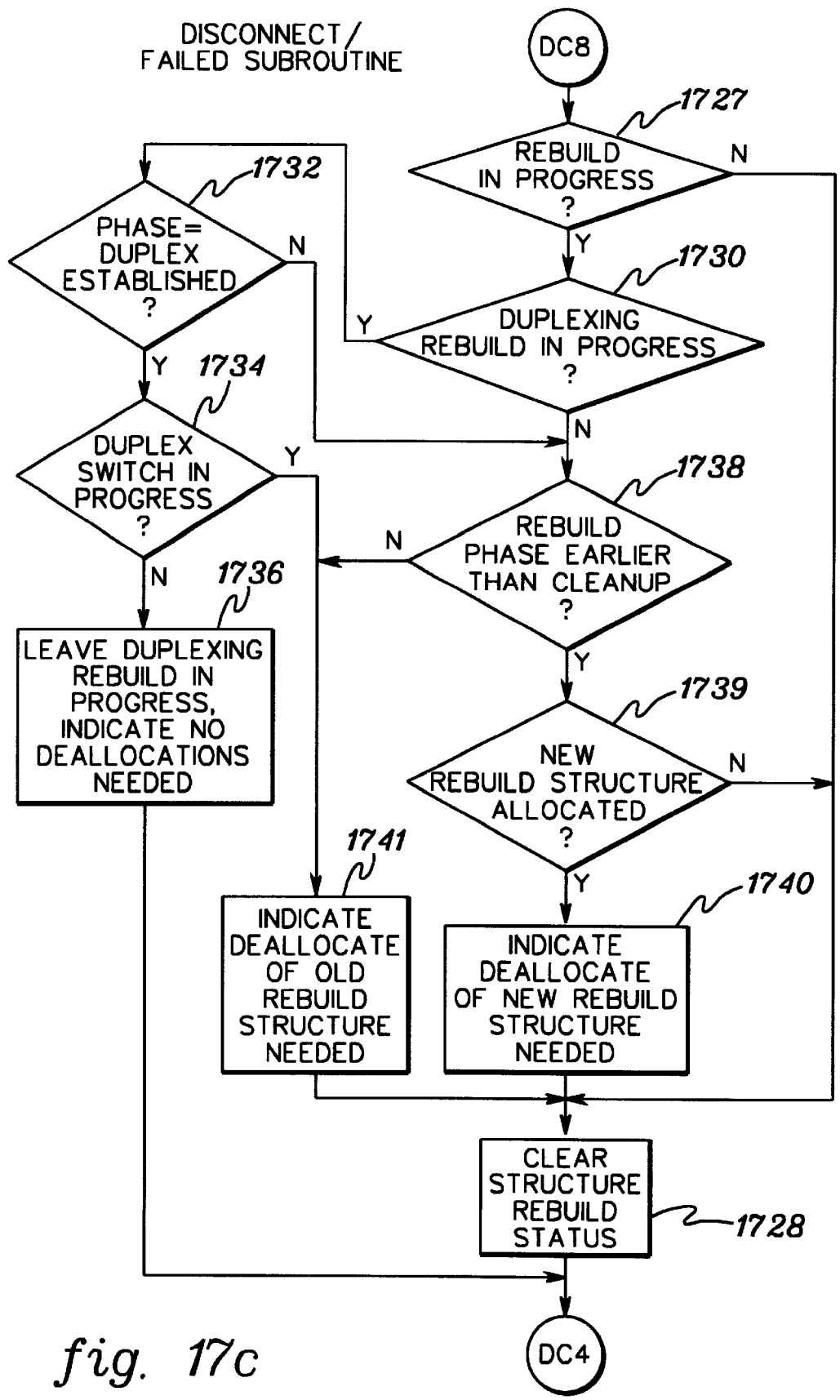
Figure 17D:
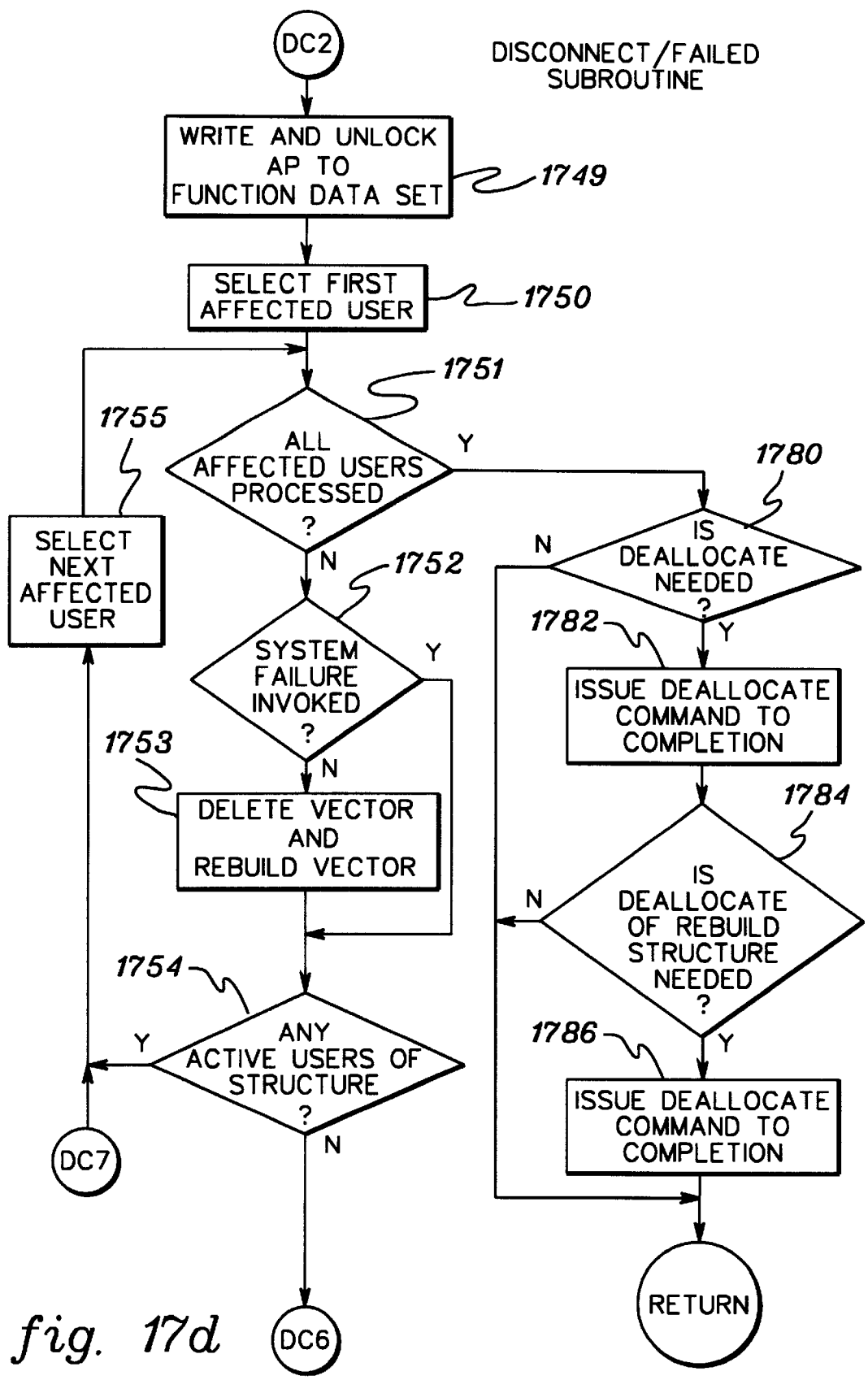

Subsequent to marking the user as failed-persistent or after freeing the assigned SSID, a determination is made as to whether any failed persistent users exist, INQUIRY 1725 "ANY FAILED PERSISTENT USERS EXIST?"(FIG. 17*b*). If failed persistent users do not exist and if the structure is persistent, INQUIRY 1726 "IS STRUCTURE PERSISTENT?", or if failed persistent users exist, then a determination is made as to whether rebuild (i.e., any type of rebuild) is in progress, INQUIRY 1727 (FIG. 17*c*) "REBUILD IN PROGRESS?". If rebuild is not in progress, then flow passes to STEP 1728 "CLEAR STRUCTURE REBUILD STATUS," and the rebuild confirm string is cleared. Subsequent to clearing the status, flow passes to STEP 1729 (FIG. 17*a*) "SELECT NEXT AFFECTED USER," and the next affected user is selected. Thereafter, flow passes to INQUIRY 1714 "ALL AFFECTED USERS PROCESSED?" and processing continues, as described herein.

Returning to INQUIRY 1727 (FIG. 17*c*) "REBUILD IN PROGRESS?", if rebuild is in progress, then a further determination is made as to the type of rebuild. In particular, a determination is made as to whether the rebuild is a duplexing rebuild, INQUIRY 1730. If a duplexing rebuild is in progress, then the phase of duplexing rebuild is checked. For example, a determination is made as to whether the phase is a duplex established phase, INQUIRY 1732. If the phase is the duplex established phase, then a further determination is made as to whether a duplex switch is in progress, INQUIRY 1734. If a switch has not been requested, then the two structure instances have been determined to be in a consistent state, and the duplexing rebuild is left in the duplex established state, STEP 1736. Since new original connects are allowed while the rebuild is in the duplex established phase, duplexing can resume as soon as the first user connects/reconnects.

Returning to INQUIRY 1730, if duplexing rebuild is not in progress, then a further determination is made as to whether the rebuild phase is earlier than the cleanup phase, INQUIRY 1738 "REBUILD PHASE EARLIER THAN CLEANUP?". If the rebuild phase is earlier than the cleanup phase, and the new rebuild structure is allocated, INQUIRY 1739 "NEW REBUILD STRUCTURE ALLOCATED?", then an indication is made that deallocation of the new rebuild structure is needed, STEP 1740 "INDICATE DEALLOCATE OF NEW REBUILD STRUCTURE NEEDED." Subsequently, the structure rebuild status in the structure record is cleared, STEP 1728. In particular, the rebuild confirm string is cleared. Thereafter, processing continues with STEP 1729 "SELECT NEXT AFFECTED USER."

Returning to INQUIRY 1739 (FIG. 17*c*), if the rebuild structure is not allocated, then processing continues with STEP 1728 "CLEAR STRUCTURE REBUILD STATUS."

Returning to INQUIRY 1738 (FIG. 17*c*) "REBUILD PHASE EARLIER THAN CLEANUP?", if the rebuild phase is not earlier than cleanup, then an indication is made that deallocation of the old rebuild structure is needed, STEP 1741. Subsequently, the structure rebuild status is cleared, STEP 1728, and processing continues with STEP 1729 (FIG. 17*a*) "SELECT NEXT AFFECTED USER."

Returning to INQUIRY 1732 "PHASE=DUPLEX ESTABLISHED?", if the phase is not the duplex established phase, then processing continues with INQUIRY 1738 "REBUILD PHASE EARLIER THAN CLEANUP?".

Further, returning to INQUIRY 1734, if the duplex switch is in progress, then processing continues with STEP 1741 "INDICATE DEALLOCATE OF OLD REBUILD STRUCTURE NEEDED".

Returning to INQUIRY 1726 (FIG. 17*b*) "IS STRUCTURE PERSISTENT?", if the structure is not persistent, then an indication is made in the active policy that deallocation is needed, STEP 1742 "INDICATE DEALLOCATE NEEDED." Thereafter, a determination is made as to whether the rebuild structure is allocated, INQUIRY 1744 "REBUILD STRUCTURE ALLOCATED?". Should the rebuild structure be allocated, an indication is made that deallocation is needed for the rebuild structure, STEP 1745. Thereafter, or if the rebuild structure is not allocated, INQUIRY 1744, a determination is made as to whether any type of rebuild is in progress, INQUIRY 1746 "REBUILD IN PROGRESS?". If rebuild is in progress, the structure rebuild status is cleared, STEP 1747 "CLEAR STRUCTURE REBUILD STATUS." Subsequent to clearing the rebuild status or if rebuild is not in progress, INQUIRY 1746, processing continues with STEP 1729 (FIG. 17*a*) "SELECT NEXT AFFECTED USER," as described herein.

If all of the affected users are processed, INQUIRY 1714 (FIG. 17*a*), then the information located in the virtual storage image of the active policy is written to the function data set and the function data set is unlocked, STEP 1749 (FIG. 17*d*) "WRITE AND UNLOCK AP TO FUNCTION DATA SET."

Thereafter, the first affected user is selected, STEP 1750 "SELECT FIRST AFFECTED USER," and if all of the affected users have not been processed, INQUIRY 1751 "ALL AFFECTED USERS PROCESSED?", a check is made to determine if the disconnect/failed subroutine was invoked due to a system failure, INQUIRY 1752 "SYSTEM FAILURE INVOKED?". If not invoked by a system failure, then the vector and the rebuild vector are deleted, STEP 1753 "DELETE VECTOR AND REBUILD VECTOR." (The duplexing rebuild vector is created in the same manner as the vector, as described above.)

Subsequent to deleting the vectors, or if invoked by a system failure, a determination is made as to whether there exists any active users of the structure, INQUIRY 1754. "ANY ACTIVE USERS OF STRUCTURE?". Should there be active users of the structure, the next affected user is selected, STEP 1755 "SELECT NEXT AFFECTED USER" and flow passes to INQUIRY 1751 "ALL AFFECTED USERS PROCESSED?".

Figure 17E:
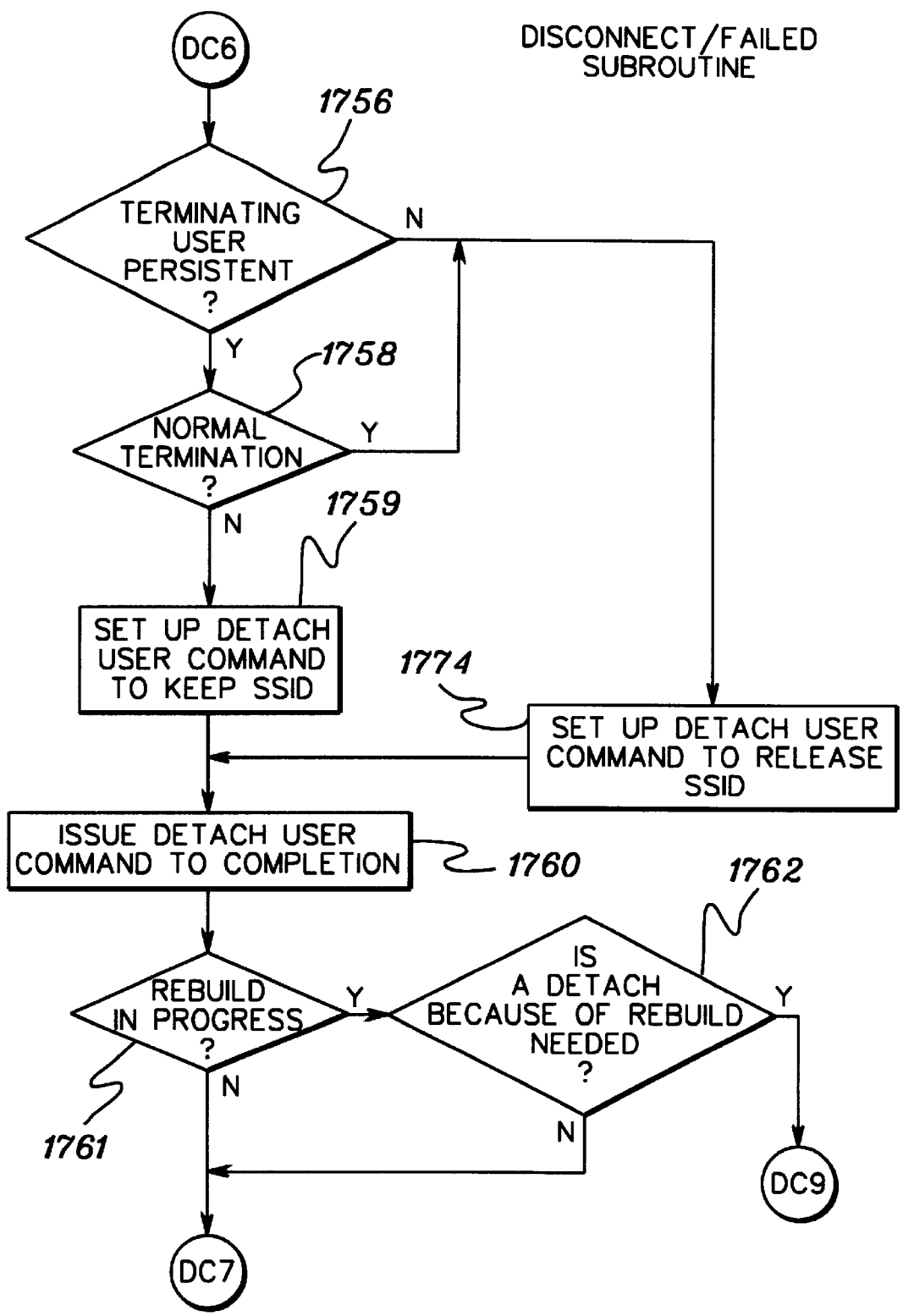

If there are no active users of the structure, a determination is made as to whether a persistent user is being terminated, INQUIRY 1756 (FIG. 17*e*). Should a persistent user be terminating, then a further check is made as to whether termination is normal, INQUIRY 1758. If there is an abnormal termination, a detach user command is set up in order to keep the SSID, STEP 1759 "SET UP DETACH USER COMMAND TO KEEP SSID." Subsequent to setting up the detach user command, it is processed to completion, STEP 1760 "ISSUE DETACH USER COMMAND TO COMPLETION."

After completing the detach user command, a determination is made as to whether any type of rebuild is in progress, INQUIRY 1761 "REBUILD IN PROGRESS?". If any type of a rebuild is in progress, another inquiry is made to determine if a detach is needed because of rebuild, INQUIRY 1762 "IS A DETACH BECAUSE OF REBUILD NEEDED?". Should a detach not be needed or if rebuild is not in progress, flow passes to STEP 1755 (FIG. 17*d*) and the next affected user is selected, STEP 1755, "SELECT NEXT AFFECTED USER." Thereafter, flow passes to INQUIRY 1751 "ALL AFFECTED USERS PROCESSED?" and processing continues, as described herein.

Figure 17F:
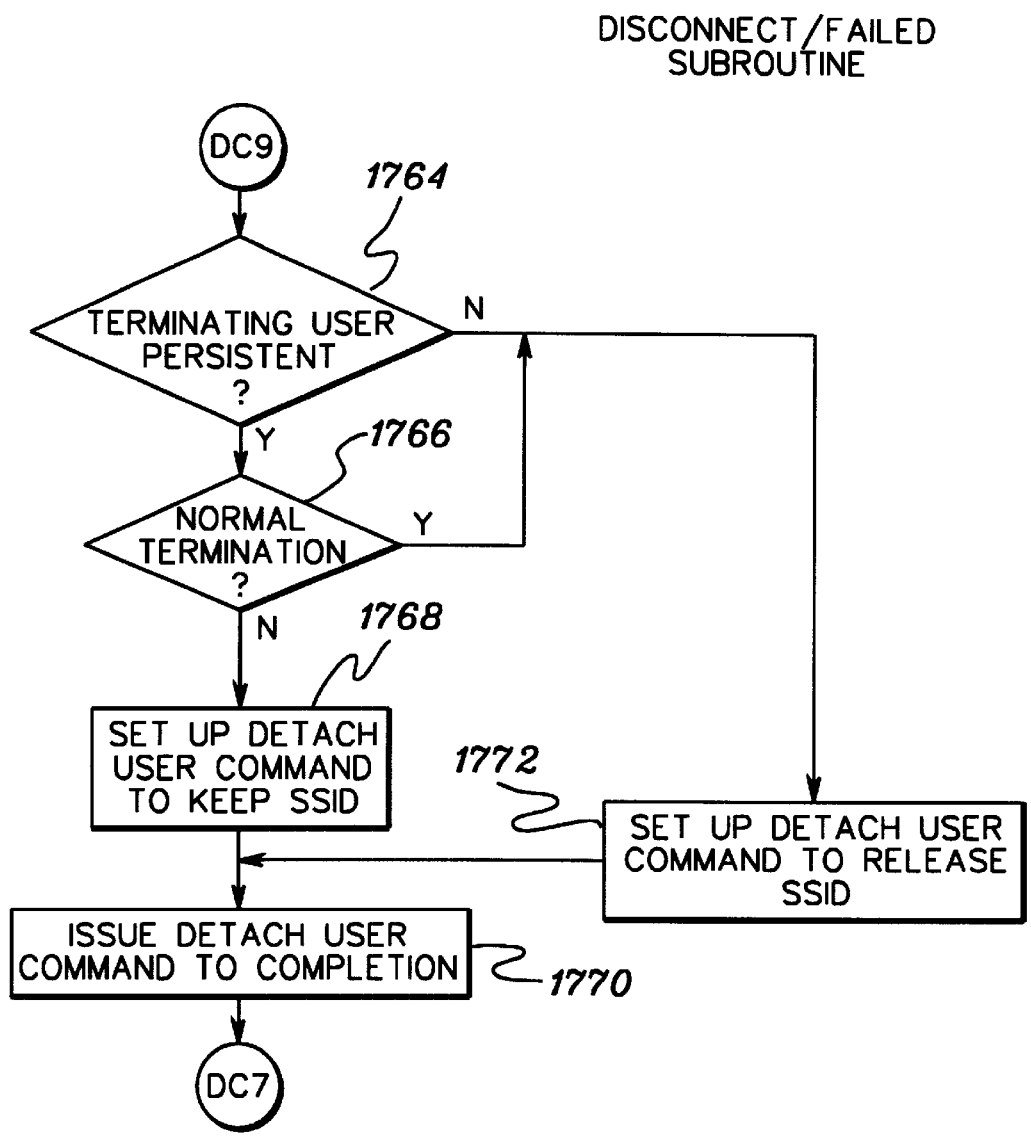

Returning to INQUIRY 1762 (FIG. 17*e*) "IS A DETACH BECAUSE OF REBUILD NEEDED?", if a detach is needed because of rebuild, then a further check is made to determine whether the terminating user is persistent, INQUIRY 1764 (FIG. 17*f*). Should the terminating user be persistent and should termination be abnormal, INQUIRY 1766, then the detach user command is set up to keep the SSID, STEP 1768 and processed to completion, STEP 1770 "ISSUE DETACH USER COMMAND TO COMPLETION." Subsequently, processing continues with STEP 1755 (FIG. 17*d*) "SELECT NEXT AFFECTED USER."

Returning to INQUIRY 1764 (FIG. 17*f*) "TERMINATING USER PERSISTENT?", if the terminating user is not persistent, or termination of the persistent user is normal, INQUIRY 1766, the detach user command is set up to release the SSID, STEP 1772. Subsequently, the detach user command is processed to completion, STEP 1770, and flow passes to STEP 1755 (FIG. 17*d*) "SELECT NEXT AFFECTED USER."

Returning to INQUIRY 1756 (FIG. 17*e*) "TERMINATING USER PERSISTENT?", if a persistent user is not being terminated, or if a persistent user is terminating normally, INQUIRY 1758, the detach user command is set up to release the SSID, STEP 1774, and the detach user command is processed to completion, STEP 1760. Subsequent to processing the detach user command, processing continues with INQUIRY 1761, as described above.

Returning to INQUIRY 1751 (FIG. 17*d*) "ALL AFFECTED USERS PROCESSED?", if all of the affected users are processed, then a check is made to see if deallocation is needed, INQUIRY 1780 "IS DEALLOCATE NEEDED?". If it is needed, the deallocate command is processed to completion, STEP 1782 "ISSUE DEALLOCATE COMMAND TO COMPLETION." After issuing the deallocate command, a determination is made as to whether deallocation of the duplexing rebuild structure is needed, INQUIRY 1784. Should deallocation be necessary, then the deallocate command is processed to completion, STEP 1786, and processing of the disconnect/failed subroutine is complete.

Returning to INQUIRY 1780 (FIG. 17*d*), if deallocate is not needed, or if deallocate of the duplexing rebuild structure is not needed, INQUIRY 1784, then processing of the disconnect/failed subroutine is complete.

Returning to INQUIRY 1716 (FIG. 17*a*) "ANY ACTIVE USERS OF STRUCTURE?", should there be any active users, notification of disconnect or failure is initiated, STEP 1790 "INITIATE NOTIFICATION OF DISCONNECT OR FAILURE", and then processing continues with STEP 1729.

Figure 18:
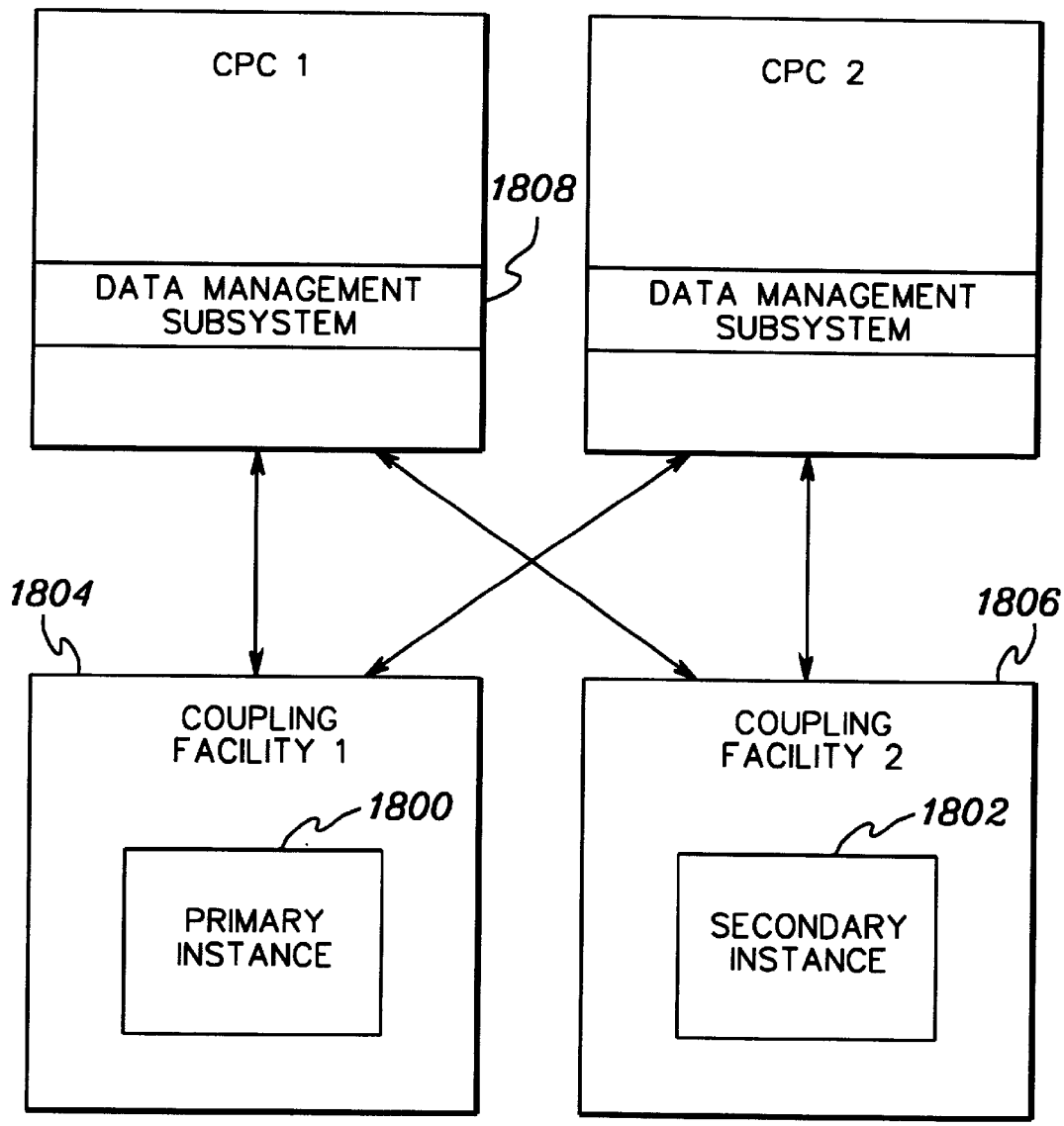
FIG. 18 depicts one example of a computing environment having a duplexed structure instance, in accordance with the principles of the present invention.

In accordance with the principles of the present invention, when a coupling facility cache structure is duplexed (the duplex established phase), there are two physical structure instances (see FIG. 18): a primary structure instance 1800 and a secondary structure instance 1802. In one embodiment, each of the structure instances is located within a different coupling facility. For example, primary instance 1800 resides in a coupling facility 1804, and secondary instance 1802 resides in a coupling facility 1806.

Selective data is written to both structure instances. For example, a data management subsystem 1808 (e.g., DB2) writes changed data to both the structure instances, so that in the event of a failure of one of the structure instances, no changed data is lost. The data in the other structure instance can continue to be used. In this one example, unchanged data is not duplexed. However, in another embodiment, all data items may be duplexed or duplexing may be based on another selection criterion.

One example of the logic used to perform duplexed writes, in accordance with the principles of the present invention, is described with reference to FIG. 19. The logic of FIG. 19 is implemented by, for instance, database management facility 110.

Figure 19:
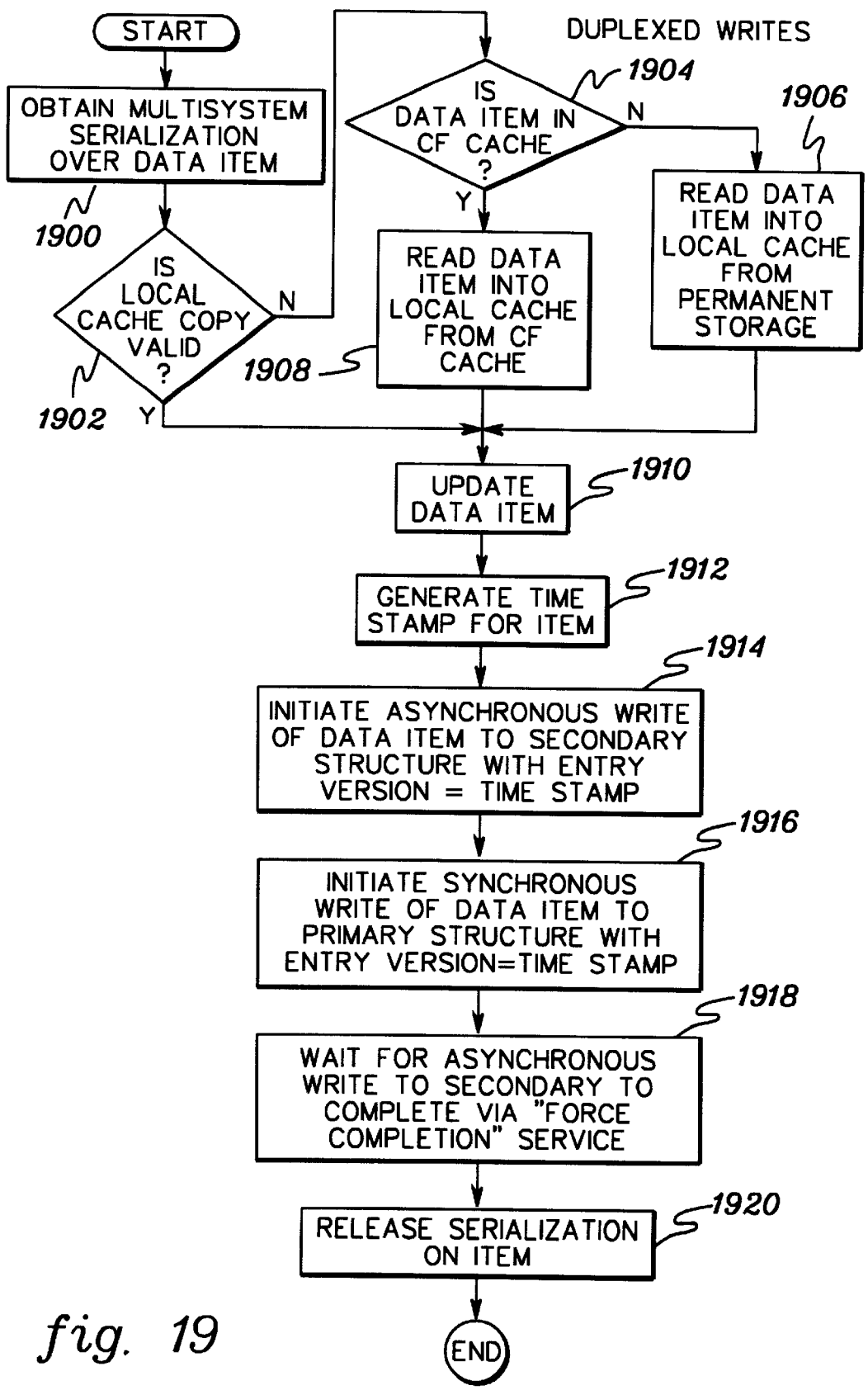
FIG. 19 depicts one embodiment of the logic associated with duplexed writes, in accordance with the principles of the present invention.

Referring to FIG. 19, initially, multisystem serialization over the data item to be updated in the two cache structure instances is obtained, STEP 1900. This serialization prevents any other 'subsystem instance from making a subsequent update of the data item until both the write to the primary and secondary instances are complete for the current update. If serialization was not provided, then different update levels of the data could be written to the structure in an unpredictable, interleaved manner, destroying the integrity of the duplexing protocol. Overlapping the two write commands under the same serialization prevents this interleaving between different updates to the data, while at the same time minimizes the elapsed time to write out any one particular data item update to the cache structures. One embodiment of such serialization is described in U.S. Pat. No. 5,339,427, "Method And Apparatus Of Distributed Locking For Shared Data, Employing A Central Coupling Facility", issued Aug. 16, 1994, which is hereby incorporated herein by reference in its entirety.

After serialization is obtained, a valid copy of the data item is located. In particular, a determination is made as to whether the local cache copy of the data item is valid, INQUIRY 1902. If the local cache copy is invalid, as determined by status associated with the local cache copy, then the cache structure is interrogated to determine if the data item is located therein, INQUIRY 1904. If the data item is not in the cache, then the item is read into the local cache from permanent storage, STEP 1906. However, if the data item is in the cache, then the data item is read into the local cache from the coupling facility cache, STEP 1908. After obtaining a valid copy of the data item, the data item is updated in the local cache with the required changes, STEP 1910.

Thereafter, a timestamp is generated for the data item, indicating when it was updated relative to other updates, STEP 1912. This timestamp is generated, for example, by an ESA/390 timing facility, which ensures a consistent time on all systems of the sysplex.

Subsequently, an asynchronous coupling facility write operation is initiated to write the data item from the local cache to the secondary (new) structure instance, STEP 1914. The timestamp is passed to the write operation and is written as the cache entry version number indicating the currency of the data. During this write, registration of interest in the cache directory is suppressed. Control from the write returns before the write has been completed. The write command also requests NRC=0, since there are no registrations in the secondary.

Figure 20:
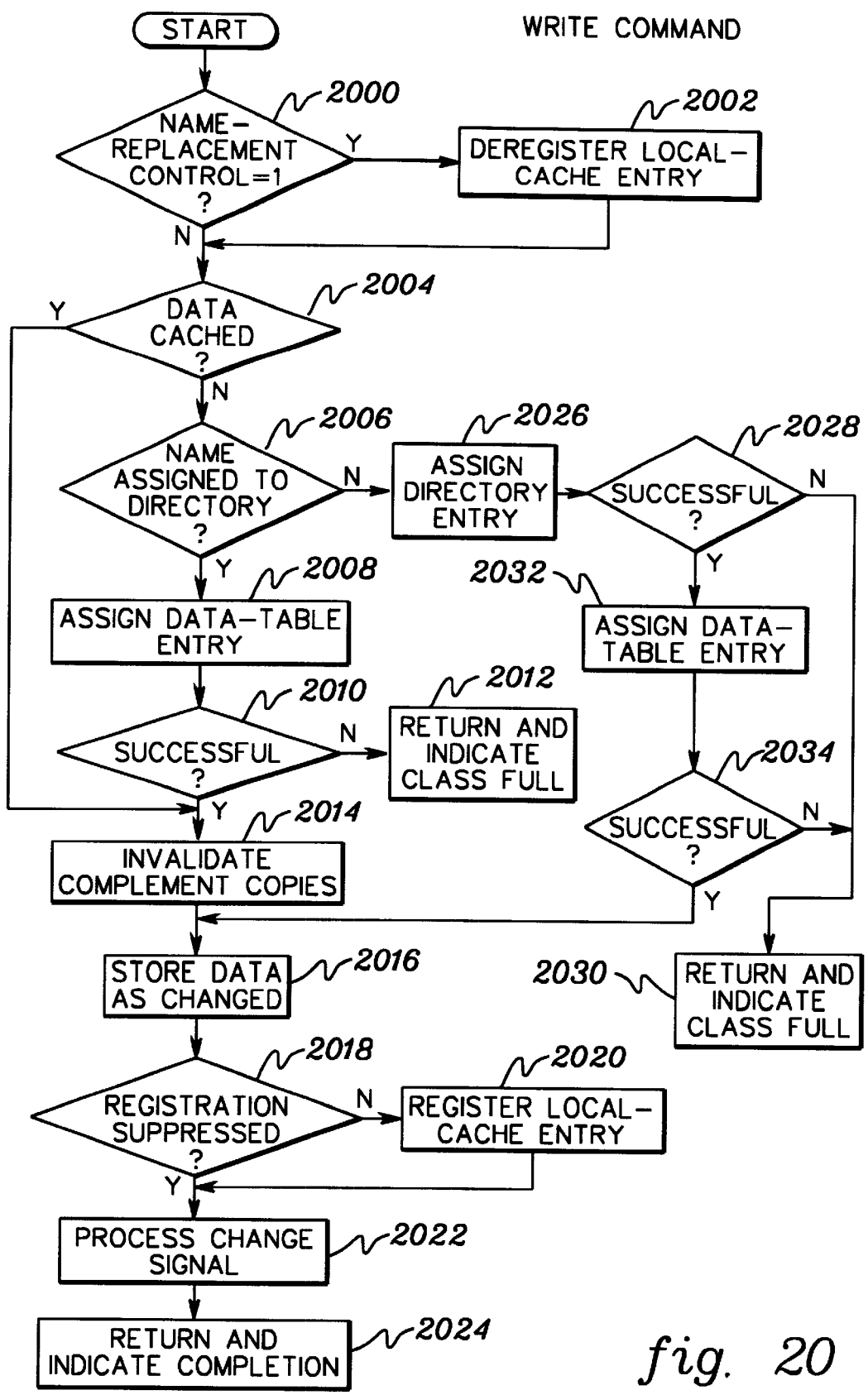
FIG. 20 depicts one embodiment of the logic associated with a write command, in accordance with the principles of the present invention.

One example of a write and suppress registration command is described in detail with reference to FIG. 20. Initially, a name-replacement control is checked to determine if it is equal to one, INQUIRY 2000. If the name replacement control is equal to one indicating that the name of the data item is to be replaced, then the local cache entry having the data item is deregistered, INQUIRY 2002. Thereafter, or if the name replacement is to be suppressed, then a further inquiry is made as to whether the data is cached, INQUIRY 2004. Should the data not be cached, then a further check is made to determine whether the name is assigned to a directory, INQUIRY 2006. If the name is assigned to a directory, then the data table entry is assigned, STEP 2008. Should the assignment of the data table entry be unsuccessful, INQUIRY 2010, then an exception is returned indicating that the class is full, STEP 2012. However, if the assignment is successful, then other copies of the data in other local caches are made invalid through the invalidate complement copies process, STEP 2014. For duplexing in the secondary structure, registration is suppressed so the cross-invalidate is a no-op.

Thereafter, the data is stored as changed, STEP 2016. Subsequently, in accordance with the principles of the present invention, a determination is made as to whether registration is to be suppressed, INQUIRY 2018. If registration is not to be suppressed, then the local cache entry is registered, STEP 2020. Thereafter, or if the registration is to be suppressed, then a change signal is processed, STEP 2022, and the write process is complete, STEP 2024.

Returning to INQUIRY 2006, if the name is not assigned to a directory, then a name assignment is performed, STEP 2026. If the name assignment was not successful, INQUIRY 2028, then an exception is returned indicating that the class is full, STEP 2030. However, if the assignment was successful, then the data table entry is assigned, STEP 2032. Should that assignment be unsuccessful, INQUIRY 2034, then once again an exception is returned indicating that the class if full, STEP 2030. However, if the assignment of the data table entry is successful, then processing continues with STEP 2016.

Returning to inquiry 2004 if the data is cached, then processing continues with STEP 2014 "INVALIDATE COMPLEMENT COPIES".

Returning to FIG. 19, as the asynchronous write operation proceeds, a synchronous write is initiated to the primary structure instance, STEP 1916. Again, the ordering timestamp is written as the cache entry version number. During this write operation, registration of interest in the cache directory is not suppressed. One example of this write is described above with reference to FIG. 20. Control from this write does not return until the write is complete. This primary write may specify NRC=0 or NRC=1.

(Further details regarding the above write operation, with the exclusion of the suppress registration option, is described in U.S. Pat. No. 5,537,574, by Elko et al., entitled "Sysplex Shared Data Coherency Method", issued on Jul. 16, 1996, which is hereby incorporated herein by reference in its entirety.)

Thereafter, completion of the command that is performing the asynchronous write to the secondary is forced, via a force completion service, STEP 1918. One example of a force completion service is described in "OS/390 MVS Sysplex Service Guide", IBM Publication No. GC28-1771, 05, (September 1998), and "OS/390 MVS Sysplex Services Reference", IBM Publication No. GC28-1772-05, (September 1998), each of which is hereby incorporated herein by reference in its entirety.

Once the secondary write operation is complete, the changed data item is updated in both structure instances, and thus, serialization is released, STEP 1920.

As an alternative to the above embodiment, a given data item can be updated multiple times with the write to the coupling facility encompassing all of those updates. In that case, the timestamp represents the time of the first change to the data item.

In the above embodiment, writes to the primary and secondary structure overlap by executing one of the writes asynchronously. This implies that the writes to the primary and secondary structure for a given update to a data item can execute in any order; it is unpredictable whether the primary or secondary structure update will occur first.

Periodically changed data located within the cache structures are written from the cache structures to permanent storage (e.g., DASD). In order to perform this function, castout processing is used. Castout processing is described in detail in U.S. Pat. No. 5,493,668, Elko et al., entitled "Multiple Processor System Having Software For Selecting Shared Cache Entries Of An Associated Castout Class For Transfer To A DASD With One I/O Operation," issued on Feb. 20, 1996 to International Business Machines Corporation, Armonk, N.Y.; U.S. Pat. No. 5,457,793, Elko et al., entitled "Software Cache Management Of A Shared Electronic Store In Supplex," issued on Oct. 10, 1995 to International Business Machines Corporation, Armonk, N.Y.; and U.S. Pat. No. 5,537,574, Elko et al., entitled "Sysplex Shared Data Coherency Method," issued on Jul. 16, 1996 to International Business Machines Corporation, Armonk, N.Y., each of which is hereby incorporated herein by reference in its entirety.

Figure 21:
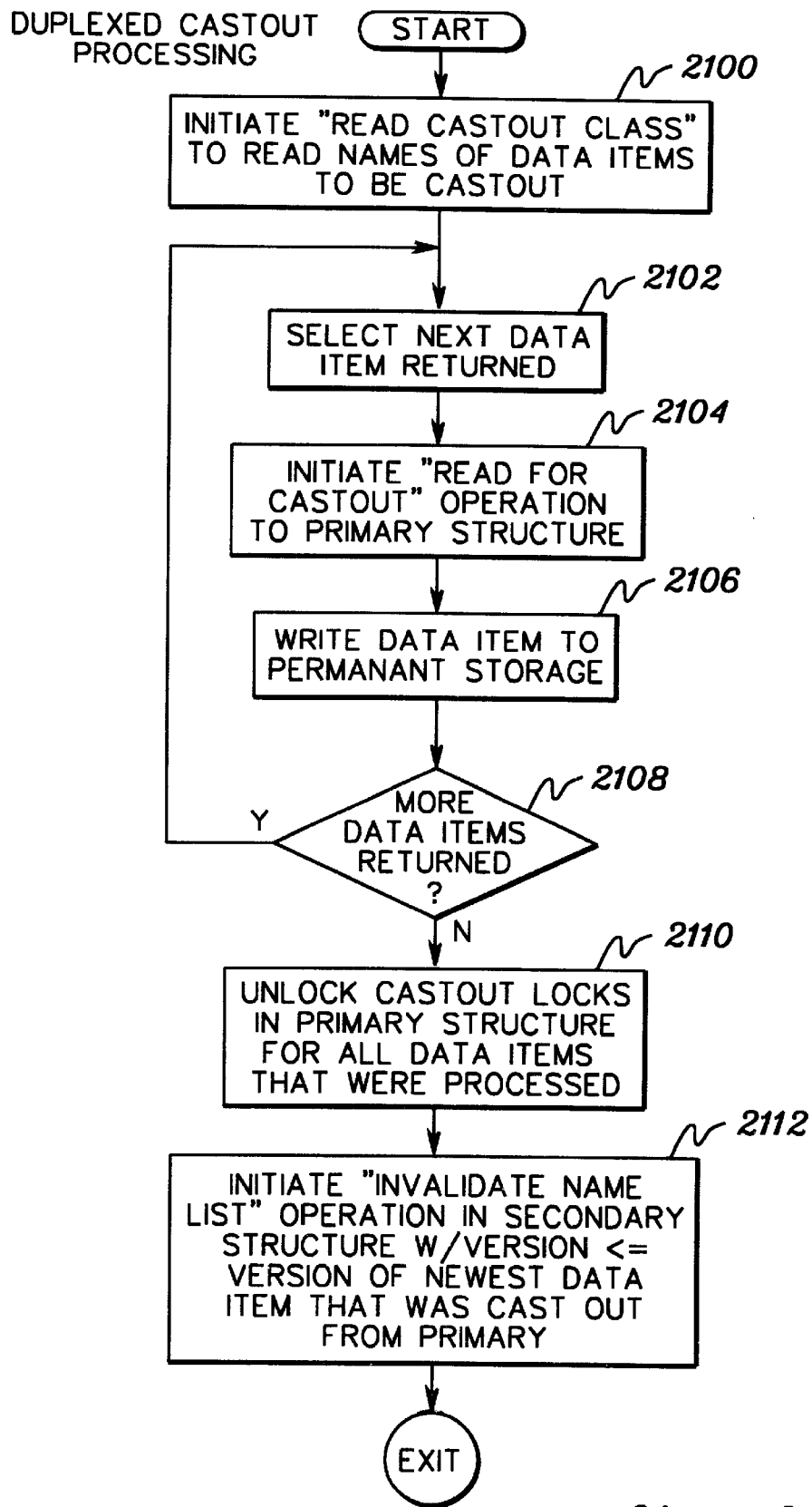
FIG. 21 depicts one embodiment of the logic associated with duplexed castout processing, in accordance with the principles of the present invention.

In accordance with the principles of the present invention, when castout processing is required, a process is invoked to ensure that the data items being castout are correctly marked in both structure instances. To accomplish this, a read castout class operation is initiated against the primary structure instance to obtain a list of-cache entry names to be castout, STEP 2100 (FIG. 21). Then, the first item returned is selected, STEP 2102.

Figure 22:
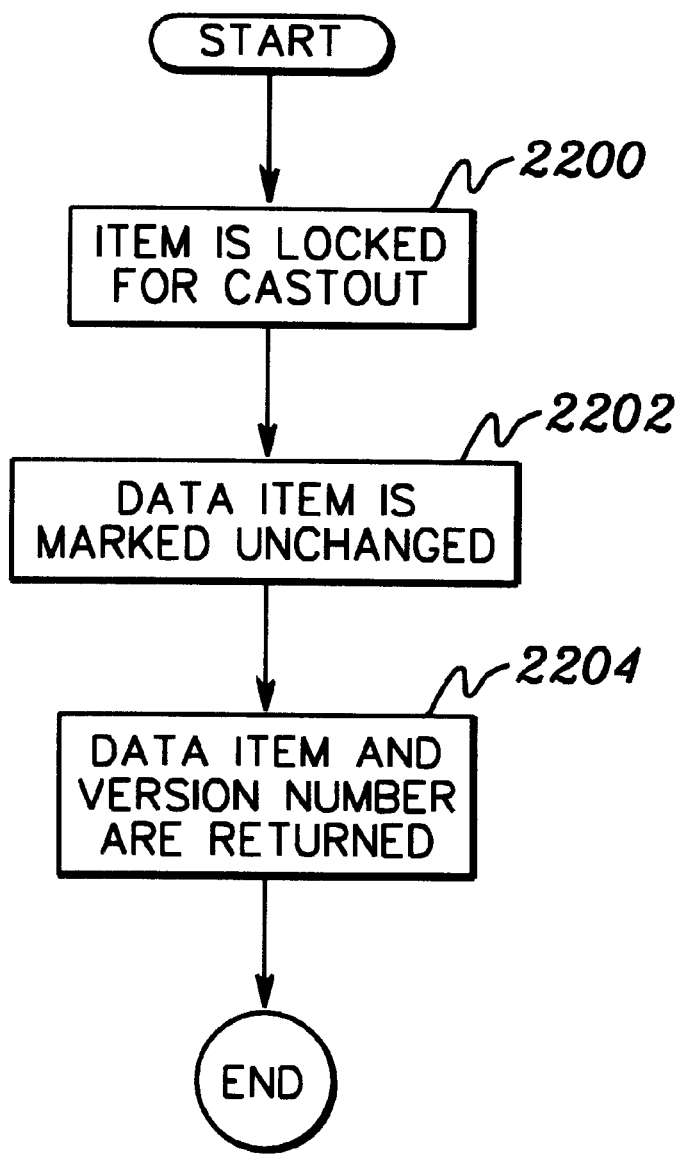
FIG. 22 depicts one embodiment of the logic associated with a read for castout command, in accordance with the principles of the present invention.

Subsequently, a read for castout command is initiated against the primary structure instance, STEP 2104. One embodiment of the logic associated with the read for castout command is described in detail with reference to FIG. 22. Initially, the data item is locked for castout against other castout processes, STEP 2200. Thereafter, the data item is marked as unchanged, STEP 2202, and the data item and its version number are returned, STEP 2204.

Returning to FIG. 21, and in particular to STEP 2104, after the data item is read and locked, it is written to permanent storage, such as DASD, STEP 2106. Thereafter, a determination is made as to whether there are more data items to be castout, INQUIRY 2108. Should there be more entries to be castout, then processing continues with STEP 2102. However, if all data items have been castout, then the locked cache entries are unlocked via an unlock castout locks command issued to the primary structure, STEP 2110.

Figure 23:
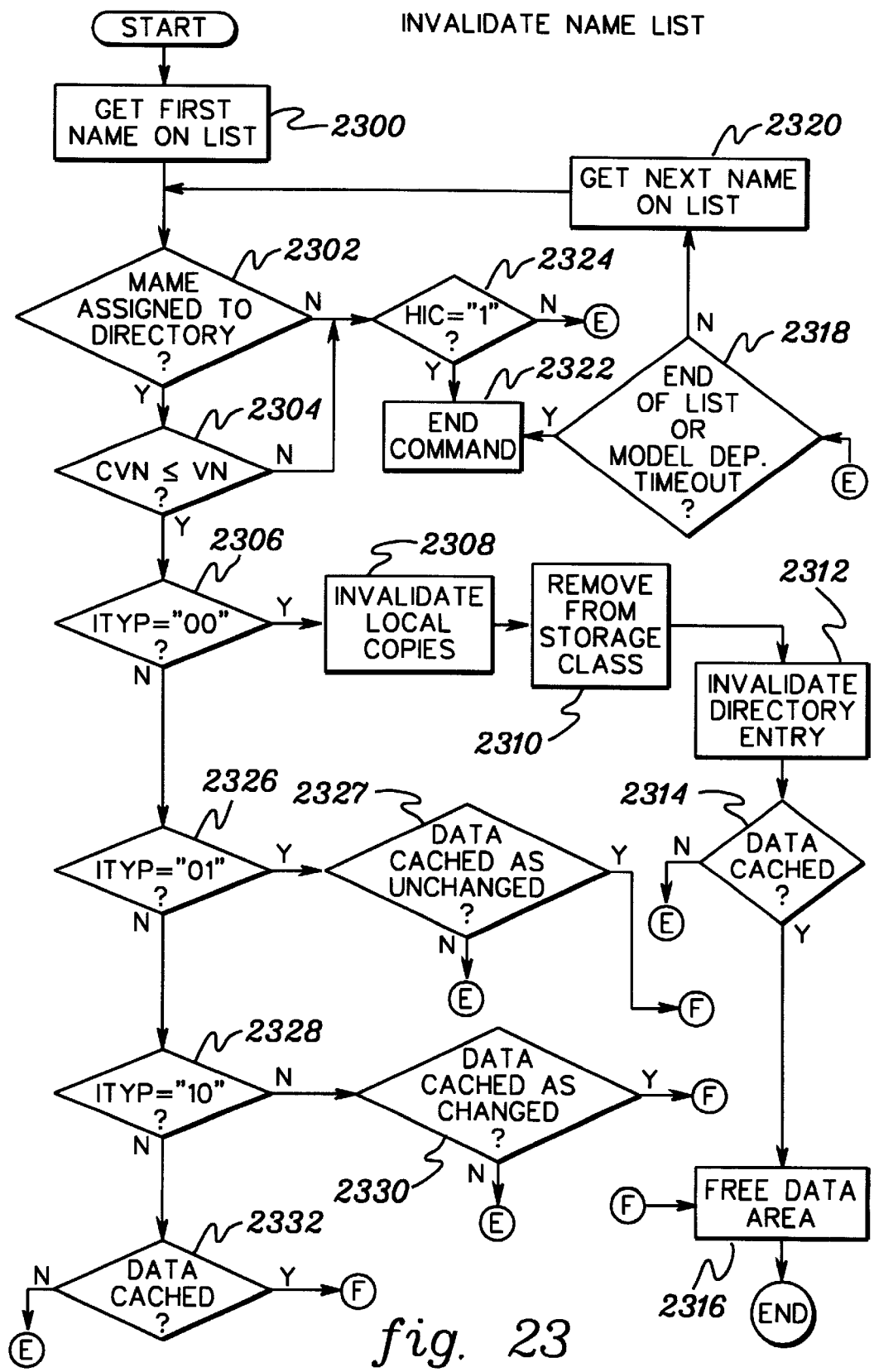
FIG. 23 depicts one embodiment of the logic associated with an invalidate name list command, in accordance with the principles of the present invention.

Subsequently, a delete of the entries that were castout of the primary structure instance is initiated against the secondary structure instance, STEP 2112. In particular, an invalidate name list command is used to delete the entries, which is described with reference to FIG. 23. The invalidate name list specifies as input CVN=VN from the Read For Castout, HIC=0 and Ityp=00.

The invalidate name list command receives as input a list of names, a halt-invalidation control, an invalidation type, and a comparative version number. Initially, the first name on the list is selected, STEP 2300. Thereafter, a determination is made as to whether that name is assigned to the directory, INQUIRY 2302. Should the name be assigned to the directory, then a further inquiry is made as to whether the comparative version number is less than or equal to the version number of the directory entry, INQUIRY 2304.

If the comparative version number is less than or equal to the version number, then a further determination is made as to whether the invalidation type indicates that the directory entry and data area are to be invalidated, INQUIRY 2306. If the directory entry and data area are to be invalidated, then the local copies are invalidated, STEP 2308. Additionally, the data is removed from the storage class, STEP 2310, and the directory entry is invalidated, STEP 2312. Thereafter, a determination is made as to whether the data is cached, INQUIRY 2314.

Should the data be cached, then the data area is also freed, STEP 2316. In particular, the data table entry is detached from the directory, the contents are cleared and the entries made available for reuse. On the other hand, if the data is not cached, INQUIRY 2314, then a determination is made as to whether an end of list has been reached or a model-dependent timeout has been reached, INQUIRY 2318. If neither the end of list or model dependent timeout has been reached, then the next name on the list is obtained, STEP 2320, and processing continues as described herein.

Returning to INQUIRY 2318, if the end of list or model-dependent timeout has been reached, then the command ends, STEP 2322. If it is a model-dependent timeout, then the command can be regenerated with a new restart token.

Returning to INQUIRY 2302, if the name is not assigned to the directory, then a further determination is made as to whether the halt-invalidation control indicates halt invalidation, INQUIRY 2324. If the halt invalidation control indicates continue invalidation, then processing continues with INQUIRY 2318. However, if the halt-invalidation control indicates that the invalidation is to be halted, then the command is ended, STEP 2322.

Returning to INQUIRY 2304, if the comparative version number is greater than the version number, then processing continues with INQUIRY 2324, as described herein.

Returning to INQUIRY 2306, if the invalidation type does not indicate that the directory entry and data area are to be invalidated, then a further determination is made as to whether the invalidation type indicates that unchanged data areas are to be deleted, INQUIRY 2326. If unchanged data areas are to be deleted, then a further inquiry is made as to whether the data is cached as unchanged, INQUIRY 2327. Should the data not be cached as unchanged, then processing continues with INQUIRY 2318, as described herein. However, if the data is cached as unchanged, then processing continues with STEP 2316.

Returning to INQUIRY 2326, if the. invalidation types does not indicate delete unchanged data areas, then a further determination is made as to whether the invalidation type indicates delete changed data areas, INQUIRY 2328. Should the invalidation type indicate delete changed data areas, then another determination is made as to whether the data is cached as changed, INQUIRY 2330. Should the data be cached as changed, then processing continues with STEP 2316. However, if the data is not cached as changed, then processing continues with STEP 2318.

Returning to INQUIRY 2328, if the invalidation type does not indicate that changed data areas are to be deleted, then a further determination is made as to whether the data is cached, INQUIRY 2332. Should the data be cached, then processing continues with STEP 2316. Otherwise, processing continues with STEP 2318.

The end result of the invalidate name list command is that there should be no entry left in the secondary instance that does not appear in the primary structure instance. Despite this goal, however, there are certain timing windows that can result in orphaned entries in the secondary structure. That is, data items may be present in the secondary structure, which have no corresponding changed data item in the primary structure. The following sequence of events illustrates one way in which this may occur:

| Castout Processing | Duplexed Update Processing |
|---|---|
| | update data item in secondary structure (asychronous) |
| | update item in primary structure (synchronous) |
| read data item for castout from primary structure | |
| write data item to permanent storage | |
| delete data item from secondary structure using the invalidate name list command (fails on version number comparison, because the data item is not yet written to secondary structure) | |
| unlock castout lock for data item in primary structure | |
| | asynchronous write to secondary structure completes |

The net result of the above sequence of events is that the data item is successfully castout and marked unchanged in the primary structure, yet because the delete of the data item in the secondary structure "missed" deleting the entry, it becomes orphaned in the secondary structure. This causes no harm at the time, and most likely such occurrences will resolve themselves naturally as a result of subsequent update processing (which will cause a new changed version of the entry to be written to the primary and secondary structures, making the entry in the secondary become not-orphaned in the process).

However, it is possible that an orphaned data item will not be updated again for an indeterminate amount of time, during which time it is taking up space needlessly in the secondary structure. To correct this, an infrequently-executed "garbage collection" process is used, in accordance with the principles of the present invention. The garbage collection process identifies and deletes any such entries from the secondary structure. One embodiment of the logic associated with the garbage collection process, which is performed by the database management system, is described in detail with reference to FIG. 24.

Figure 24:
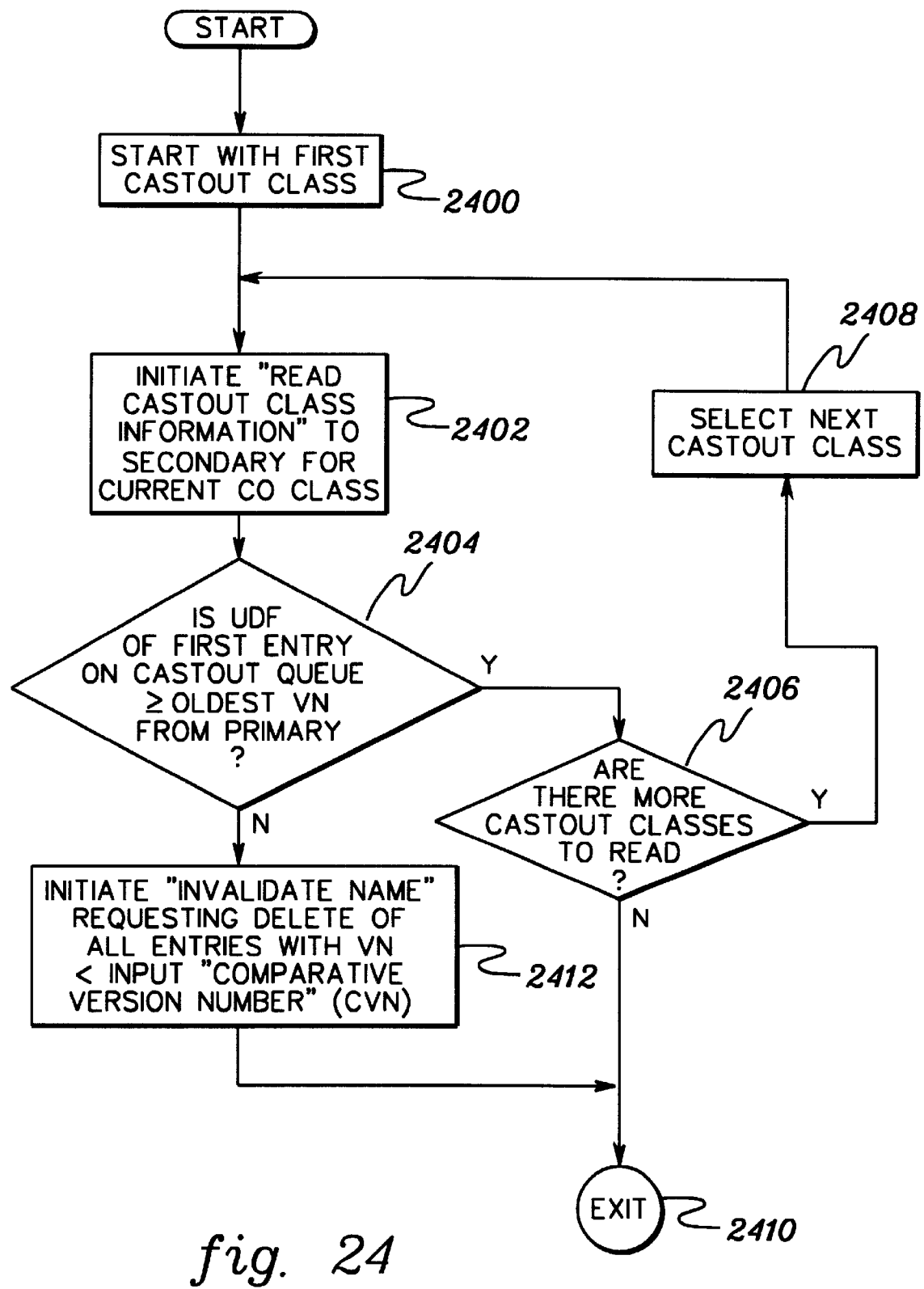
FIG. 24 depicts one embodiment of the logic associated with a garbage collection process, in accordance with the principles of the present invention.

The process of FIG. 24, receives as input the timestamp of the oldest changed data item in the primary structure. Knowing the update time of the oldest changed data item in the primary structure, and knowing that the entries in the secondary structure are tagged with their update time, using the new cache entry version number, the subsystem can infer that any entry in the secondary structure whose version number is older than the oldest changed data item in the primary structure is an orphan, since it has no correspondingly-old changed entry in the primary structure. One embodiment for determining the oldest changed data item is described in detail in co-pending, commonly assigned U.S. patent application Ser. No. 09/251,888, entitled "Method, System And Program Products For Managing Changed Data Of Castout Classes", Elko et al., filed Feb. 19, 1999, which is hereby incorporated herein by reference in its entirety.

Initially, the process begins with the first castout class, STEP 2400. For the first castout class, a read castout class information command is initiated for the secondary structure to return the update time of the first entry of the class, STEP 2402. That is, the read castout class information command returns the UDF of the first entry on the castout class queue. Since the queue is maintained in UDF order, the first entry is the oldest on that queue.

Thereafter, a determination is made as to whether the UDF of the first entry of the queue is greater than or equal to the timestamp received as input, INQUIRY 2404. If the UDF indicates that the oldest entry is greater than or equal to the timestamp of the oldest entry in the primary structure, then a check is performed to see if there are more castout classes to be processed, INQUIRY 2406.

If there are more castout classes to be processed, then the next castout class is selected, STEP 2408, and processing continues with STEP 2402. However, if there are no more castout classes to read, then processing of the garbage collection procedure is complete, STEP 2410.

Returning to INQUIRY 2404, if the UDF of the first entry of the castout class queue is less than the timestamp of the oldest entry in the primary structure, an invalidate name request command is initiated, allowing the secondary structure to be scanned and requesting the deletion of all entries with a version number less than the comparative version number, STEP 2412. By passing a comparative version number equal to the update time of the oldest changed data item in the primary structure, the invalidate name command has the effect of deleting all orphaned entries from the secondary structure.

One embodiment of an invalidate name command is described in U.S. Pat. No. 5,537,574 entitled "Sysplex Shared Data Coherency", Elko et al., issued Jul. 16, 1996, which is hereby incorporated herein by reference in its entirety. Further, the command is described below, along with enhancements made for the present invention. Specifically, one example of the logic associated with an invalidate name command is described with reference to FIG. 25. The invalidate-name command is used to detach all names which match the input name under the mask condition from the SES-cache directory.

Figure 25:
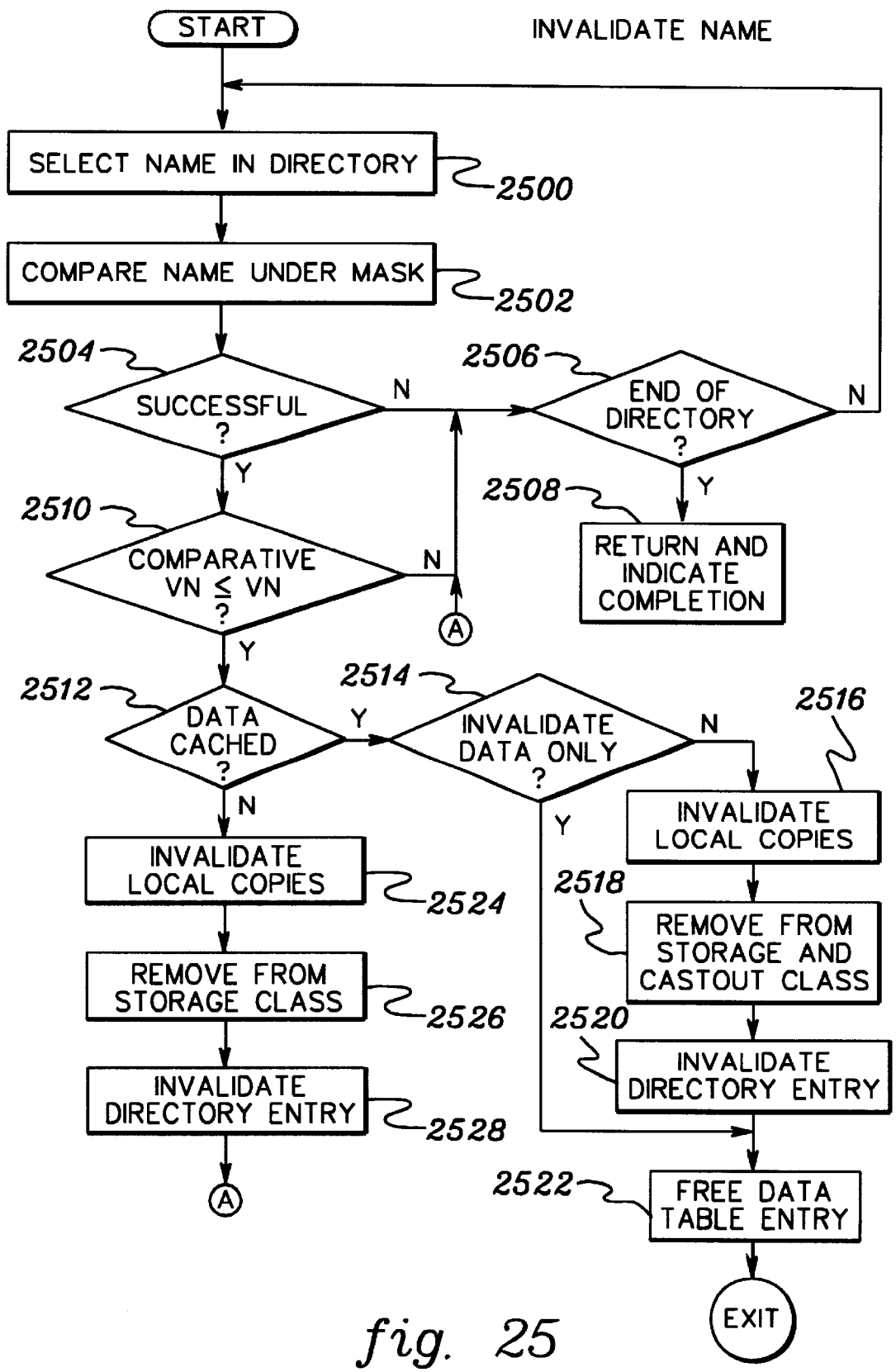
FIG. 25 depicts one embodiment of the logic associated with an invalidate name command, in accordance with the principles of the present invention.

Referring to FIG. 25, while a model-dependent timeout has not been exceeded and the end of the directory has not been reached, a scan of a directory table is made and the names within that table are compared under a mask. If a model-dependent timeout has occurred before the end of the directory is reached, a new restart token is generated and returned. Then, the process continues.

Initially, a name is selected from the cache directory, STEP 2500. Thereafter, the selected directory name is compared under a mask, STEP 2502. A zero mask causes all names to be invalidated, and a mask of all ones identifies a single name to be invalidated. The name comparison is successful when all the unmasked bytes are equal. Should the comparison be unsuccessful, INQUIRY 2504, then a determination is made as to whether this is the end of the directory, INQUIRY 2506. If this is the end of the directory, then completion is indicated and returned, STEP 2508. However, if this is not the end of the directory, then processing continues with STEP 2500.

Returning to INQUIRY 2504, if the comparison is successful, then a further determination is made as to whether the comparative version number is less than or equal to the version number of the directory entry, INQUIRY 2510. If the comparative version number is greater than the version number, then processing continues with INQUIRY 2506. In particular, a new directory entry is selected, if the end of the directory has not been reached. On the other hand, if the comparative version number is less than or equal to the version number, then a further determination is made as to whether the data is cached, INQUIRY 2512. If the data is cached, then a further check is made to determine whether only the data is to be invalidated, INQUIRY 2514.

If both the data and the directory are to be invalidated, then the local copies of the data are invalidated, STEP 2516, the data is removed from storage and the castout class, STEP 2518, and the directory entry is invalidated, STEP 2520. Additionally, the data table entry is detached from the directory, the contents are cleared, and the entry is made available for reuse, STEP 2522. Thereafter, another directory entry is selected, if the end of the directory has not been reached, INQUIRY 2506.

Returning to INQUIRY 2514, if only the data is to be invalidated, then processing continues with STEP 2522 and the directory is left intact.

Returning to INQUIRY 2512 if the data is not cached, then the local copies of the data are invalidated, STEP 2524, and removed from the storage class, STEP 2526. Additionally, the directory entry is invalidated, STEP 2528. Thereafter, processing continues with INQUIRY 2506.

As described above, a duplexing capability is provided, which enables a duplexed copy of a structure to be created. The duplexing capability of the present invention includes administrative externals to allow duplexing to occur. For example a coupling facility policy is provided which specifies DUPLEX(DISABLED/ALLOWED/ENABLED). This controls duplexing at a structure granularity. DISABLED indicates that duplexing cannot be started; ALLOWED indicates duplexing may be started manually, but will not be started automatically; and ENABLED indicates duplexing may be started either manually or automatically by the operating system. This policy option is ignored, in this embodiment, for non-cache structures and for structures whose users do not support user-managed duplexing protocols.

In addition to the above, the duplexing capability provides a number of operational externals. For example, duplexing is initiated via a duplexing rebuild process with an additional rebuild phase (e.g., duplex established phase). The duplexing rebuild can be stopped to revert to simplex mode. That is, a user can fall back to a primary structure or forward complete to switch to a secondary structure. The operating system automatically drives the appropriate type of stop in response to failure conditions affecting one of the automatically attempts to re-establish duplexing for any duplexed enabled structures.

The duplexing rebuild has a timeline which is as follows:

Establishing duplexing
  QUIESCE PHASE
    Users quiesce any structure accesses in response to Rebuild Quiesce event.
  CONNECT PHASE
    Users IXLCONN REBUILD to allocate/connect to the secondary structure in response to Rebuild Connect event.
    Users propagate any necessary structure data to the secondary structure.
  DUPLEX ESTABLISHED PHASE
    Users begin duplexing any necessary updates to both structure instances in response to Rebuild Duplex Established event.

Phase persists indefinitely.
Switching to simplex on secondary
  DUPLEX ESTABLISHED PHASE WITH SWITCH INDICATED
    Users quiesce all structure accesses in response to Rebuild Switch event.
  CLEANUP PHASE
    Users forget about primary structure instance in response to Rebuild Cleanup event, primary structure is deallocated.
    All local buffers get reinitialized to an invalid state.
Falling back to simplex on primary
  STOP PHASE
    Users quiesce any structure accesses in response to Rebuild Stop event.
    Users forget about secondary structure instance, secondary structure is deallocated.

In addition to the above, the duplexing capability of the present invention includes a number of programming externals. For instance, there are options to start/stop a duplexing rebuild. Exploiters indicate the support of user managed duplexing protocols via an ALLOWDUPREBLD keyword on IXLCONN. Users who allow duplexing handle rebuild start/stop reasons for duplexing; participate in duplexing rebuild protocol via support for new events for entering duplexing (rebuild duplex established) and switching to a secondary instance (rebuild switch); support new connections to a structure while duplexing is in progress or being established, by joining the duplexing rebuild protocol; duplex mainline operations as necessary, to both the primary and secondary structure, while in the duplex established phase. Both structure instances are altered during duplexing. A force command forces connectors or structures for both structure instances during duplexing, and a display command issues return information for both structure instances during duplexing.

The duplexing capability of the present invention, in one embodiment, duplexes only changed cached structure data; overlaps changed data writes to primary and secondary instances for good performance; when data entries are marked unchanged after castout processing, they are deleted from the secondary structure instance; and local cache registrations are not duplexed.

Although the present invention is described with reference to a cache structure, the present invention is also applicable to other data structures.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations. to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A castout method comprising:
  writing a selective data item from a primary instance of a data structure to at least one storage medium, said selective data item also being included in a secondary instance of the data structure, wherein the secondary instance is separate from the storage medium and wherein the writing of the selective data item to the primary instance and to the secondary instance is performed under the same serialization;
  determining whether said selective data item can be deleted from the secondary instance of said data structure; and
  deleting said selective data item from said secondary instance, when said selective data item can be deleted.

2. The castout method of claim 1, wherein said determining comprising comparing a version number of said selective data item of said primary instance with a version number of said selective data item of said secondary instance to determine whether said selective data item can be deleted from said secondary instance.

3. The method of claim 1, further comprising:
  cleaning up said secondary instance by removing one or more selective data items from said secondary instance, said one or more selective data items having been written from said primary instance to said storage medium, but having failed to be deleted from said secondary instance.

4. The method of claim 3, wherein said cleaning up further comprises determining the one or more selective data items to be removed from said secondary instance.

5. The method of claim 1, wherein said writing comprises writing a plurality of data items from said primary instance to said at least one storage medium, and said deleting comprises deleting multiple data items of said plurality of data items from said secondary instance.

6. The method of claim 5, wherein said deleting said multiple data items comprises using a single command to delete said multiple data items.

7. A castout system comprising:
  means for writing a selective data item from a primary instance of a data structure to at least one storage medium, said selective data item also being included in a secondary instance of the data structure, wherein the secondary instance is separate from the storage medium and wherein the writing of the selective data item to the primary instance and to the secondary instance is performed under the same serialization;
  means for determining whether said selective data item can be deleted from a secondary instance of said data structure; and
  means for deleting said selective data item from said secondary instance, when said selective data item can be deleted.

8. The castout system of claim 7, wherein said means for determining comprising means for comparing a version number of said selective data item of said primary instance with a version number of said selective data item of said secondary instance to determine whether said selective data item can be deleted from said secondary instance.

9. The system of claim 7, further comprising:
  means for cleaning up said secondary instance by removing one or more selective data items from said secondary instance, said one or more selective data items having been written from said primary instance to said storage medium, but having failed to be deleted from said secondary instance.

10. The system of claim 9, wherein said means for cleaning up further comprises means for determining the one or more selective data items to be removed from said secondary instance.

11. The system of claim 7, wherein said means for writing comprises means for writing a plurality of data items from said primary instance to said at least one storage medium, and said means for deleting comprises means for deleting multiple data items of said plurality of data items from said secondary instance.

12. The system of claim 11, wherein said means for deleting said multiple data items comprises a single command used to delete said multiple data items.

13. A castout system comprising:
   a first processor adapted to write a selective data item from a primary instance of a data structure to at least one storage medium, said selective data item also being included in a secondary instance of the data structure, wherein the secondary instance is separate from the storage medium and wherein the writing of the selective data item to the primary instance and to the secondary instance is performed under the same serialization;
   a second processor adapted to determine whether said selective data item can be deleted from a secondary instance of said data structure; and
   a third processor adapted to delete said selective data item from said secondary instance, when said selective data item can be deleted.

14. The system of claim 13, wherein said first processor, said second processor and said third processor are the same processor.

15. The system of claim 13, wherein one or more of said first processor, said second processor and said third processor are different processors.

16. At least one program storage device readable by a machine, tangibly embodying at least one program of instructions executable by the machine to perform a castout method, said method comprising:
   writing a selective data item from a primary instance of a data structure to at least one storage medium, said selective data item also being included in a secondary instance of the data structure, wherein the secondary instance is separate from the storage medium and wherein the writing of the selective data item to the primary instance and to the secondary instance is performed under the same serialization;
   determining whether said selective data item can be deleted from a secondary instance of said data structure; and
   deleting said selective data item from said secondary instance, when said selective data item can be deleted.

17. The at least one program storage device of claim 16, wherein said determining comprising comparing a version number of said selective data item of said primary instance with a version number of said selective data item of said secondary instance to determine whether said selective data item can be deleted from said secondary instance.

18. The at least one program storage device of claim 16, wherein said method further comprises:
   cleaning up said secondary instance by removing one or more selective data items from said secondary instance, said one or more selective data items having been written from said primary instance to said storage medium, but having failed to be deleted from said secondary instance.

19. The at least one program storage device of claim 18, wherein said cleaning up further comprises determining the one or more selective data items to be removed from said secondary instance.

20. The at least one program storage device of claim 16, wherein said writing comprises writing a plurality of data items from said primary instance to said at least one storage medium, and said deleting comprises deleting multiple data items of said plurality of data items from said secondary instance.

21. The at least one program storage device of claim 20, wherein said deleting said multiple data items comprises using a single command to delete said multiple data items.

22. A castout method comprising:
   writing a selective data item from a primary instance of a data structure to at least one storage medium;
   determining whether said selective data item can be deleted from a secondary instance of said data structure;
   deleting said selective data item from said secondary instance, when said selective data item can be deleted; and
   cleaning up the secondary instance, wherein said cleaning up comprises:
      determining one or more selective data items to be removed from the secondary instance, wherein the determining comprises, for each of the one or more selective data items, comparing a version number of a selective data item to a timestamp of an oldest changed data item in the primary instance, wherein the selective data item is to be removed when the version number is older than the timestamp; and
      removing the one or more selective data items from the secondary instance, said one or more selective data items having been written from the primary instance to the storage medium, but having failed to be deleted from the secondary instance.

23. A castout system comprising:
   means for writing a selective data item from a primary instance of a data structure to at least one storage medium;
   means for determining whether said selective data item can be deleted from a secondary instance of said data structure;
   means for deleting said selective data item from said secondary instance, when said selective data item can be deleted; and
   means for cleaning up the secondary instance, said means for cleaning up comprising:
      means for determining one or more selective data items to be removed from the secondary instance, wherein the means for determining comprises, for each of the one or more selective data items, comparing a version number of a selective data item to a timestamp of an oldest changed data item in the primary instance, wherein the selective data item is to be removed when the version number is older than the timestamp; and
      means for removing the one or more selective data items from the secondary instance, the one or more selective data items having been written from the primary instance to the storage medium, but having failed to be deleted from the secondary instance.

24. At least one program storage device readable by a machine, tangibly embodying at least one program of instructions executable by the machine to perform a castout method, said method comprising:

writing a selective data item from a primary instance of a data structure to at least one storage medium;

determining whether the selective data item can be deleted from a secondary instance of said data structure;

deleting said selective data item from said secondary instance, when said selective data item can be deleted; and cleaning up the secondary instance, wherein said cleaning up comprises:

determining one or more selective data items to be removed from the secondary instance, wherein the determining comprises, for each of the one or more selective data items, comparing a version number of a selective data item to a timestamp of an oldest changed data item in the primary instance, wherein the selective data item is to be removed when the version number is older than the timestamp; and removing the one or more selective data items from the secondary instance, said one or more selective data items having been written from the primary instance to the storage medium, but having failed to be deleted from the secondary instance.

* * * * *

UNITED STATES PATENT AND TRADEMARK OFFICE
CERTIFICATE OF CORRECTION

PATENT NO. : 6,438,654 B1
DATED : August 20, 2002
INVENTOR(S) : Elko et al.

It is certified that error appears in the above-identified patent and that said Letters Patent is hereby corrected as shown below:

Column 11,
Line 23, delete "cPc" and insert -- CPC --

Signed and Sealed this

Eighteenth Day of February, 2003

JAMES E. ROGAN
*Director of the United States Patent and Trademark Office*